(12) United States Patent
Maejima

(10) Patent No.: US 12,451,195 B2
(45) Date of Patent: Oct. 21, 2025

(54) SEMICONDUCTOR MEMORY DEVICE

(71) Applicant: Kioxia Corporation, Tokyo (JP)

(72) Inventor: Hiroshi Maejima, Tokyo (JP)

(73) Assignee: Kioxia Corporation, Tokyo (JP)

( * ) Notice: Subject to any disclaimer, the term of this patent is extended or adjusted under 35 U.S.C. 154(b) by 239 days.

(21) Appl. No.: 18/458,891

(22) Filed: Aug. 30, 2023

(65) Prior Publication Data

US 2024/0105270 A1    Mar. 28, 2024

(30) Foreign Application Priority Data

Sep. 22, 2022   (JP) ................................. 2022-151666

(51) Int. Cl.
| | |
|---|---|
| *G11C 5/06* | (2006.01) |
| *G11C 7/06* | (2006.01) |
| *G11C 16/08* | (2006.01) |
| *G11C 16/26* | (2006.01) |
| *G11C 16/34* | (2006.01) |

(52) U.S. Cl.
CPC ............... *G11C 16/26* (2013.01); *G11C 7/06* (2013.01); *G11C 16/08* (2013.01); *G11C 16/3459* (2013.01)

(58) Field of Classification Search
CPC ....... G11C 5/063; G11C 7/18; G11C 11/4097; G11C 5/025; G11C 5/04
USPC .......................................................... 365/63
See application file for complete search history.

(56) References Cited

U.S. PATENT DOCUMENTS

| | | | |
|---|---|---|---|
| 10,297,578 B2 | 5/2019 | Tagami et al. | |
| 10,811,393 B2 * | 10/2020 | Ito | ............... G11C 5/14 |
| 10,879,260 B2 | 12/2020 | Uryu et al. | |
| 2016/0189777 A1 | 6/2016 | Yoshihara et al. | |
| 2019/0088676 A1 | 3/2019 | Tagami et al. | |
| 2020/0401347 A1 | 12/2020 | Maejima | |
| 2021/0065770 A1 | 3/2021 | Watanabe et al. | |
| 2021/0249397 A1 | 8/2021 | Kanamori et al. | |
| 2023/0154536 A1 | 5/2023 | Maejima | |

FOREIGN PATENT DOCUMENTS

| | | |
|---|---|---|
| JP | 6118415 B2 | 4/2017 |
| TW | 202109535 A | 3/2021 |
| TW | 202143224 A | 11/2021 |

* cited by examiner

*Primary Examiner* — Son T Dinh
(74) *Attorney, Agent, or Firm* — Kim & Stewart LLP

(57) ABSTRACT

A semiconductor memory device includes first, second, and third chips. The first chip includes a first memory cell. The second chip includes a second memory cell. The third chip includes a row decoder and a sense amplifier. The first and second memory cells are commonly connected to the row decoder via a first word line. The first and second memory cells are connected to the sense amplifier via first and second bit lines, respectively. The sense amplifier includes a first node selectively connectable to the first and second bit lines. The sense amplifier is configured to sense a voltage at the first node to read data in the first memory cell when the first node is connected to the first bit line and sense the voltage at the first node to read data in the second memory cell when the first node is connected to the second bit line.

20 Claims, 44 Drawing Sheets

FIG. 15

|  | SLC | TLC | QLC |
| --- | --- | --- | --- |
| 1CU READ OPERATION | 2 | 2 (NLK) 3 (LCK) | 2 (NLK) 3 (LCK) |
| 1CU WRITE OPERATION | 2 | 5 | 6 |
| 2CU READ OPERATION | 3 | 3 (NLK) 5 (LCK) | 3 (NLK) 5 (LCK) |
| 2CU WRITE OPERATION | 3 | | |

FIG. 36

|  | SLC | TLC | QLC |
|---|---|---|---|
| 1CU READ OPERATION | 2 | 2 (NLK) 3 (LCK) | 2 (NLK) 3 (LCK) |
| 1CU WRITE OPERATION | 2 | 5 | 6 |
| 3CU READ OPERATION | 4 | 4 (NLK) | 4 (NLK) |
| 3CU WRITE OPERATION | 4 | | |

SEMICONDUCTOR MEMORY DEVICE

CROSS-REFERENCE TO RELATED APPLICATION

This application is based upon and claims the benefit of priority from Japanese Patent Application No. 2022-151666, filed Sep. 22, 2022, the entire contents of which are incorporated herein by reference.

FIELD

Embodiments described herein relate generally to semiconductor memory devices.

BACKGROUND

A NAND flash memory is known as one type of a semiconductor memory device.

BRIEF DESCRIPTION OF THE DRAWINGS

FIG. 15 is a diagram illustrating the number of latch circuits used for a read operation and a write operation of the semiconductor memory device according to the first embodiment.

FIG. 36 is a diagram illustrating the number of latch circuits used for a read operation and a write operation of the semiconductor memory device according to the second embodiment.

DETAILED DESCRIPTION

Figure 1:
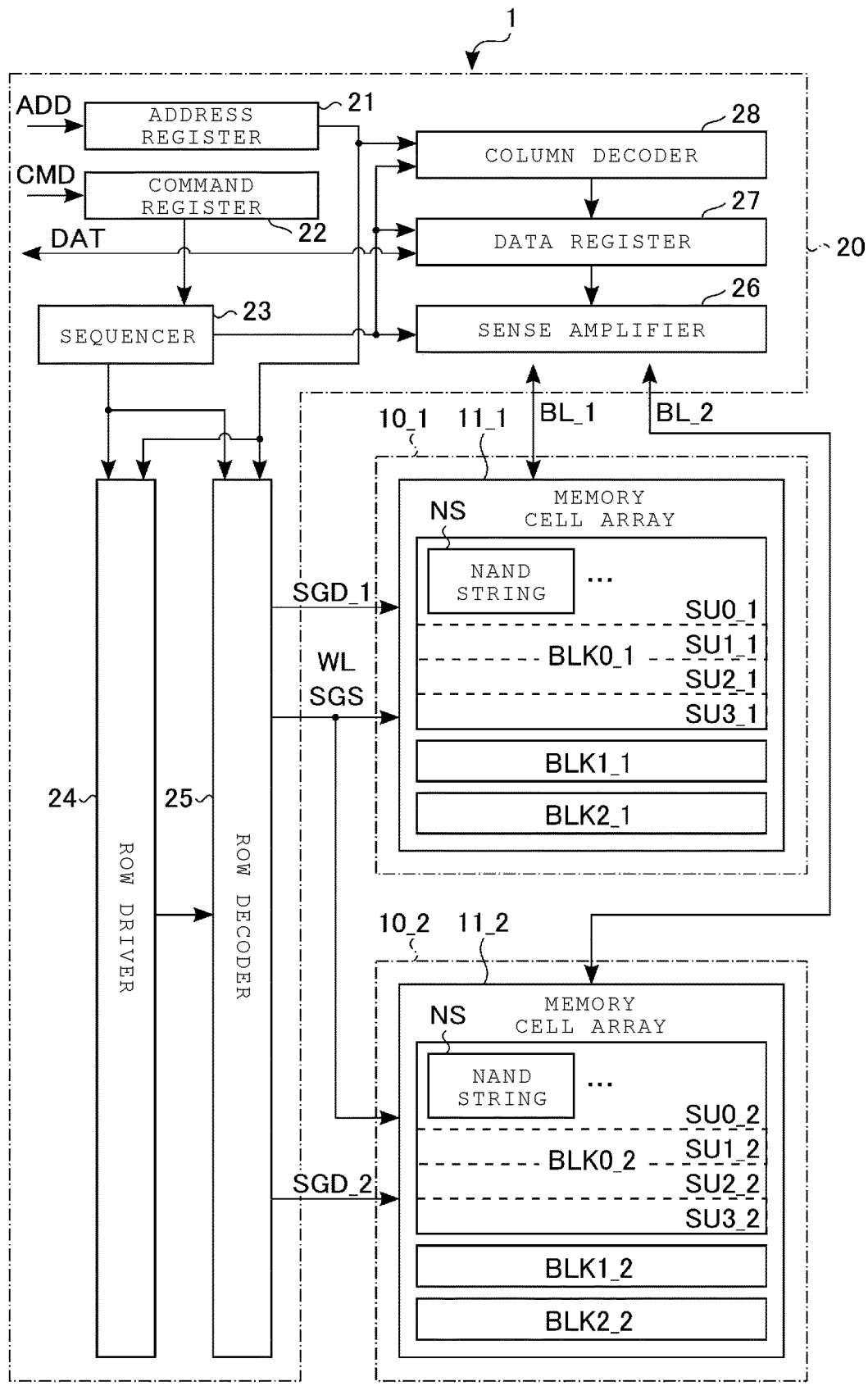
FIG. 1 is a block diagram illustrating an overall configuration of a semiconductor memory device according to a first embodiment.

Embodiments provide semiconductor memory devices capable of preventing an increase in the chip area.

In general, according to an embodiment, a semiconductor memory device includes a first chip, a second chip, and a third chip. The first chip includes a first memory cell array including a first memory cell. The second chip includes a second memory cell array including a second memory cell. The third chip includes a row decoder and a sense amplifier. The first memory cell and the second memory cell are commonly connected to the row decoder via a first word line. The first memory cell is connected to the sense amplifier via a first bit line. The second memory cell is connected to the sense amplifier via a second bit line. The sense amplifier includes a first node selectively connectable to the first bit line and the second bit line. The sense amplifier is configured to sense a voltage at the first node to read data stored in the first memory cell when the first node is connected to the first bit line and sense the voltage at the first node to read data stored in the second memory cell when the first node is connected to the second bit line.

Embodiments will be described below with reference to the drawings. It should be noted that, in the following description, elements having substantially the same functions and configurations are denoted by the same reference numerals. Duplicate description may be omitted if unnecessary. Each embodiment illustrated below exemplifies an apparatus or a method for implementing a technical idea of the embodiment. The technical ideas of the embodiments does not specify materials, shape, structures, arrangement, and the like of components. The technical ideas of the embodiments can be changed variously without departing from the scope of the present disclosure. The embodiments and modified examples are provided in the scope of the present disclosure described in the claims and the equivalents.

1. First Embodiment

A semiconductor memory device according to a first embodiment will be described.

1.1 Configuration 1.1.1 Overall Configuration of Semiconductor Memory Device

First, an example of an overall configuration of a semiconductor memory device 1 will be described with reference to FIG. 1. FIG. 1 is a block diagram illustrating the overall configuration of the semiconductor memory device 1. It should be noted that, in FIG. 1, some of the connections between the components are indicated by arrowed lines, but the connections between the components are not limited thereto.

The semiconductor memory device 1 is, for example, a three-dimensional stacked NAND flash memory. The three-dimensional stacked NAND flash memory includes a plurality of nonvolatile memory cell transistors three-dimensionally located on a semiconductor substrate.

As illustrated in FIG. 1, the semiconductor memory device 1 includes a plurality of array chips 10 and a circuit chip 20. The array chips 10 are chips provided with an array of nonvolatile memory cell transistors. The circuit chip 20 is a chip provided with circuits for controlling the array chips 10. The semiconductor memory device 1 according to the present embodiment has a structure in which a plurality of the array chips 10 and the circuit chip 20 are coupled (e.g., bonded). Hereinafter, unless either the array chip 10 or the circuit chip 20 is specified, the chips are simply denoted as "chips". It should be noted that the semiconductor memory device 1 may include a plurality of the circuit chips 20.

In the example of FIG. 1, the semiconductor memory device 1 includes two array chips 10_1 and 10_2. It should be noted that the number of array chips 10 may be three or more. Hereinafter, when the chip is not specified to one of the array chip 10_1 or 10_2, the array chips 10_1 and 10_2 are denoted as an array chip 10.

The array chip 10 includes a memory cell array 11. The memory cell array 11 is a region in which the nonvolatile memory cell transistors are provided three-dimensionally. Hereinafter, when specifying the memory cell array 11 of the array chip 10_1, the memory cell array 11 is denoted as a "memory cell array 11_1". When specifying the memory cell array 11 of the array chip 10_2, the memory cell array 11 is denoted as a "memory cell array 11_2".

The memory cell array 11 includes a plurality of blocks BLK. The block BLK is, for example, a set of a plurality of the memory cell transistors of which data are collectively erased. A plurality of the memory cell transistors in the block BLK are associated with the rows and the columns. Hereinafter, when specifying the block BLK of the memory cell array 11_1, the block BLK is denoted as a "block BLK_1". When specifying the block BLK of the memory cell array 11_2, the block BLK is denoted as a "block BLK_2". In the example of FIG. 1, the memory cell array 11_1 includes blocks BLK0_1, BLK1_1, and BLK2_1. The memory cell array 11_2 includes blocks BLK0_2, BLK1_2, and BLK2_2.

The block BLK includes a plurality of string units SU. The string unit SU is, for example, a set of a plurality of NAND strings NS collectively selected during the write operation or the read operation. Hereinafter, when specifying the string unit SU of the memory cell array 11_1, the string unit SU is denoted as a "string unit SU_1". When specifying the string unit SU of the memory cell array 11_2, the string unit SU is denoted as a "string unit SU_2". In the example of FIG. 1, each block BLK_1 of the memory cell array 11_1 includes four string units SU0_1, SU1_1, SU2_1, and SU3_1. Each block BLK_2 of the memory cell array 11_2 includes four string units SU0_2, SU1_2, SU2_2, and SU3_2.

The string unit SU includes a plurality of NAND strings NS. The NAND string NS includes a set of the memory cell transistors connected in series.

It should be noted that the number of blocks BLK in the memory cell array 11 and the number of string units SU in each block BLK are freely selected. The circuit configuration of the memory cell array 11 will be described below.

Next, the circuit chip 20 will be described. The circuit chip 20 includes an address register 21, a command register 22, a sequencer 23, a row driver 24, a row decoder 25, a sense amplifier 26, a data register 27, and a column decoder 28.

The address register 21 is a register temporarily storing address information ADD. The address register 21 receives the address information ADD from an external controller (not illustrated). For example, the address information ADD includes row addresses and column addresses. The row address is an address designating wirings in the row direction of the memory cell array 11. The column address is an address designating wirings in the column direction of the memory cell array 11. For example, the row addresses include block addresses and page addresses. For example, the block address is used to select the block BLK. Hereinafter, the block BLK that is selected is denoted as a "selected block BLK". The block BLK that is not selected is denoted as a "non-selected block BLK". The page address is used to select a word line WL. Hereinafter, the word line WL that is selected is denoted as a "selected word line WL". The word line WL that is not selected is denoted as a "non-selected word line WL". The column address is used to select a bit line BL. The address register 21 is connected to the row driver 24, the row decoder 25, and the column decoder 28. For example, the address register 21 transmits the page address to the row driver 24. The address register 21 transmits the block address to the row decoder 25. The address register 21 transmits the column address to the column decoder 28.

The command register 22 is a register that temporarily stores commands CMD. The command register 22 receives the command CMD from the external controller. The command register 22 is connected to the sequencer 23. The command register 22 transmits the command CMD to the sequencer 23.

The sequencer 23 is a circuit that controls the entire semiconductor memory device 1. The sequencer 23 is connected to the row driver 24, the row decoder 25, the sense amplifier 26, the data register 27, and the column decoder 28. The sequencer 23 controls the row driver 24, the row decoder 25, the sense amplifier 26, the data register 27, and the column decoder 28. The sequencer 23 also controls the entire operation of the semiconductor memory device 1 based on commands CMD and the like. More specifically, the sequencer 23 performs a write operation, a read operation, an erase operation, and the like.

The row driver 24 is a driver that supplies voltages to the row decoder 25. The row driver 24 is connected to the row decoder 25. The row driver 24 supplies voltages to the row decoder 25 based on the row address (for example, the page address).

The row decoder 25 is a circuit that decodes the row addresses. The row decoder 25 selects any one of the blocks BLK in the memory cell array 11 based on the decoding result of the row address (for example, the block address).

More specifically, the row decoder 25 is connected to the memory cell array 11 via a plurality of the word lines WL and a plurality of select gate lines SGD and SGS. The word line WL is a wiring used for controlling the memory cell transistor. The select gate lines SGD and SGS are wirings used for selecting the string units SU. The row decoder 25 applies the voltage supplied from the row driver 24 to the word line WL and the select gate lines SGD and SGS corresponding to the selected block BLK.

In the present embodiment, the word lines WL of the memory cell array 11_1 and the word lines WL of the memory cell array 11_2 are commonly connected to the row decoder 25. Similarly, the select gate line SGS of the memory cell array 11_1 and the select gate line SGS of the memory cell array 11_2 are commonly connected to the row decoder 25. The select gate line SGD of the memory cell array 11_1 and the select gate line SGD of the memory cell array 11_2 are independently connected to the row decoder 25. That is, the select gate line SGD of the memory cell array 11_1 and the select gate line SGD of the memory cell array 11_2 are not electrically connected. In other words, the memory cell arrays 11_1 and 11_2 share the word lines WL and the select gate lines SGS. The memory cell array 11_1 and the memory cell array 11_2 do not share the select gate line SGD. Hereinafter, when specifying the select gate line SGD of the memory cell array 11_1, the select gate line SGD is denoted as a "select gate line SGD_1". When specifying the select gate line SGD of the memory cell array 11_2, the select gate line SGD is denoted as a "select gate line SGD_2".

The sense amplifier 26 is a circuit for writing and reading data. The sense amplifier 26 senses data read from any string unit SU of any block BLK during the read operation. The sense amplifier 26 supplies a voltage corresponding to write data to the memory cell array 11 during the write operation.

The sense amplifier 26 is connected to the memory cell array 11 via a plurality of the bit lines BL. The bit lines BL of the memory cell array 11_1 and the bit lines BL of the memory cell array 11_2 are independently connected to the sense amplifier 26. That is, the memory cell array 11_1 and the memory cell array 11_2 do not share the bit line BL. Hereinafter, when specifying the bit line BL connected to the memory cell array 11_1, the bit line BL is denoted as a "bit line BL_1". When specifying the bit line BL connected to the memory cell array 11_2, the bit line BL is denoted as a "bit line BL_2".

The bit line BL_1 is commonly connected to one NAND string NS of each string unit SU in the memory cell array 11_1. The bit line BL_2 is commonly connected to one NAND string NS of each string unit SU in the memory cell array 11_2.

The data register 27 is a register that temporarily stores data DAT. The data register 27 transmits and receives the data DAT to and from the external controller. The data register 27 is connected to the sense amplifier 26. The data register 27 includes a plurality of latch circuits. Each latch circuit temporarily stores the data DAT (write data or read data).

The column decoder 28 is a circuit that decodes the column addresses. The column decoder 28 is connected to the data register 27. The column decoder 28 selects the latch circuit in the data register 27 based on the decoding result of the column address.

1.1.2 Circuit Configuration of Memory Cell Array

Figure 2:
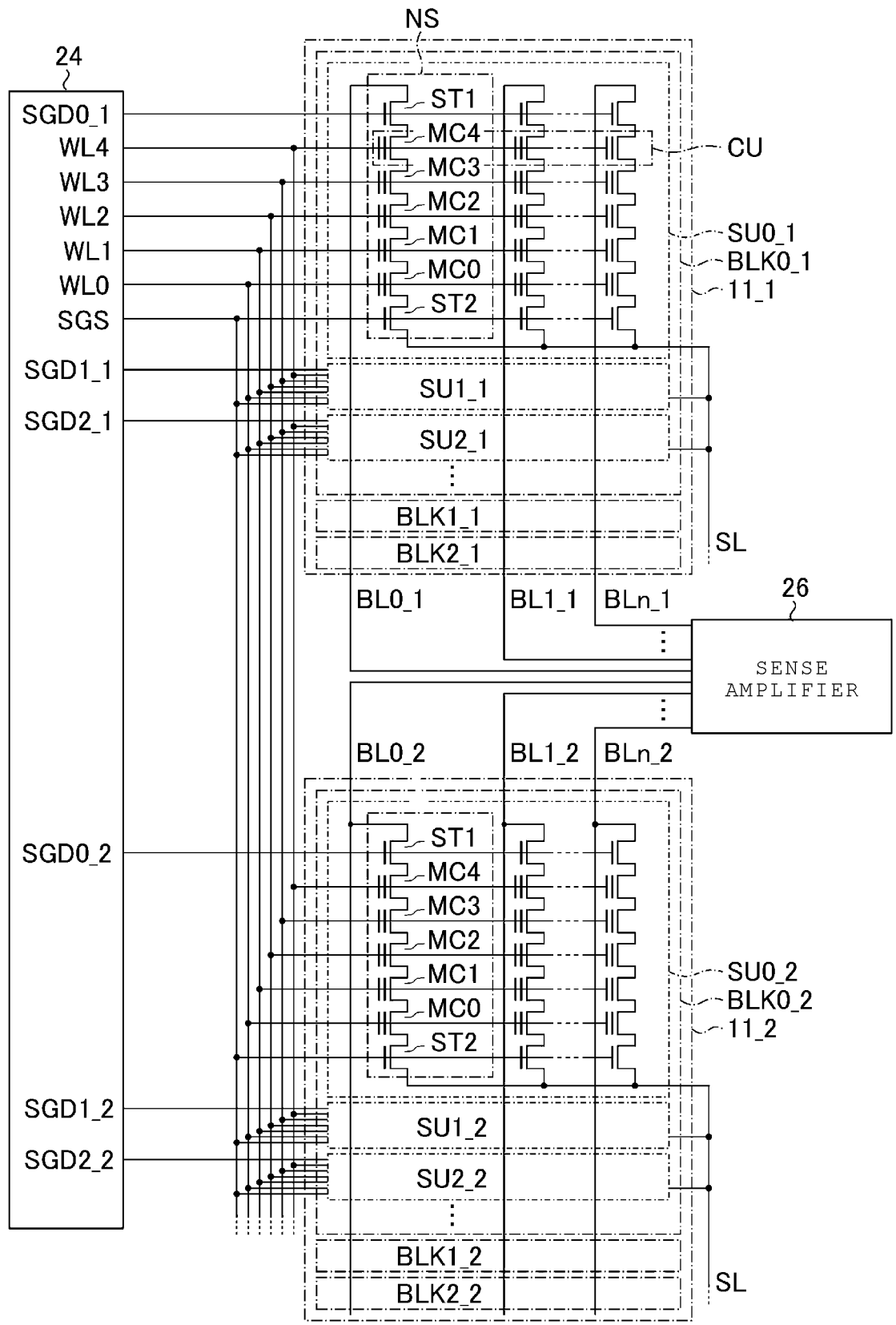
FIG. 2 is a circuit diagram of a memory cell array provided in the semiconductor memory device according to the first embodiment.

Next, an example of the circuit configuration of the memory cell arrays 11_1 and 11_2 will be described with reference to FIG. 2. FIG. 2 is a circuit diagram of the memory cell array 11.

As illustrated in FIG. 2, each string unit SU of the memory cell arrays 11_1 and 11_2 includes a plurality of the NAND strings NS.

The NAND string NS includes a plurality of memory cell transistors MC and select transistors ST1 and ST2. In the example of FIG. 2, the NAND string NS includes five memory cell transistors MC0 to MC4. It should be noted that the number of memory cell transistors MC provided in the NAND string NS can be freely selected.

The memory cell transistor MC stores data in a non-volatile manner. The memory cell transistor MC includes a control gate and a charge storage layer. The memory cell transistor MC may be a metal-oxide-nitride-oxide-silicon (MONOS) type or may be a floating gate {FG} type. The memory cell transistor of the MONOS type uses an insulating layer as the charge storage layer. That of the FG type uses a conductor layer as the charge storage layer. In the following, a case where the memory cell transistor MC is the MONOS type will be described.

The select transistors ST1 and ST2 are used to select the string unit SU during various operations. The number of select transistors ST1 and ST2 can be freely selected. One or more select transistors ST1 and ST2 may be provided in each NAND string NS.

The current paths of the memory cell transistor MC and the select transistors ST1 and ST2 in each NAND string NS are connected in series. In the example of FIG. 2, the respective current paths are connected in series in the order of the select transistor ST2, the memory cell transistors MC0, MC1, MC2, MC3, and MC4, and the select transistor ST1 from the lower side toward the upper side on paper. That is, the select transistor ST2, the memory cell transistors MC0, MC1, MC2, MC3, and MC4, and the select transistor ST1 are connected sequentially from the source line SL toward the bit line BL. The drain of the select transistor ST1 is connected to any bit line BL. The source of the select transistor ST2 is connected to the source line SL.

The control gates of a plurality of the memory cell transistors MC0 to MC4 provided in one block BLK of the memory cell array 11_1 and one block BLK of the memory cell array 11_2 are commonly connected to word lines WL0 to WL4, respectively. In the example of FIG. 2, each of the block BLK0_1 of the memory cell array 11_1 and the block BLK0_2 of the memory cell array 11_2 include a plurality of the memory cell transistors MC0. The control gates of a plurality of the memory cell transistors MC0 in the blocks BLK0_1 and BLK0_2 are commonly connected to one word line WL0. The memory cell transistors MC1 to MC4 are similarly connected to word lines WL1 to WL4, respectively. That is, the blocks BLK0_1 and BLK0_2 share the word line WL. Similarly, the blocks BLK1_1 and BLK1_2 share the word line WL. The blocks BLK2_1 and BLK2_2 share the word line WL.

In each block BLK, the gates of a plurality of the select transistors ST1 in the string unit SU are commonly connected to one select gate line SGD. In the example of FIG. 2, the block BLK0_1 of the memory cell array 11_1 includes the string units SU0_1, SU1_1, and SU2_1. The gates of a plurality of the select transistors ST1 in the string unit SU0_1 are commonly connected to a select gate line SGD0_1. Similarly, the gates of a plurality of the select transistors ST1 in the string unit SU1_1 are commonly connected to a select gate line SGD1_1. The gates of a plurality of the select transistors ST1 in the string unit SU2_1 are commonly connected to a select gate line SGD2_1. The blocks BLK1_1 and BLK2_1 are configured in the similar manner.

The block BLK0_2 of the memory cell array 11_2 includes the string units SU0_2, SU1_2, and SU2_2. The gates of a plurality of the select transistors ST1 in the string unit SU0_2 are commonly connected to a select gate line SGD0_2. The gates of a plurality of the select transistors ST1 in the string unit SU1_2 are commonly connected to a select gate line SGD1_2. The gates of a plurality of the select transistors ST1 in the string unit SU2_2 are commonly connected to a select gate line SGD2_2. The blocks BLK1_2 and BLK2_2 are similar.

The gates of a plurality of the select transistors ST2 provided in one block BLK_1 of the memory cell array 11_1 and one block BLK_2 of the memory cell array 11_2 are commonly connected to one select gate line SGS. In the example of FIG. 2, the blocks BLK0_1 and BLK0_2 each include a plurality of the select transistors ST2. The gates of a plurality of the select transistors ST2 in the blocks BLK0_1 and BLK0_2 are commonly connected to one select gate line SGS. That is, the blocks BLK0_1 and BLK0_2 share the select gate line SGS. Similarly, the blocks BLK1_1 and BLK1_2 share the select gate line SGS. The blocks BLK2_1 and BLK2_2 share the select gate line SGS. It should be noted that the memory cell array 11_1 and the memory cell array 11_2 may not share the select gate line SGS. In other words, the array chips 10_1 and 10_2 may be connected to different select gate lines SGS. In the example of FIG. 2, the blocks BLK0_1 and BLK0_2 may not share the select gate line SGS. Similarly, the blocks BLK1_1 and BLK1_2 may not share the select gate line SGS. The blocks BLK2_1 and BLK2_2 may not share the select gate line SGS. Similarly to the select gate line SGD, different select gate lines SGS may be provided for each string unit SU.

The word lines WL0 to WL4, the select gate lines SGS, and the select gate lines SGD0_1 to SGD2_1 and SGD0_2 to 2_2 are connected to the row decoder 25, respectively.

The drains of a plurality of the select transistors ST1 in the string unit SU are connected to different bit lines BL. In the example of FIG. 2, each string unit SU_1 in the memory cell array 11_1 includes (n+1) (n is an integer of 0 or more) NAND strings NS. That is, the string unit SU_1 includes the (n+1) select transistors ST1. The drains of the (n+1) select transistors ST1 in the string unit SU_1 are connected to (n+1) bit lines BL0_1 to BLn_1, respectively. Similarly, each string unit SU_2 in the memory cell array 11_2 includes the (n+1) select transistors ST1. The drains of the (n+1) select transistors ST1 in the string unit SU_2 are connected to (n+1) bit lines BL0_2 to BLn_2, respectively.

The bit lines BL0_1 to BLn_1 and BL0_2 to BLn_2 are connected to the sense amplifier 26, respectively.

The source line SL is shared, for example, between a plurality of blocks BLK of the memory cell arrays 11_1 and 11_2.

Hereinafter, the set of a plurality of the memory cell transistors MC connected to one word line WL in one string unit SU is denoted as a "cell unit CU". For example, when the memory cell transistor MC stores 1-bit data, the storage capacity of the cell unit CU is defined as "1 page data". The cell unit CU may have a storage capacity of two page data or more based on the number of bits of the data stored in each memory cell transistor MC.

In the present embodiment, the two cell units CU of the two memory cell arrays 11_1 and 11_2 sharing the word line WL can be selected concurrently during the write operation and the read operation. For example, when the word line WL0 and the select gate lines SGD0_1 and SGD0_2 corresponding to the blocks BLK0_1 and BLK0_2 are selected, the cell unit CU including the memory cell transistor MC0 of the string unit SU0_1 and the cell unit CU including the memory cell transistor MC0 of the string unit SU0_2 are selected. Here, voltage is applied from the sense amplifier 26 to the cell unit CU of the string unit SU0_1 via the bit line BL_1. Voltage is applied from the sense amplifier 26 to the cell unit CU of the string unit SU0_2 via the bit line BL_2. Therefore, during the write operation or the read operation, page data of the two cell units CU can be collectively processed.

Hereinafter, the read operation and the write operation during which one cell unit CU of the memory cell arrays 11_1 and 11_2 is selected are denoted as a "1CU read operation" and a "1CU write operation", respectively. The read operation and the write operation during which the cell unit CU of the memory cell array 11_1 and the cell unit CU of the memory cell array 11_2 sharing the word line WL are selected are denoted as a "2CU read operation" and a "2CU write operation", respectively.

1.1.3 Arrangement of Chips

Figure 3:
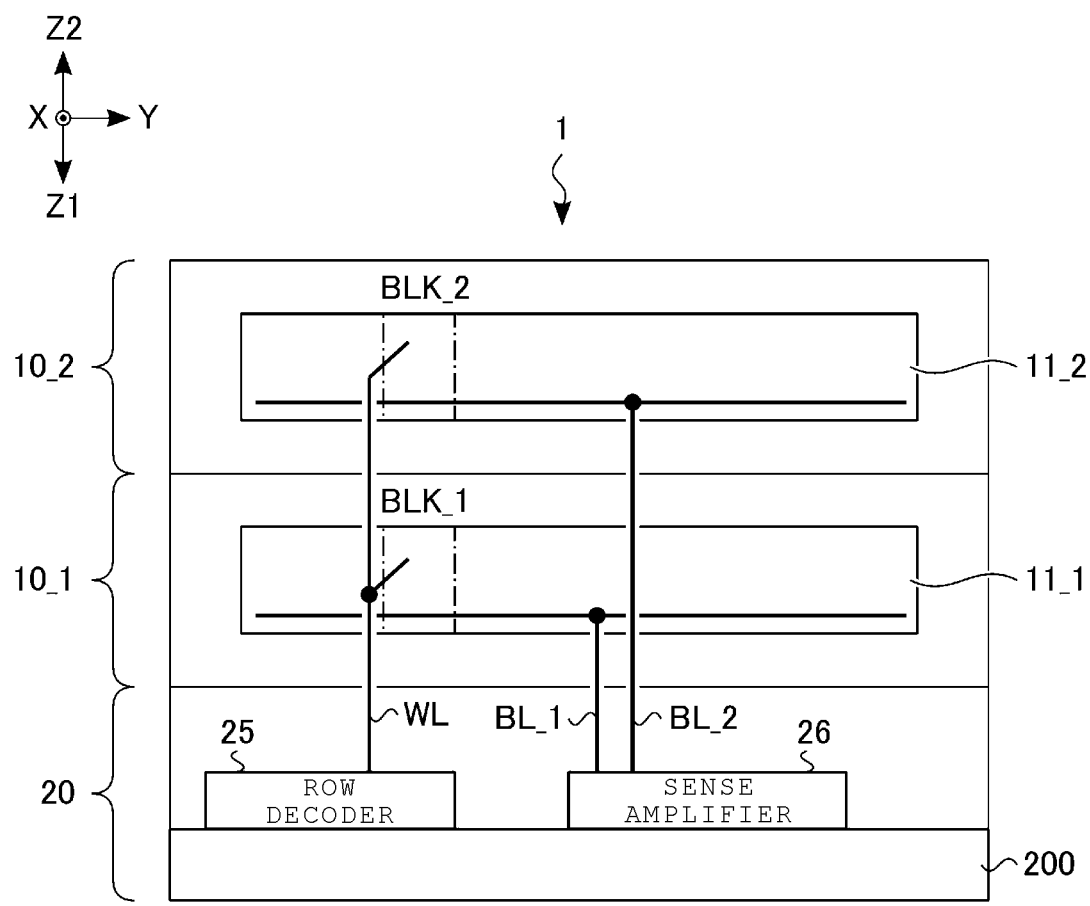
FIG. 3 illustrates a cross-sectional view of an arrangement of a circuit chip and array chips provided in the semiconductor memory device according to the first embodiment.

Next, an example of an arrangement of each chip will be described with reference to FIG. 3. FIG. 3 illustrates a cross-sectional view of the arrangement of the array chips 10_1 and 10_2 and the circuit chip 20. It should be noted that, in the example of FIG. 3, for the simplification of description, one word line WL and bit lines BL_1 and BL_2 are illustrated. The select gate lines SGD and SGS and the source line SL are omitted.

Hereinafter, the direction substantially parallel to the surface of a semiconductor substrate 200 in the circuit chip 20 is defined as an X direction. The direction intersecting with the X direction and substantially parallel to the surface of the semiconductor substrate 200 is defined as a Y direction. The direction intersecting with the X direction and the Y direction and substantially perpendicular to the surface of the semiconductor substrate 200 is denoted as a Z direction. When the Z direction is further specified, the direction from the array chip 10 to the circuit chip 20 is denoted as a Z1 direction, and the direction facing the Z1 direction is denoted as a Z2 direction.

As illustrated in FIG. 3, the array chip 10_1 is bonded on the circuit chip 20 toward the Z2 direction. The array chip 10_2 is bonded on the array chip 10_1. That is, the circuit chip 20, the array chip 10_1, and the array chip 10_2 are stacked sequentially toward the Z2 direction. In other words, the array chip 10_2 is bonded on the surface of the array chip 10_1 facing the Z2 direction, and the circuit chip 20 is bonded on the surface of the array chip 10_1 facing the Z1 direction.

The row decoder 25 and the sense amplifier 26 are provided on the semiconductor substrate 200 of the circuit chip 20.

The array chips 10_1 and 10_2 are provided with the memory cell arrays 11_1 and 11_2, respectively.

For example, the block BLK_1 of the memory cell array 11_1 and the block BLK_2 of the memory cell array 11_2 aligned in the Z direction share the word line WL.

The block BLK_1 of the memory cell array 11_1 is connected to the sense amplifier 26 via the bit line BL_1. The block BLK_2 of the memory cell array 11_2 is connected to the sense amplifier 26 via the bit line BL_2.

1.1.4 Arrangement of Memory Cell Array

Figure 4:
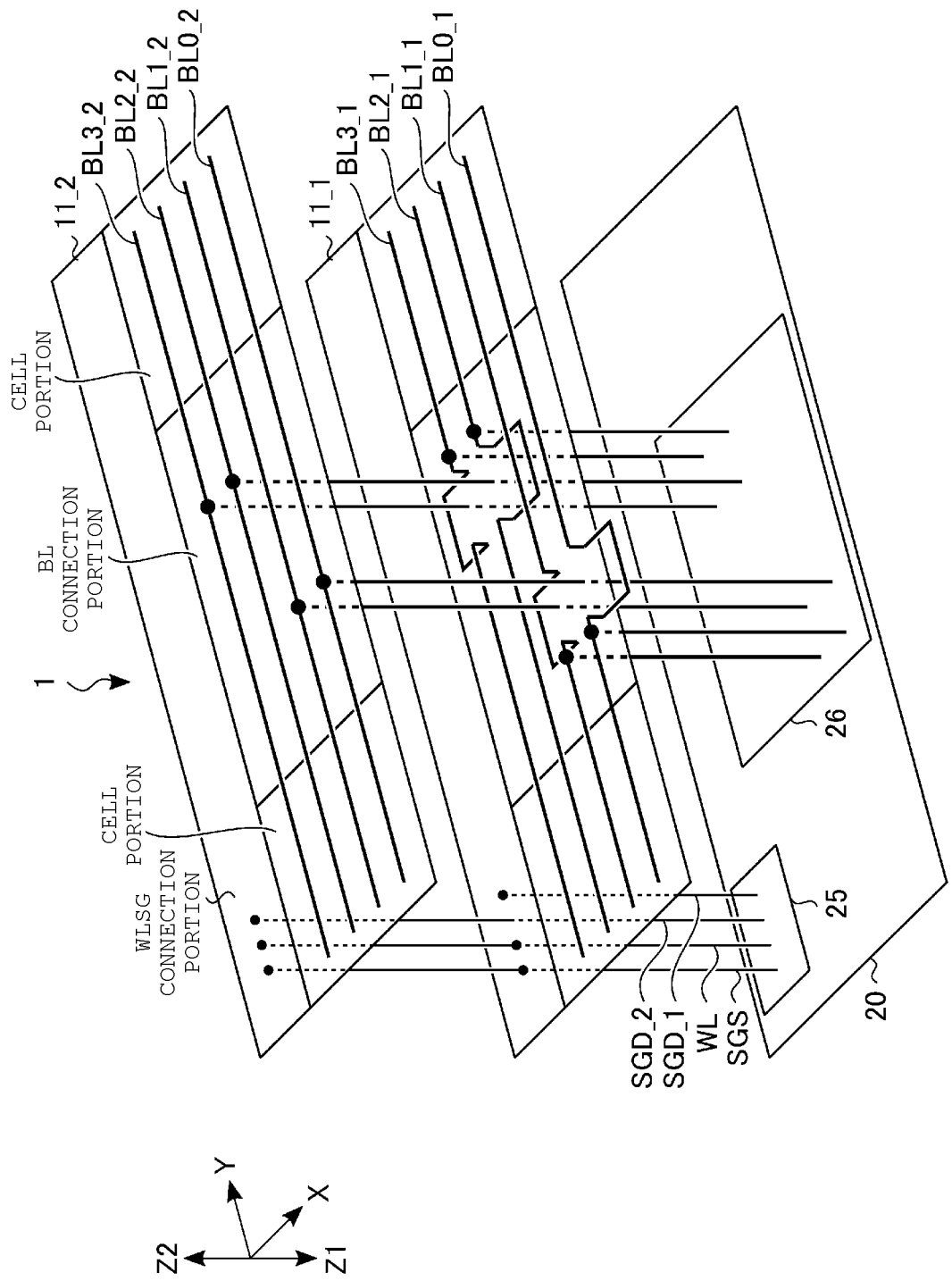
FIG. 4 illustrates a perspective view of an arrangement of memory cell arrays and the circuit chip provided in the semiconductor memory device according to the first embodiment.

Next, an example of an arrangement of the memory cell array 11 will be described with reference to FIG. 4. FIG. 4 illustrates a perspective view of the arrangement of the memory cell arrays 11_1 and 11_2 and the circuit chip 20. It should be noted that, in the example of FIG. 4, for the simplification of description, one word line WL, the select gate lines SGD_1 and SGD_2, and the select gate line SGS are illustrated. The source line SL is omitted.

As illustrated in FIG. 4, each of the memory cell arrays 11_1 and 11_2 include a cell portion, a WLSG connection portion, and a BL connection portion.

The cell portion is a region in which the memory cell transistors MC are provided.

The WLSG connection portion is a region where contact plugs, wirings, and the like are provided for connecting the word lines WL and the select gate lines SGD and SGS in the memory cell array 11, and the row decoder 25. The word lines WL of the memory cell arrays 11_1 and 11_2 are commonly connected to the row decoder 25 of the circuit chip 20 via the respective WLSG connection portions. More specifically, the word line WL provided in the memory cell array 11_1 is connected to the row decoder 25 via the WLSG connection portion of the memory cell array 11_1. The word lines WL provided in the memory cell array 11_2 are connected to the row decoder 25 via the WLSG connection portion of the memory cell array 11_2 and the WLSG connection portion of the memory cell array 11_1. For example, at the WLSG connection portion of the memory cell array 11_1, the word lines WL provided in the memory cell array 11_1 and the word lines WL provided in the memory cell array 11_2 are connected to each other. As with the word lines WL, the select gate lines SGS of the memory cell arrays 11_1 and 11_2 are commonly connected to the row decoder 25 via the respective WLSG connection portions. The select gate line SGD_1 of the memory cell array 11_1 is connected to the row decoder 25 via the WLSG connection portion of the memory cell array 11_1. The select gate line SGD_2 of the memory cell array 11_2 is connected to the row decoder 25 via the WLSG connection portion of the memory cell array 11_2 and the WLSG connection portion of the memory cell array 11_1.

The BL connection portion is a region in which contact plugs, wirings, and the like are provided for connecting a plurality of the bit lines BL and the sense amplifier 26. The bit line BL_1 of the memory cell array 11_1 is connected to the sense amplifier 26 via the BL connection portion of the memory cell array 11_1. The bit line BL_2 of the memory cell array 11_2 is connected to the sense amplifier 26 via the BL connection portion of the memory cell array 11_2 and the BL connection portion of the memory cell array 11_1.

For example, the WLSG connection portion is provided at the end of the memory cell array 11 in the X direction. The cell portion is, for example, divided into two in the Y direction. The BL connection portion is provided between the two cell portions aligned in the Y direction. It should be noted that any applicable arrangement of the cell portion, the WLSG connection portion, and the BL connection portion may be used. For example, the BL connection portion may be provided at the end of the memory cell array 11 in the Y direction. A plurality of the BL connection portions may be provided in units of one or a plurality of the bit lines BL. Here, a plurality of the BL connection portions may be scattered in the cell portion. For example, the WLSG connection portions may be provided at both ends of the memory cell array 11 in the X direction. The cell portion may be divided into two in the X direction, and the WLSG connection portion may be provided between the two cell portions aligned in the X direction.

Each bit line BL in the memory cell array 11 extends in the Y direction. The two cell units aligned in the Y direction share the bit line BL. For example, each of the bit lines BL0_2 to BL3_2 of the memory cell array 11_2 is connected to the contact plug extending in the Z direction at the BL connection portion of the memory cell array 11_2. The contact plug is connected to the sense amplifier 26 via the BL connection portion of the memory cell array 11_1.

For example, each of the bit lines BL0_1 to BL3_1 of the memory cell array 11_1 is connected to a contact plug extending in the Z direction at the BL connection portion of the memory cell array 11_1. Each of the bit lines BL0_1 to BL3_1 is connected to the sense amplifier 26 via the contact plug. In the example of FIG. 4, each of the bit lines BL0_1 to BL3_1 is located to bypass the contact plugs connected to the bit lines BL0_2 to BL3_2 at the BL connection portion. It should be noted that the arrangement of the bit lines BL can be freely selected.

1.1.5 Planar Configuration of Cell Portion and WLSG Connection Portion

Figure 5:
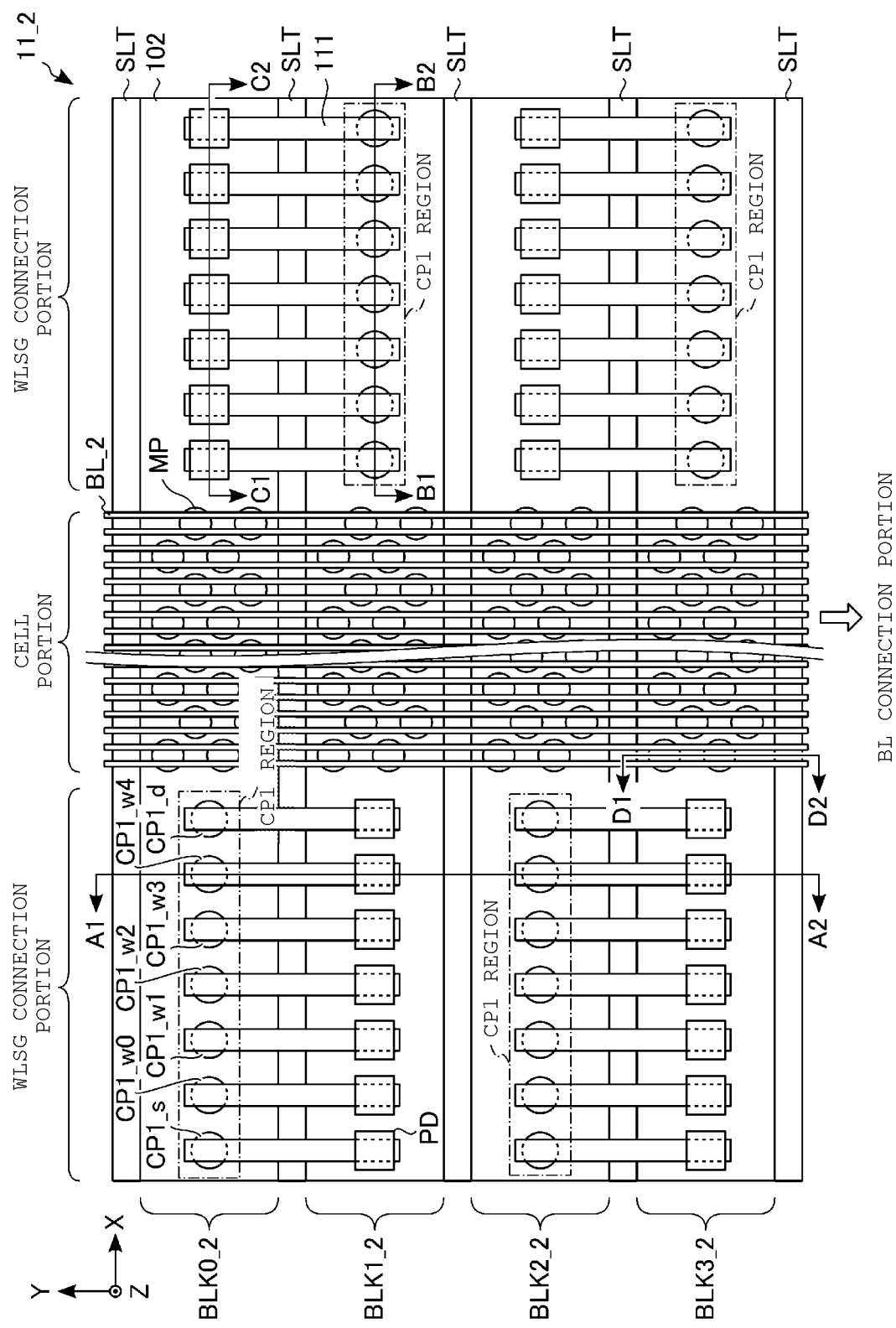
FIG. 5 illustrates a plan view of a cell portion and a WLSG connection portion of the memory cell array provided in the semiconductor memory device according to the first embodiment.
Figure 6:
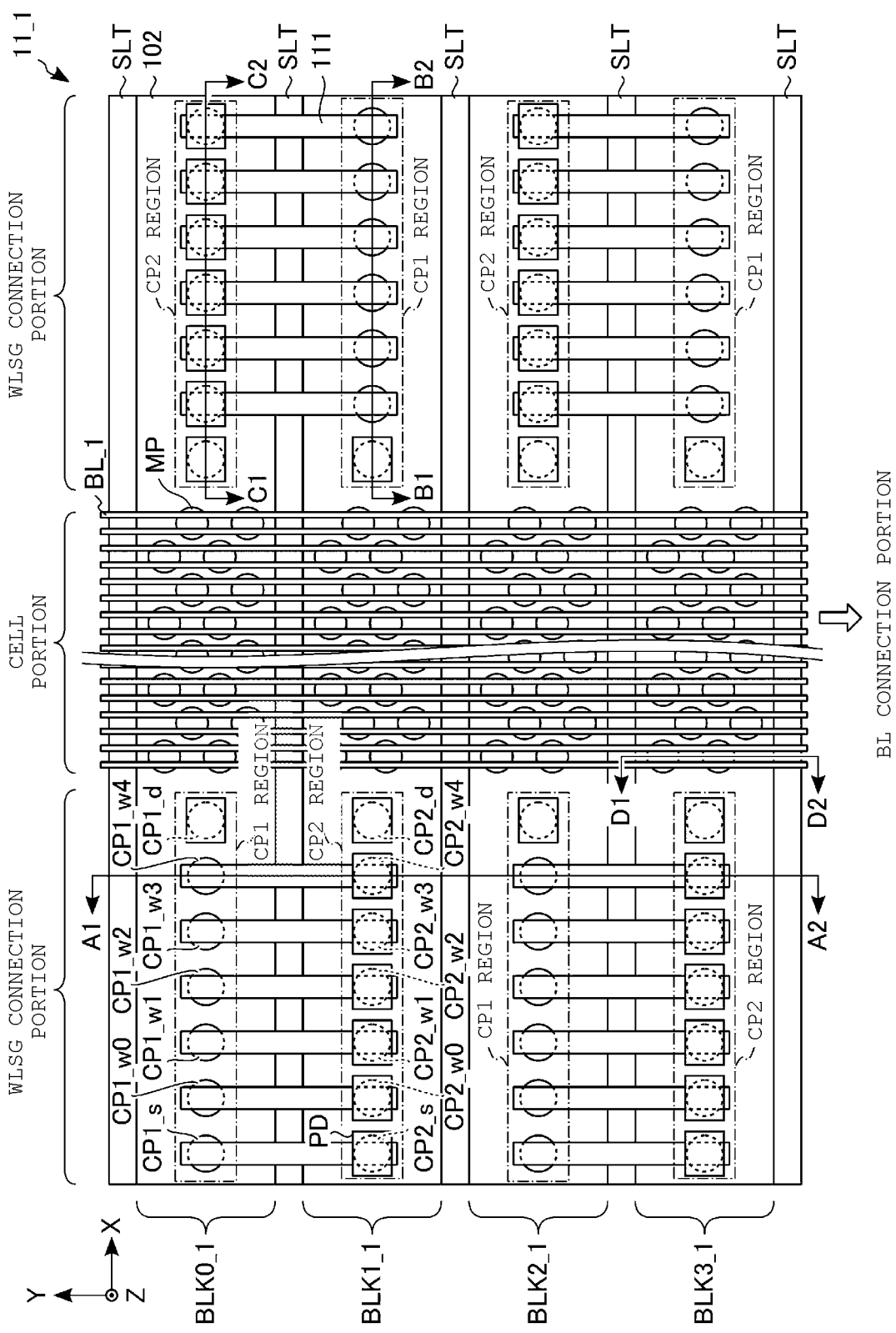
FIG. 6 illustrates a plan view of a cell portion and a WLSG connection portion of the memory cell array provided in the semiconductor memory device according to the first embodiment.

Next, an example of the configuration of the cell portion and the WLSG connection portion will be described with reference to FIGS. 5 and 6. FIG. 5 illustrates a plan view of the cell portion and the WLSG connection portion of the memory cell array 11_2. FIG. 6 illustrates a plan view of the cell portion and the WLSG connection portion of the memory cell array 11_1. It should be noted that, in the examples of FIGS. 5 and 6, for the simplification of description, a case where one cell portion includes the four blocks BLK0 to BLK3 and each block BLK includes one string unit SU will be described. In the examples of FIGS. 5 and 6, the insulating layer is omitted.

First, a planar configuration of the cell portion and the WLSG connection portion of the memory cell array 11_2 will be described.

As illustrated in FIG. 5, the four blocks BLK0_2 to BLK3_2 are aligned in the Y direction from the upper side toward the lower side on paper. In each block BLK, a plurality of wiring layers 102 are stacked to be separated in the Z direction. In the example of FIG. 5, seven wiring layers 102 are stacked. Each wiring layer 102 functions as the select gate line SGS, the word lines WL0 to WL4, and the select gate line SGD, respectively. Each wiring layer 102 extends in the X direction. Slits SLT are provided to the two side surfaces of each wiring layer 102 facing in the Y direction. The slit SLT extends in the X and Z directions. The slit SLT isolates the wiring layer 102 for each block BLK.

A plurality of memory pillars MP are provided in the cell portion. The memory pillar MP corresponds to the NAND string NS. Details of the structure of the memory pillar MP will be described below. The memory pillar MP has a substantially cylindrical shape and extends in the Z direction. The memory pillar MP penetrates (passes through) a plurality of the wiring layers 102 stacked in the Z direction.

In the example of FIG. 5, a plurality of the memory pillars MP in the block BLK has a staggered arrangement in two columns toward the X direction. It should be noted that the arrangement of the memory pillars MP can be freely designed. The arrangement of the memory pillars MP may be, for example, a staggered arrangement of eight or more columns. The arrangement of the memory pillars MP may be, for example, an arrangement corresponding to a honeycomb structure and may not be a staggered arrangement.

The plurality of bit lines BL_2 are aligned in the X direction above the memory pillar MP. The bit line BL_2 extends in the Y direction. The memory pillar MP of each block BLK is electrically connected to any one of the bit lines BL_2.

The WLSG connection portion of the memory cell array 11_2 includes a CP1 region. In the example of FIG. 5, in the case of the blocks BLK0_2 and BLK2_2, the CP1 region is provided in the WLSG connection portion on the left side on paper. In the case of the blocks BLK1_2 and BLK3_2, the CP1 region is provided in the WLSG connection portion on the right side on paper.

The CP1 region is a region in which a plurality of contact plugs CP1 are provided. The contact plug CP1 extends in the Z direction. The contact plug CP1 is electrically connected to any one of the wiring layers 102 stacked to be separated in the Z direction. The contact plug CP1 is not electrically connected to other wiring layers 102. In the example of FIG. 5, seven contact plugs CP1 are provided in one CP1 region. The seven contact plugs CP1 are respectively connected to the seven-layered wiring layers 102 to be separated in the Z direction. Hereinafter, when specifying the contact plug CP1 connected to the wiring layer 102 corresponding to the word line WL0, the contact plug CP1 is denoted as a "contact plug CP1_w0". When specifying the contact plug CP1 connected to the wiring layer 102 corresponding to the word line WL1, the contact plug CP1 is denoted as a "contact plug CP1_w1". When specifying the contact plug CP1 connected to the wiring layer 102 corresponding to the word line WL2, the contact plug CP1 is denoted as a "contact plug CP1_w2". When specifying the contact plug CP1 connected to the wiring layer 102 corresponding to the word line WL3, the contact plug CP1 is denoted as a "contact plug CP1_w3". When specifying the contact plug CP1 connected to the wiring layer 102 corresponding to the word line WL4, the contact plug CP1 is denoted as a "contact plug CP1_w4". When specifying the contact plug CP1 connected to the wiring layer 102 corresponding to the select gate line SGD, the contact plug CP1 is denoted as a "contact plug CP1_d". When specifying the contact plug CP1 connected to the wiring layer 102 corresponding to the select gate line SGS, the contact plug CP1 is denoted as a "contact plug CP1_s". In the example of FIG. 5, the contact plugs CP1_s, CP1_w0, CP1_w1, CP1_w2, CP1_w3, CP1_w4, and CP1_d are located sequentially from the end of the memory cell array 11_2 in the X direction toward the cell portion. It should be noted that the arrangement of the contact plugs CP1 in each CP1 region can be freely selected. For example, the arrangement of the contact plugs CP1 may be located in two columns along the X direction.

A wiring layer 111 is provided on the contact plug CP1. The wiring layer 111 extends from the connection position with the contact plug CP1 to the adjacent block BLK in the Y direction. More specifically, the wiring layer 111 provided on the contact plug CP1 of the block BLK0_2 extends to the block BLK1_2. The wiring layer 111 provided on the contact plug CP1 of the block BLK1_2 extends to the block BLK0_2. The wiring layer 111 provided on the contact plug CP1 of the block BLK2_2 extends to the block BLK3_2. The wiring layer 111 provided on the contact plug CP1 of the block BLK3_2 extends to the block BLK2_2.

An electrode pad PD is provided above the end of the wiring layer 111. More specifically, the wiring layer 111 has one end connected to contact plug CP1 and the other end electrically connected to the electrode pad PD. The electrode pad PD is used for electrical connection with other chips.

Next, a planar configuration of the memory cell array 11_1 will be described. In the following description, differences from the planar configuration of the memory cell array 11_2 will be mainly described.

As illustrated in FIG. 6, the configuration of the cell portion is similar to that of the memory cell array 11_2. The plurality of bit lines BL_1 are aligned in the X direction above the memory pillars MP. The bit line BL_1 extends in the Y direction. The memory pillar MP of each block BLK is electrically connected to any one of the bit lines BL_1.

The WLSG connection portion of the memory cell array 11_1 includes the CP1 region and a CP2 region. In the example of FIG. 6, in the case of the blocks BLK0_1 and BLK2_1, the CP1 region is provided in the WLSG connection portion on the left side on paper, and the CP2 region is provided in the WLSG connection portion on the right side on paper. In the case of the blocks BLK1_1 and BLK3_1, the CP1 region is provided in the WLSG connection portion on the right side on paper, and the CP2 region is provided in the WLSG connection portion on the left side on paper.

The arrangement of the contact plugs CP1 in the CP1 region is the same as that in the memory cell array 11_2. For example, the CP1 region of the memory cell array 11_1 is located above the CP1 region of the memory cell array 11_2 in the Z direction. For example, the contact plug CP1_s of the memory cell array 11_1 is located above the contact plug CP1_s of the memory cell array 11_2 in the Z direction. The same applies to other contact plugs CP1_w0, CP1_w1, CP1_w2, CP1_w3, CP1_w4, and CP1_d.

The CP2 region is a region in which a plurality of contact plugs CP2 are provided. The contact plug CP2 extends in the Z direction. The contact plug CP2 is used for electrical connection to other array chips. For example, the contact plug CP2 of the memory cell array 11_1 is located above the electrode pad PD electrically connected to the contact plug CP1 of the memory cell array 11_2 in the Z direction. The contact plug CP2 penetrates the memory cell array 11_1. The contact plug CP2 is not electrically connected to the wiring layer 102 of the memory cell array 11_1. The contact plug CP2 is electrically connected to the contact plug CP1 of the memory cell array 11_2 via the electrode pad PD and wiring layer 111 of the array chip 10_2 described with reference to FIG. 5.

More specifically, for example, the contact plug CP2 provided in the CP2 region of the block BLK0_1 is electrically connected to the contact plug CP1 provided in the CP1 region of the block BLK1_2 of the memory cell array 11_2. The contact plug CP2 provided in the CP2 region of the block BLK1_1 is electrically connected to the contact plug CP1 provided in the CP1 region of the block BLK0_2 of the memory cell array 11_2. The contact plug CP2 provided in the CP2 region of the block BLK2_1 is electrically connected to the contact plug CP1 provided in the CP1 region of the block BLK3_2 of the memory cell array 11_2. The contact plug CP2 provided in the CP2 region of the block BLK3_1 is electrically connected to the contact plug CP1 provided in the CP1 region of the block BLK2_2 of the memory cell array 11_2.

In the example of FIG. 6, seven contact plugs CP2 are provided in one CP2 region. The seven contact plugs CP2 respectively correspond to the seven contact plugs CP1 in one CP1 region of the memory cell array 11_2. Hereinafter, when specifying the contact plugs CP2 connected to the contact plugs CP1_w0, CP1_w1, CP1_w2, CP1_w3, and CP1_w4 of the memory cell array 11_2, the contact plugs CP2 are denoted as the contact plugs CP2_w0, CP2_w1, CP2_w2, CP2_w3, and CP2_w4, respectively. When specifying the contact plugs CP2 connected to the contact plugs CP1_d and CP1_s of the memory cell array 11_2, the contact plugs CP2 are denoted as contact plugs CP2_d and CP2_s, respectively.

The wiring layer 111 is provided on the contact plugs CP1 and CP2. The contact plugs CP1_w0 to CP1_w4 and CP1_s are connected to the contact plugs CP2_w0 to CP2_w4 and CP2_s, respectively, of the adjacent block BLK via the wiring layer 111. Different wiring layers 111 are provided on each of the contact plug CP1_d and the contact plug CP2_d. That is, the contact plug CP1_d and the contact plug CP2_d are not electrically connected.

More specifically, for example, the contact plugs CP1_w0 to CP1_w4 and CP1_s provided in the block BLK0_1 are electrically connected to the contact plugs CP2_w0 to CP2_w4 and CP2_s provided in the block BLK1_1, respectively. The contact plugs CP1_w0 to CP1_w4 and CP1_s provided in the block BLK1_1 are electrically connected to the contact plugs CP2_w0 to CP2_w4 and CP2_s provided in the block BLK0_1, respectively. The contact plugs CP1_w0 to CP1_w4 and CP1_s provided in the block BLK2_1 are electrically connected to the contact plugs CP2_w0 to CP2_w4 and CP2_s provided in the block BLK3_1, respectively. The contact plugs CP1_w0 to CP1_w4 and CP1_s provided in the block BLK3_1 are electrically connected to the contact plug CP2 provided in the block BLK2_1.

That is, the word lines WL0 to WL4 and the select gate line SGS of the block BLK0_1 of the memory cell array 11_1 are electrically connected to the word lines WL0 to WL4 and the select gate line SGS of the block BLK0_2 of the memory cell array 11_2, respectively. The select gate line SGD of the block BLK0_1 of the memory cell array 11_1 is not electrically connected to the select gate line SGD of the block BLK0_2 of the memory cell array 11_2. The same applies to other blocks BLK.

Similarly to the memory cell array 11_2, the electrode pad PD is provided above the wiring layer 111. The wiring layer 111 is electrically connected to the electrode pad PD.

1.1.6 Cross-Sectional Configuration of Cell Portion and WLSG Connection Portion

Next, cross-sectional configurations of the cell portion and the WLSG connection portion will be described.

1.1.6.1 Configuration of WLSG Connection Portion

Figure 7:
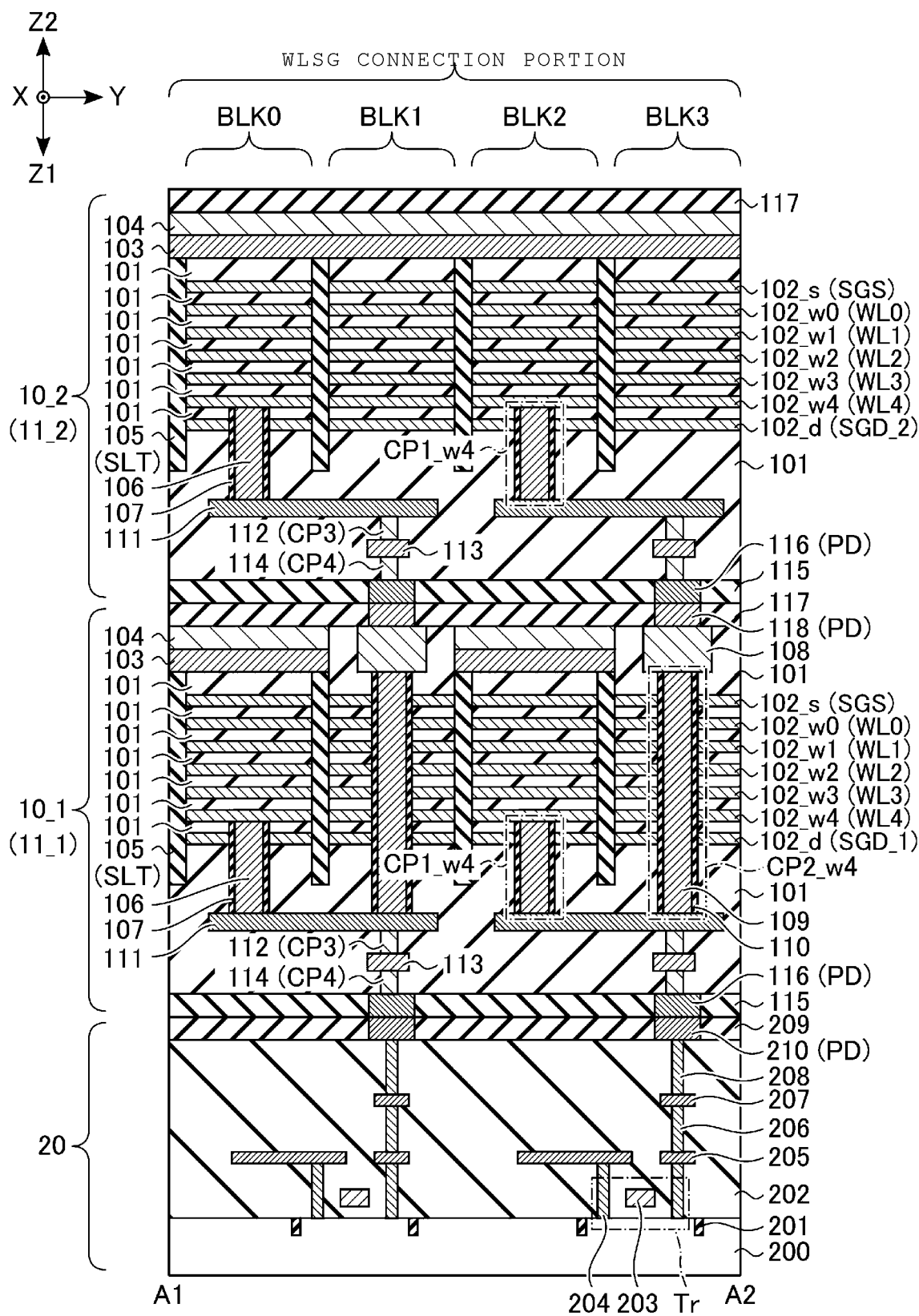
FIG. 7 illustrates a cross-sectional view taken along line A1-A2 of FIGS. 5 and 6.

First, an example of the configuration of the WLSG connection portion will be described with reference to FIG. 7. FIG. 7 illustrates a cross-sectional view taken along line A1-A2 of FIGS. 5 and 6.

As illustrated in FIG. 7, the semiconductor memory device 1 has a bonded structure in which the array chips 10_1 and 10_2 and the circuit chip 20 are bonded. The respective chips are electrically connected to each other via the electrode pads PD provided on the respective chips.

First, the internal configuration of the array chip 10_1 will be described.

The array chip 10_1 includes the memory cell array 11_1 and various wiring layers for connecting to other chips.

The array chip 10_1 includes insulating layers 101, 105, 107, 110, 115, and 117, wiring layers 102, 104, 111, and 113, a semiconductor layer 103, and conductors 106, 108, 109, 112, 114, 116, and 118.

In the memory cell array 11_1, a plurality of the insulating layers 101 and a plurality of the wiring layers 102 are alternately stacked one by one. In the example of FIG. 7, the seven wiring layers 102 functioning as the select gate line SGS, the word lines WL0 to WL4, and the select gate line SGD_1 are stacked sequentially toward the Z1 direction. In the following, wiring layers 102_w0, 102_w1, 102_w2, 102_w3, and 102_w4 are used to specify the wiring layers 102 functioning as the word lines WL0, WL1, WL2, WL3, and WL4, respectively. When specifying the wiring layers 102 functioning as the select gate lines SGD and SGS, the wiring layers 102 are denoted as wiring layers 102_d and 102_s, respectively.

The insulating layer 101 may contain, for example, silicon oxide (SiO). The wiring layer 102 contains a conductive material. The conductive material may include a metallic material, an n-type semiconductor, or a p-type semiconductor. As the conductive material of the wiring layer 102, for example, a stacked structure of titanium nitride (TiN)/tungsten (W) is used. Here, TiN covers W. It should be noted that the wiring layer 102 may contain a high dielectric constant material such as aluminum oxide (AlO). Here, the high dielectric constant material covers the conductive material.

The plurality of wiring layers 102 are isolated for each block BLK by the slits SLT extending in the X direction. The insulating layer 105 is buried in the slit SLT. The insulating layer 105 may contain SiO.

The semiconductor layer 103 is provided above the wiring layer 102_s in the Z2 direction. The insulating layer 101 is provided between the wiring layer 102 and the semiconductor layer 103. The semiconductor layer 103 functions as the source line SL. The wiring layer 104 is provided on the semiconductor layer 103 in the Z2 direction. The wiring layer 104 is used as a wiring layer for electrically connecting the semiconductor layer 103 and other chips. The wiring layer 104 contains a conductive material. The conductive material may include a metallic material, an n-type semiconductors, or a p-type semiconductor.

The contact plug CP1 is provided on the upper surface of each wiring layer 102 facing the Z1 direction. The contact plug CP1 has, for example, a cylindrical shape. The contact plug CP1 includes the conductor 106 and the insulating layer 107. The conductor 106 has, for example, a cylindrical shape. One end of the conductor 106 is in contact with any one of the wiring layers 102. The insulating layer 107 covers the side surface (periphery) of the conductor 106. The insulating layer 107 has, for example, a cylindrical shape. The side surface of the conductor 106 is not electrically connected to other wiring layers 102 by the insulating layer 107. The conductor 106 may contain W, Cu (copper), Al (aluminum), or the like. The insulating layer 107 may contain SiO.

In the example of FIG. 7, the contact plug CP1_w4 is provided on the wiring layer 102_w4 in the Z1 direction. The contact plug CP1_w4 passes through (penetrates) the wiring layer 102_d. The contact plug CP1_w4 is electrically connected to the wiring layer 102_w4 and not electrically connected to the wiring layer 102_d.

The contact plug CP2 penetrating a plurality of the wiring layers 102 is provided. The contact plug CP2 has, for example, a cylindrical shape. The contact plug CP2 includes the conductor 109 and the insulating layer 110. The conductor 109 has, for example, a cylindrical shape. The insulating layer 110 covers the side surface (periphery) of the conductor 109. The insulating layer 110 has, for example, a cylindrical shape. The conductor 109 is not electrically connected to the wiring layer 102 by the insulating layer 110.

The semiconductor layer 103 and the wiring layer 104 are not provided in the CP2 region where the contact plug CP2 is provided. The conductor 108 is provided above the wiring layer 102_s in the Z2 direction. The insulating layer 101 is provided between the wiring layer 102 and the conductor 108. The conductor 108 is in contact with (electrically connected to) one end of the contact plug CP2.

The wiring layer 111 is provided above the wiring layer 102_d in the Z1 direction. The wiring layer 111 extends in the Y direction. The insulating layer 101 is provided between the wiring layer 102 and the wiring layer 111. The wiring layer 111 contains a conductive material. The conductive material may include W, Cu or Al, or the like.

In the wiring layer 111, the end of the contact plug CP1 in the Z1 direction and the end of the contact plug CP2 in the Z1 direction provided in the adjacent block BLK in the Y direction are (electrically) connected. The contact plugs CP1 and CP2 connected to the wiring layer 111 are aligned along the Y direction. In the example of FIG. 7, the contact plug CP1_*w*4 provided in the block BLK0_1 and the contact plug CP2_*w*4 provided in the block BLK1_1 are connected to the wiring layer 111 located to extend between the blocks BLK0_1 and BLK1_1. The contact plug CP1_*w*4 provided in the block BLK2_1 and the contact plug CP2_*w*4 provided in the block BLK3_1 are connected to the wiring layer 111 located to straddle the blocks BLK2_1 and BLK3_1.

The conductor 112 is provided on the wiring layer 111 in the Z1 direction. The conductor 112 has, for example, a cylindrical shape. The conductor 112 functions as a contact plug CP3. The conductor 112 may include a metallic material such as W, Al, or Cu.

The wiring layer 113 is provided on the contact plug CP3 in the Z1 direction. The wiring layer 113 may contain a metal material such as W, Al, or Cu.

The conductor 114 is provided on the wiring layer 113 in the Z1 direction. The conductor 114 has, for example, a cylindrical shape. The conductor 114 functions as a contact plug CP4. The conductor 114 may contain a metallic material such as W, Al, or Cu.

The insulating layer 115 is provided on the insulating layer 101 in the Z1 direction. The insulating layer 115 may contain SiO.

The plurality of conductors 116 are provided in the same layer as the insulating layer 115. The conductor 116 functions as the electrode pad PD. For example, one conductor 116 is provided on one contact plug CP4. The conductor 116 may contain Cu. It should be noted that, although the case where one wiring layer 113 is provided between the conductor 116 and the wiring layer 111 has been described in the example of FIG. 7, the present embodiment is not limited thereto. The number of wiring layers provided between the conductor 116 and the wiring layer 111 can be freely selected.

The insulating layer 117 is provided on the wiring layer 104, the insulating layer 101, and the conductor 108 in the Z2 direction. The insulating layer 117 may contain SiO.

The plurality of conductors 118 are provided in the same layer as the insulating layer 117. The conductor 118 functions as the electrode pad PD. For example, one conductor 118 is provided over one conductor 108. The conductor 118 may contain Cu.

Next, the internal configuration of the array chip 10_2 will be described. In the following description, differences from the array chip 10_1 will be mainly described.

In the array chip 10_2, the contact plug CP2, the conductor 108, and the conductor 118 described in the configuration of the array chip 10_1 are omitted. Other configurations are the same as those of the array chip 10_1. The conductor 116 of the array chip 10_2 is connected to the conductor 118 of the array chip 10_1.

For example, the wiring layer 102 of the memory cell array 11_2 is electrically connected to the wiring layer 102 of the memory cell array 11_1 via the contact plug CP1, the wiring layer 111, the contact plug CP3, the wiring layer 113, the contact plug CP4, and the conductor 116 of the array chip 10_2 and the conductor 118, the conductor 108, the contact plug CP2, the wiring layer 111, and the contact plug CP1 of the array chip 10_1.

In the example of FIG. 7, the wiring layer 102_*w*4 of the block BLK0_2 of the memory cell array 11_2 and the wiring layer 102_*w*4 of the block BLK0_1 of the memory cell array 11_1 are electrically connected. In other words, the word line WL4 of the memory cell array 11_2 and the word line WL4 of the memory cell array 11_1 located above in the Z1 direction are electrically connected. Here, the contact plug CP1_*w*4 of the memory cell array 11_2 and the contact plug CP1_*w*4 of the memory cell array 11_1 located above in the Z1 direction are electrically connected. The same applies to other word lines WL. The contact plug CP2 and the conductor 108 may be provided in the memory cell array 11_2.

Next, the circuit chip 20 will be described.

The circuit chip 20 includes a plurality of transistors Tr and various wiring layers. The plurality of the transistors Tr are used for the address register 21, the command register 22, the sequencer 23, the row driver 24, the row decoder 25, the sense amplifier 26, the data register 27, the column decoder 28, and the like.

More specifically, the circuit chip 20 includes insulating layers 201, 202, and 209, a gate electrode 203, conductors 204, 206, 208, and 210, and wiring layers 205 and 207.

An element isolation region is provided near the surface of the semiconductor substrate 200. The element isolation region electrically isolates, for example, an n-type well region and a p-type well region provided near the surface of the semiconductor substrate 200. The element isolation region is buried in the insulating layer 201. The insulating layer 201 may contain SiO.

The insulating layer 202 is provided on the semiconductor substrate 200. The insulating layer 202 may contain SiO.

The transistor Tr includes a gate insulating film (not illustrated) provided on the semiconductor substrate 200, the gate electrode 203 provided on the gate insulating film, and a source and a drain (not illustrated) formed on the semiconductor substrate 200. The source and the drain are electrically connected to the wiring layer 205 via the conductor 204. The conductor 204 extends in the Z2 direction. The conductor 204 functions as a contact plug. The conductor 206 is provided on the wiring layer 205. The conductor 206 extends in the Z2 direction. The conductor 206 functions as a contact plug. The wiring layer 207 is provided on the conductor 206. The conductor 208 is provided on the wiring layer 207. The conductor 208 extends in the Z2 direction. The conductor 208 functions as a contact plug. The wiring layers 205 and 207 are made of a conductive material. The conductors 204, 206, and 208 and the wiring layers 205 and 207 may contain metallic materials, p-type semiconductors, or n-type semiconductors. It should be noted that the number of wiring layers provided on the circuit chip 20 can be freely selected.

The insulating layer 209 is provided on the insulating layer 202 in the Z2 direction. The insulating layer 209 may contain SiO.

The plurality of conductors 210 are provided in the same layer as the insulating layer 209. The conductor 210 functions as the electrode pad PD. For example, one conductor 210 is provided over one conductor 208. The conductor 210 may include a metallic material such as Cu. The conductor 210 of the circuit chip 20 is in contact with (electrically connected to) the conductor 116 of the array chip 10_1.

1.1.6.2 Configuration of CP1 Region

Figure 8:
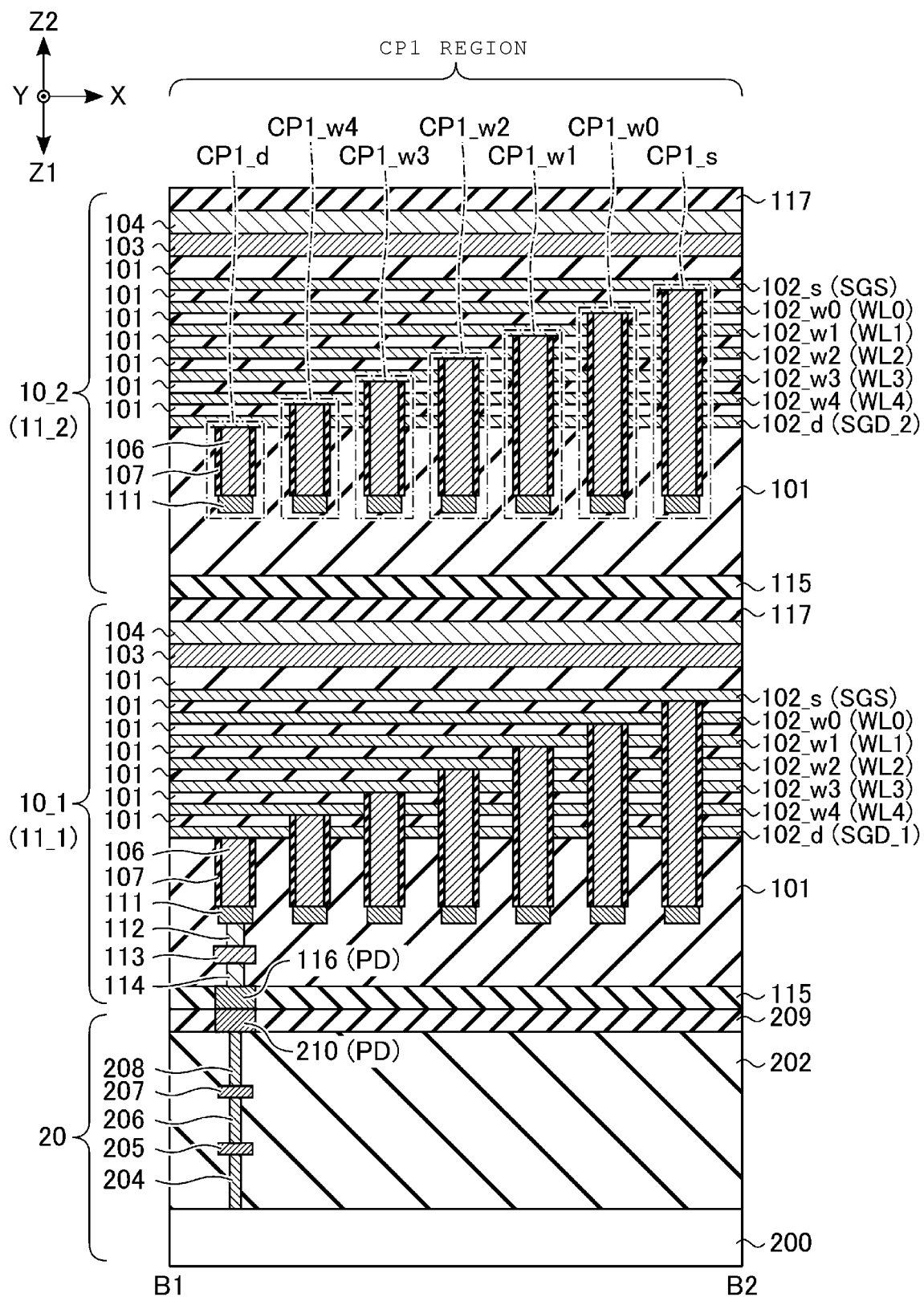
FIG. 8 illustrates a cross-sectional view taken along line B1-B2 of FIGS. 5 and 6.

Next, an example of the configuration of the CP1 region will be described with reference to FIG. 8. FIG. 8 illustrates a cross-sectional view taken along line B1-B2 of FIGS. 5 and 6. The following description will focus on the configuration of the contact plug CP1.

As illustrated in FIG. 8, the memory cell arrays 11_1 and 11_2 are provided with the contact plugs CP1_*s*, CP1_*w*0 to CP1_*w*4, and CP1_*d*, respectively. In the example of FIG. 8, the contact plugs CP1_*s*, CP1_*w*0 to CP1_*w*4, and CP1_*d* are located sequentially from the right side toward the left side on paper. One ends of the contact plugs CP1_*s*, CP1_*w*0 to CP1_*w*4, and CP1_*d* are in contact with (electrically connected to) the wiring layers 102_*s*, 102_*w*0 to 102_*w*4, and 102_d, respectively. The other ends of the contact plugs CP1_s, CP1_w0 to CP1_w4, and CP1_d are in contact with (electrically connected to) different wiring layers 111, respectively. Therefore, the contact plugs CP1_s, CP1_w0 to CP1_w4, and CP1_d have different lengths in the Z direction.

More specifically, the contact plug CP1_s penetrates the six wiring layers 102_w0 to 102_w4 and 102_d. The end of the contact plug CP1_s in the Z2 direction is electrically connected to the wiring layer 102_s. The contact plug CP1_s is not electrically connected to the six wiring layers 102_w0 to 102_w4 and 102_d.

The contact plug CP1_w0 penetrates the five wiring layers 102_w1 to 102_w4 and 102_d. The end of the contact plug CP1_w0 in the Z2 direction is electrically connected to the wiring layer 102_w0. The contact plug CP1_w0 is not electrically connected to the five wiring layers 102_w1 to 102_w4 and 102_d.

The contact plug CP1_w1 penetrates the four wiring layers 102_w2 to 102_w4 and 102_d. The end of the contact plug CP1_w1 in the Z2 direction is electrically connected to the wiring layer 102_w1. The contact plug CP1_w1 is not electrically connected to the four wiring layers 102_w2 to 102_w4 and 102_d.

The contact plug CP1_w2 penetrates the three wiring layers 102_w3, 102_w4, and 102_d. The end of the contact plug CP1_w2 in the Z2 direction is electrically connected to the wiring layer 102_w2. The contact plug CP1_w2 is not electrically connected to the three wiring layers 102_w3, 102_w4, and 102_d.

The contact plug CP1_w3 penetrates the two wiring layers 102_w4 and 102_d. The end of the contact plug CP1_w3 in the Z2 direction is electrically connected to the wiring layer 102_w3. The contact plug CP1_w3 is not electrically connected to the two wiring layers 102_w4 and 102_d.

The contact plug CP1_w4 penetrates the wiring layer 102_d. The end of the contact plug CP1_w4 in the Z2 direction is electrically connected to the wiring layer 102_w4. The contact plug CP1_w4 is not electrically connected to the wiring layer 102_d.

The end of the contact plug CP1_d in the Z2 direction is electrically connected to the wiring layer 102_d. In the memory cell array 11_1, the wiring layer 111 connected with the contact plug CP1_d is not electrically connected to the contact plug CP2_d. The wiring layer 111, the conductor 112 (contact plug CP3), the wiring layer 113, the conductor 114 (contact plug CP4), and the conductor 116 (electrode pad PD) are located on the contact plug CP1_d along the Z1 direction.

1.1.6.3 Configuration of CP2 Region

Figure 9:
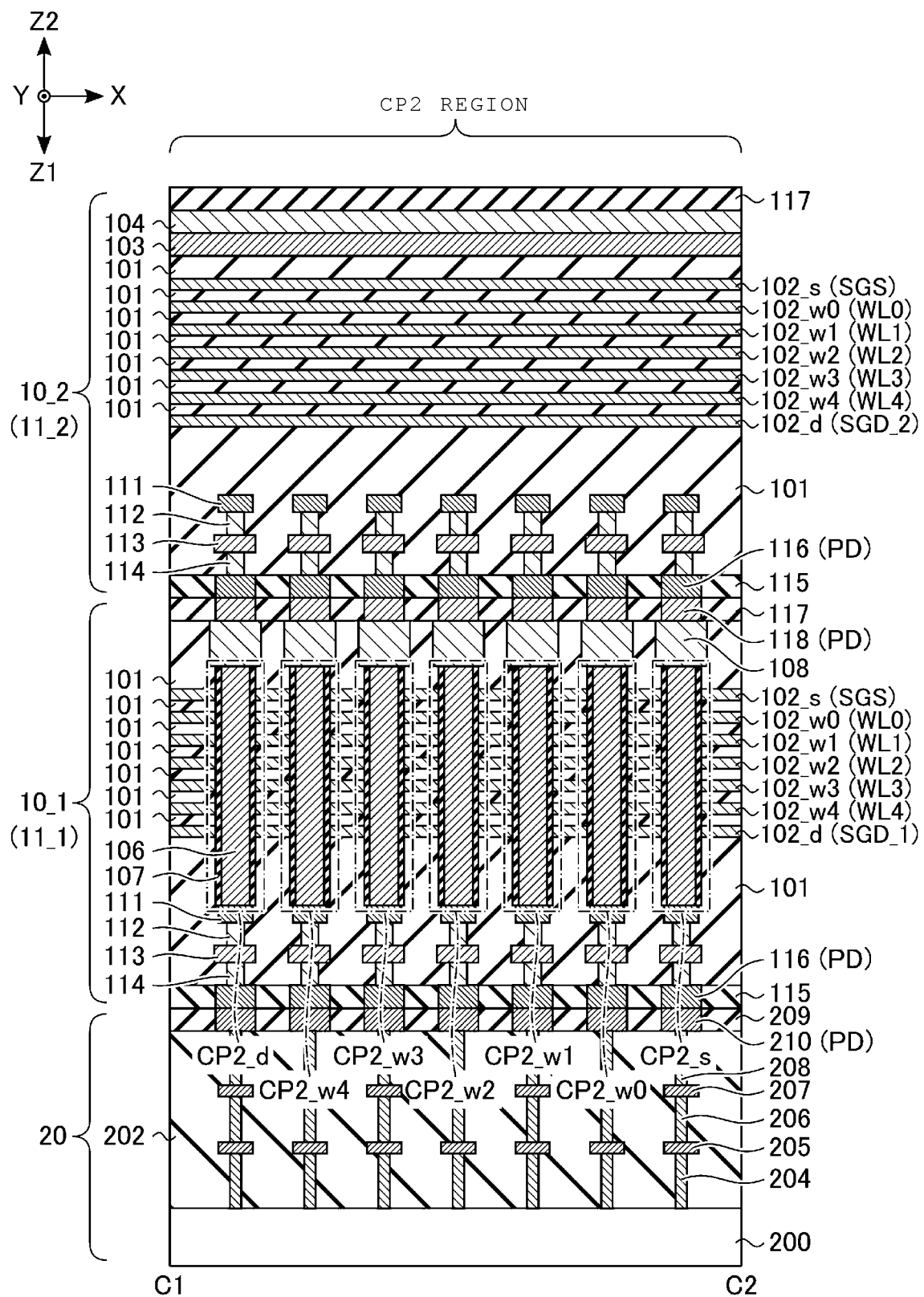
FIG. 9 illustrates a cross-sectional view taken along line C1-C2 of FIGS. 5 and 6.

Next, an example of the configuration of the CP2 region will be described with reference to FIG. 9. FIG. 9 illustrates a cross-sectional view taken along line C1-C2 of FIGS. 5 and 6. The following description will focus on the configuration of the contact plug CP2.

As illustrated in FIG. 9, the array chip 10_1 is provided with the contact plugs CP2_s, CP2_w0 to CP2_w4, and CP2_d. In the example of FIG. 9, the contact plugs CP2_s, CP2_w0 to CP2_w4, and CP2_d are located sequentially from the right side toward the left side on paper. The contact plugs CP2_s, CP2_w0 to CP2_w4, and CP2_d have substantially the same shape (same length). The contact plugs CP2_s, CP2_w0 to CP2_w4, and CP2_d penetrate the seven wiring layers 102_s, 102_w0 to 102_w4, and 102_d. The contact plugs CP2_s, CP2_w0 to CP2_w4, and CP2_d are not electrically connected to the seven wiring layers 102_s, 102_w0 to 102_w4, and 102_d. One ends of the contact plugs CP2_s, CP2_w0 to CP2_w4, and CP2_d are connected to different conductors 108, respectively. The other ends of the contact plugs CP2_s, CP2_w0 to CP2_w4, and CP2_d are connected to different wiring layers 111, respectively. The wiring layer 111 connected with the contact plugs CP2_s and CP2_w0 to CP2_w4 is connected to the contact plugs CP1_s and CP1_w0 to CP1_w4, respectively. The wiring layer 111 connected with the contact plug CP2_d is not electrically connected to the contact plug CP1_d. The wiring layer 111, the conductor 112 (contact plug CP3), the wiring layer 113, the conductor 114 (contact plug CP4), and the conductor 116 (electrode pad PD) are located on each contact plug CP2 along the Z1 direction.

1.1.6.4 Configuration of Cell Portion

Figure 10:
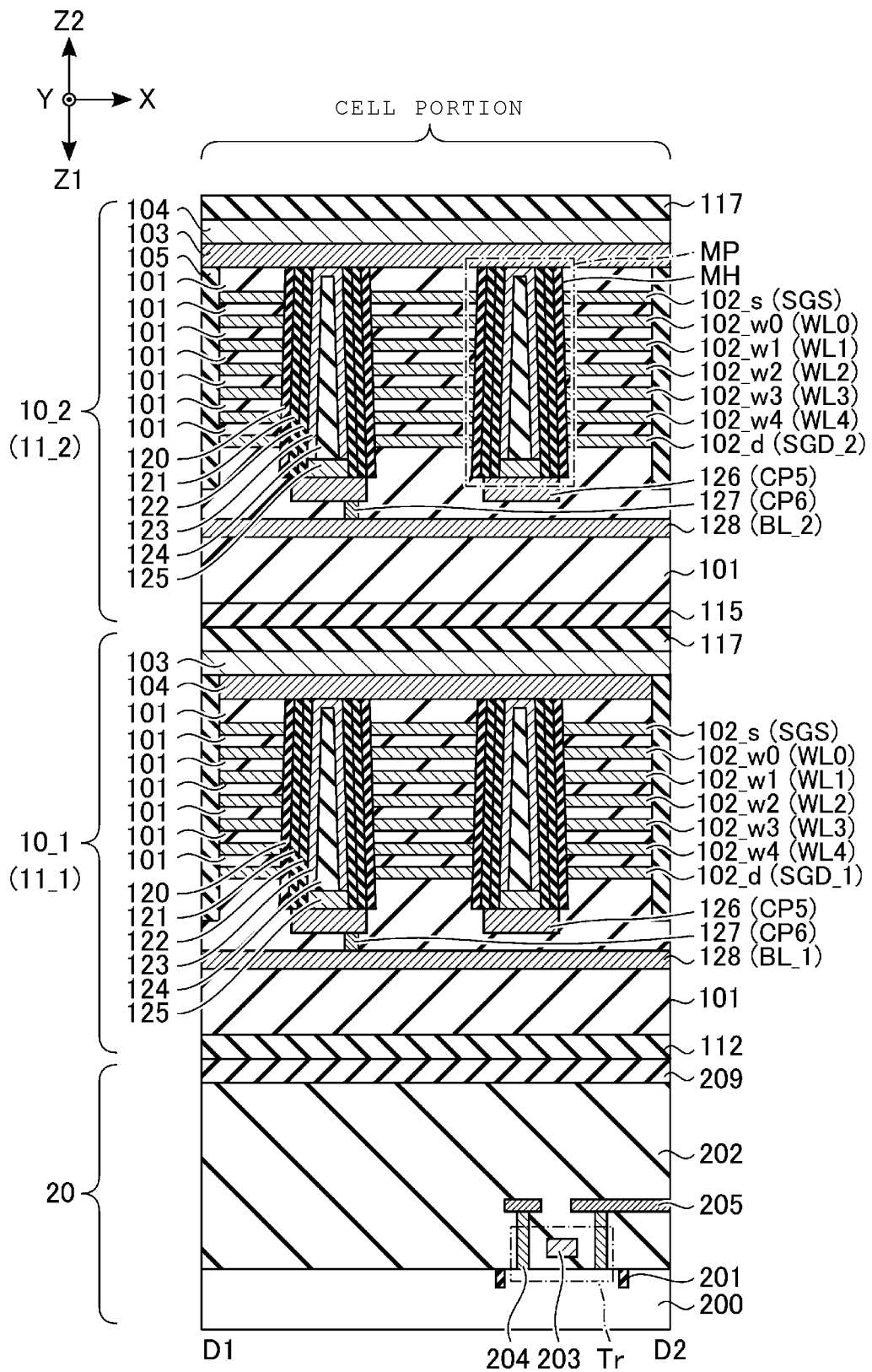
FIG. 10 illustrates a cross-sectional view taken along line D1-D2 of FIGS. 5 and 6.

Next, an example of the configuration of the cell portion will be described with reference to FIG. 10. FIG. 10 illustrates a cross-sectional view taken along line D1-D2 of FIGS. 5 and 6. The following description will focus on the configuration of the memory pillars MP and the bit lines BL.

As illustrated in FIG. 10, the array chips 10_1 and 10_2 are provided with the memory pillars MP.

The memory pillar MP penetrates a plurality of the wiring layers 102. The memory pillar MP extends in the Z direction. The end of the memory pillar MP in the Z2 direction is in contact with the semiconductor layer 103. A conductor 126 is provided on the end of the memory pillar MP in the Z1 direction. For example, the conductor 126 has a substantially cylindrical shape. The conductor 126 functions as a contact plug CP5. A conductor 127 is provided over the conductor 126. For example, the conductor 127 has a substantially cylindrical shape. The conductor 127 functions as a contact plug CP6. A plurality of wiring layers 128 are provided above the memory pillars MP in the Z1 direction. The wiring layer 128 extends in the Y direction. The plurality of wiring layers 128 are aligned in the X direction. The wiring layer 128 functions as the bit line BL. The wiring layer 128 is electrically connected to any one of the memory pillars MP via the contact plugs CP5 and CP6.

The conductors 126 and 127 and the wiring layer 128 may contain metal materials such as W, Al, or Cu.

Next, the internal configuration of the memory pillar MP will be described.

The memory pillar MP includes a block insulating film 120, a charge storage layer 121, a tunnel insulating film 122, a semiconductor layer 123, a core layer 124, and a cap layer 125.

More specifically, holes MH penetrate a plurality of the wiring layers 102. The holes MH correspond to the memory pillars MP. The end of the hole MH in the Z2 direction reaches the semiconductor layer 103. The block insulating film 120, the charge storage layer 121, and the tunnel insulating film 122 are stacked in this order from the outside on the side surface of the hole MH. For example, when the hole MH has a cylindrical shape, each of the block insulating film 120, the charge storage layer 121, and the tunnel insulating film 122 has a cylindrical shape. The semiconductor layer 123 is in contact with the side surface of the tunnel insulating film 122. The end of the semiconductor layer 123 in the Z2 direction is in contact with the semiconductor layer 103. The semiconductor layer 123 is a region where channels of the memory cell transistor MC and the select transistors ST1 and ST2 are formed. Therefore, the semiconductor layer 123 functions as a signal line connecting the current paths of the select transistor ST2, the memory cell transistors MC0 to MC4, and the select transistor ST1. The core layer 124 is buried in the semiconductor layer 123. The cap layer 125 having a side surface in contact with the tunnel insulating film 122 is provided on the ends of the semiconductor layer 123 and the core layer 124 in the Z1 direction. That is, the memory pillar MP includes the semiconductor layer 123 passing through a plurality of the wiring layers 102 and extending in the Z direction.

The block insulating film 120, the tunnel insulating film 122, and the core layer 124 may contain SiO. The charge storage layer 121 may contain silicon nitride (SiN). The semiconductor layer 123 and the cap layer 125 may contain, for example, polysilicon.

The memory cell transistors MC0 to MC4 are configured by combining the memory pillars MP with the wiring layers 102_w0 to 102_w4, respectively. Similarly, the select transistor ST1 is configured by combining the memory pillar MP and the wiring layer 102_d. The select transistor ST2 is configured by combining the memory pillar MP and the wiring layer 102_s.

1.1.7 Planar Configuration of BL Connection Portion

Figure 11:
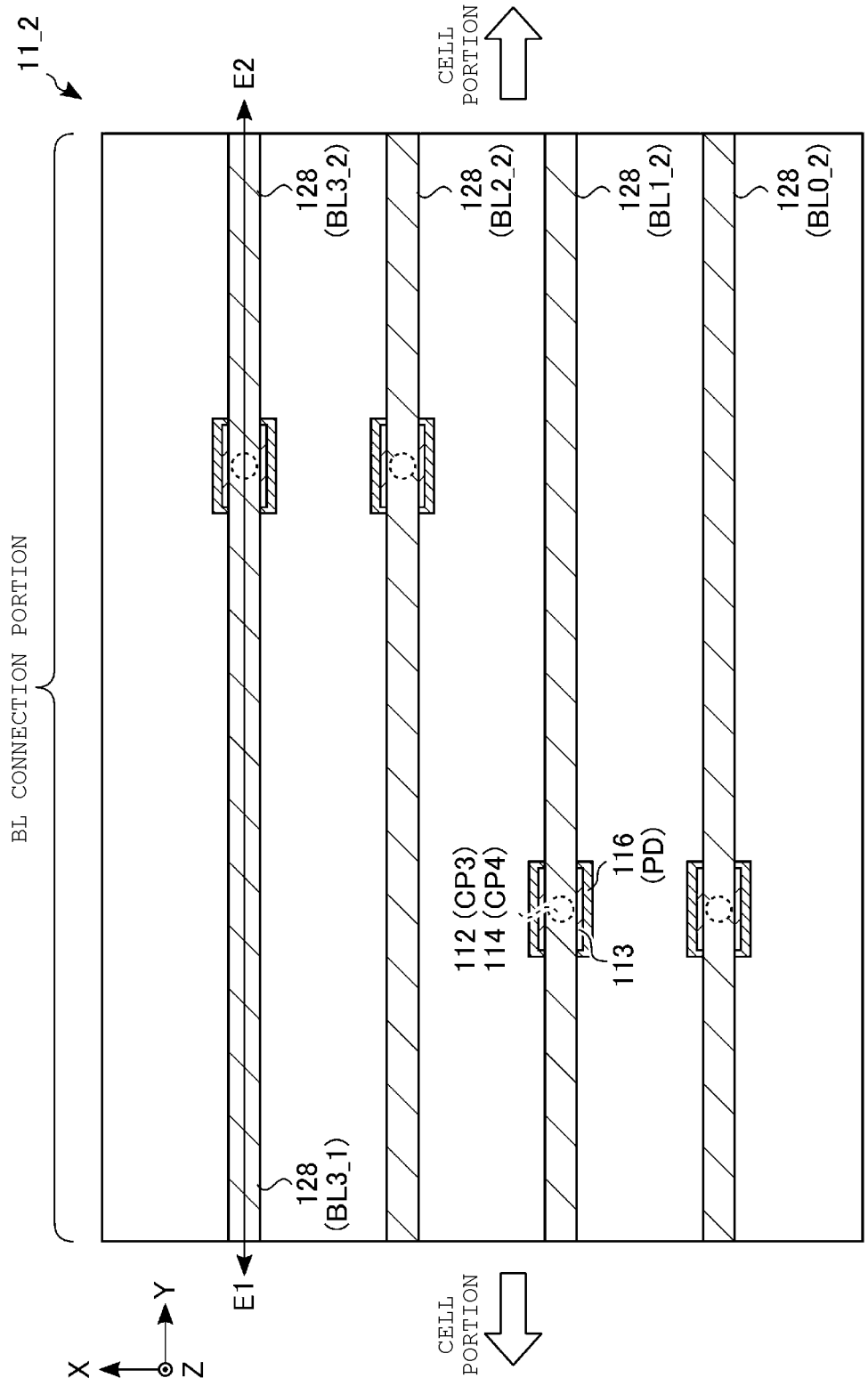
FIG. 11 illustrates a plan view of a BL connection portion of the memory cell array provided in the semiconductor memory device according to the first embodiment.
Figure 12:
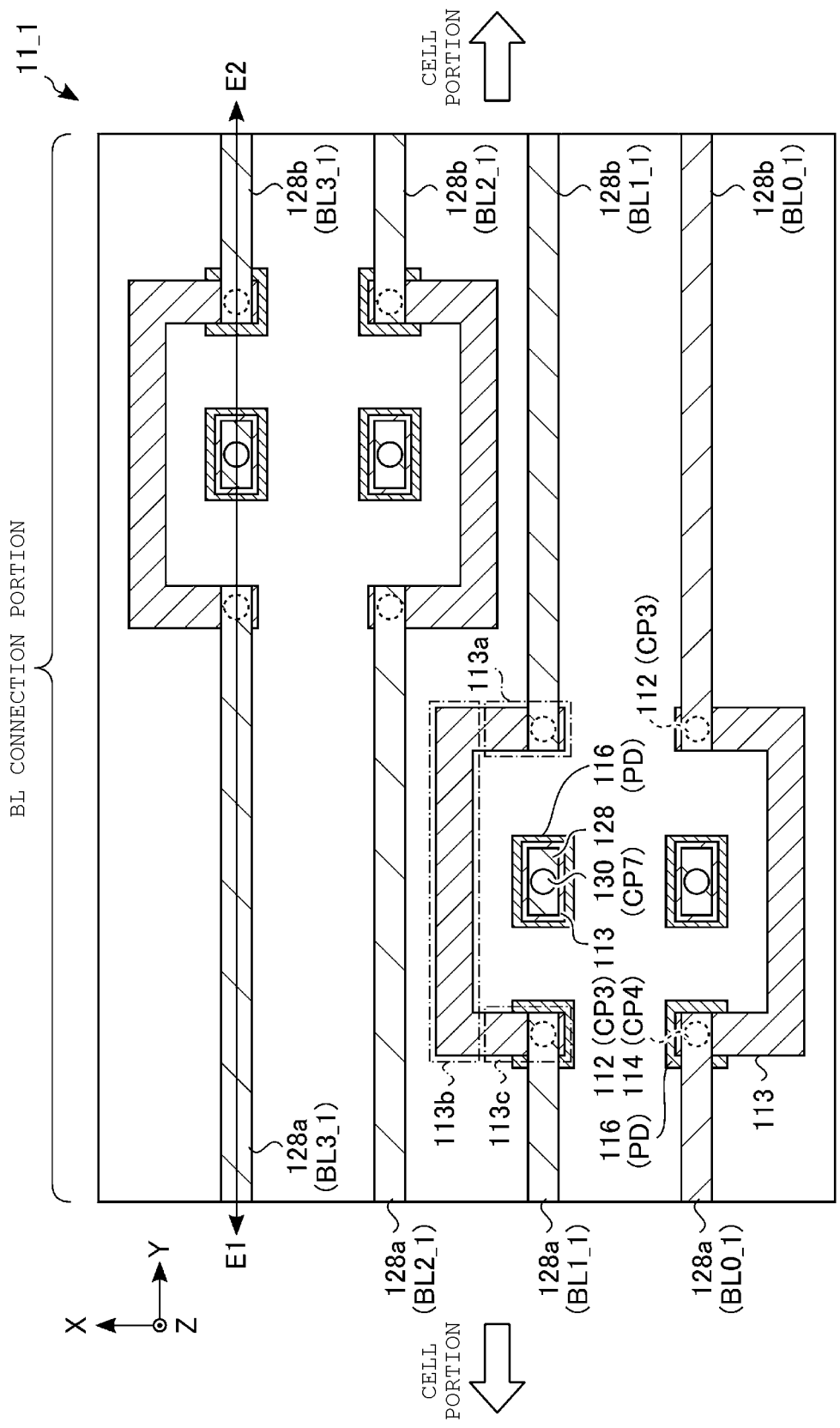
FIG. 12 illustrates a plan view of a BL connection portion of the memory cell array provided in the semiconductor memory device according to the first embodiment.

Next, an example of the configuration of the BL connection portion will be described with reference to FIGS. 11 and 12. FIG. 11 illustrates a plan view of the BL connection portion of the memory cell array 11_2. FIG. 12 illustrates a plan view of the BL connection portion of the memory cell array 11_1. The example of FIG. 11 illustrates four bit lines BL0_2 to BL3_2 of the memory cell array 11_2. The example of FIG. 12 illustrates four bit lines BL0_1 to BL3_1 of the memory cell array 11_1. It should be noted that the insulating layer is omitted in the examples of FIGS. 11 and 12.

First, the BL connection portion of the memory cell array 11_2 will be described.

As illustrated in FIG. 11, a plurality of the wiring layers 128 respectively functioning as the bit lines BL0_2 to BL3_3 are provided. The plurality of wiring layers 128 are aligned in the X direction. The wiring layer 128 extends in the Y direction at the BL connection portion.

Each wiring layer 128 is connected to the conductor 116 via the conductor 112, the wiring layer 113, and the conductor 114. The conductor 112, the wiring layer 113, the conductor 114, and the conductor 116 are located along the Z direction. In the example of FIG. 11, the connection position between the wiring layer 128 functioning as the bit line BL0_2 and the conductor 112, and the connection position between the wiring layer 128 functioning as the bit line BL1_2 and the conductor 112 are aligned in the X direction. Similarly, the connection position between the wiring layer 128 functioning as the bit line BL2_2 and the conductor 112, and the connection position between the wiring layer 128 functioning as the bit line BL3_2 and the conductor 112 are aligned in the X direction.

Next, the BL connection portion of the memory cell array 11_1 will be described.

As illustrated in FIG. 12, a plurality of the wiring layers 128 functioning as the bit lines BL0_1 to BL3_1 are provided. Each wiring layer 128 is separated into two at the BL connection portion. Hereinafter, when specifying the wiring layer 128 extending from the cell portion on the left side on paper to the BL connection portion, the wiring layer 128 is denoted as a wiring layer 128a. When specifying the wiring layer 128 extending from the cell portion on the right side on paper to the BL connection portion, the wiring layer 128 is denoted as a wiring layer 128b.

A plurality of the wiring layers 128a are aligned in the X direction. The wiring layer 128a extends in the Y direction from the left side on paper at the BL connection portion. Similarly, a plurality of the wiring layers 128b are aligned in the X direction. The wiring layer 128b extends in the Y direction from the right side on paper at the BL connection portion. The set of two wiring layers 128a and 128b corresponding to one bit line BL_1 is located to face each other in the Y direction.

At the BL connection portion, the conductor 112 is connected to the ends of the wiring layers 128a and 128b, respectively. The set of wiring layers 128a and 128b corresponding to one bit line BL_1 are connected to one wiring layer 113 via the conductor 112 connected to each. That is, the wiring layers 128a and 128b corresponding to one bit line BL_1 are electrically connected.

For example, the wiring layer 113 bypasses the position in the X direction of the set of wiring layers 128a and 128b. More specifically, for example, the wiring layer 113 includes three wiring portions 113a to 113c. The wiring portions 113a and 113c extend in the X direction. The wiring portion 113b extends in the Y direction. One end of the wiring portion 113a is connected to the wiring layer 128a via the conductor 112, and the other end is connected to one end of the wiring portion 113b. The other end of the wiring portion 113b is connected to one end of the wiring portion 113c. The other end of the wiring portion 113c is connected to the wiring layer 128b via the conductor 112. In the example of FIG. 12, the wiring layer 113 corresponding to the bit lines BL0_1 and BL2_1 has a shape protruding downward on paper. The wiring layer 113 corresponding to the bit lines BL1_1 and BL3_1 has a shape protruding upward on paper. The wiring layer 113 corresponding to the bit line BL0_1 and the wiring layer 113 corresponding to the bit line BL1_1 face each other. The wiring layer 113 corresponding to the bit line BL2_1 and the wiring layer 113 corresponding to the bit line BL3_1 face each other.

Each wiring layer 113 is connected to the conductor 116 via the conductor 114.

The conductor 130 is provided between the wiring layer 128a and the wiring layer 128b in the Y direction. The conductor 130 functions as a contact plug CP7 electrically connected to the bit line BL_2 of the memory cell array 11_2. The conductor 130 may contain a metallic material such as W, Al, or Cu. The conductor 130 is connected to the conductor 116 via the wiring layer 128, the conductor 112, the wiring layer 113, and the conductor 114, which are not electrically connected to the bit line BL_1. For example, the conductor 130 located between a set of the wiring layers 128a and 128b functioning as the bit line BL0_1 is electrically connected to the bit line BL0_2 of the memory cell array 11_2. Similarly, the conductor 130 located between a set of the wiring layers 128a and 128b functioning as the bit line BL1_1 is electrically connected to the bit line BL1_2 of the memory cell array 11_2. The conductor 130 located between a set of the wiring layers 128a and 128b functioning as the bit line BL2_1 is electrically connected to the bit line BL2_2 of the memory cell array 11_2. The conductor 130 located between a set of the wiring layers 128a and 128b functioning as the bit line BL3_1 is electrically connected to the bit line BL3_2 of the memory cell array 11_2.

1.1.8 Cross-Sectional Configuration of BL Connection Portion

Figure 13:
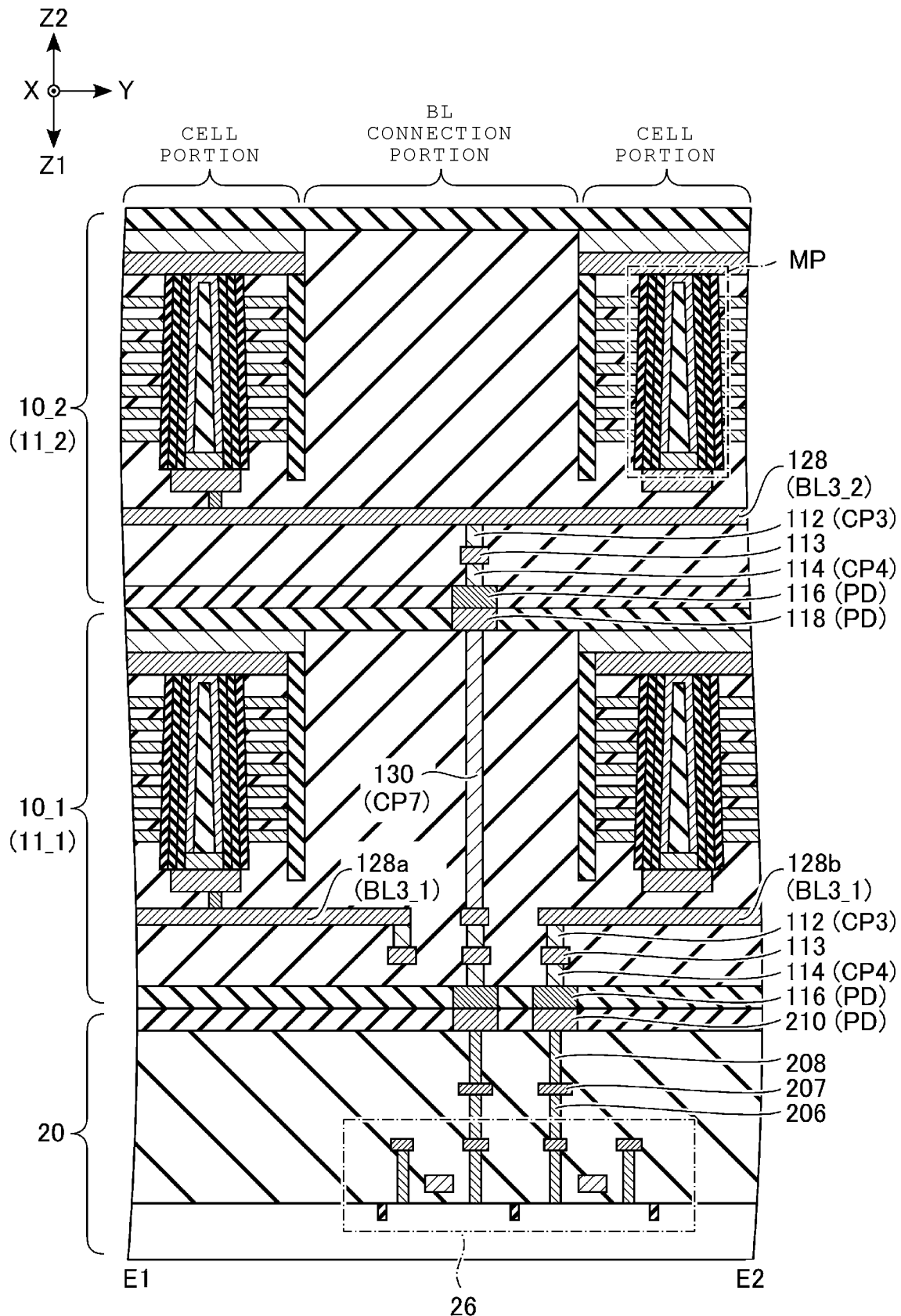
FIG. 13 illustrates a cross-sectional view taken along line E1-E2 in FIG. 12.

Next, an example of a cross-sectional configuration of the BL connection portion will be described with reference to FIG. 13. FIG. 13 illustrates a cross-sectional view taken along line E1-E2 of FIG. 12. The following description will focus on the connection of the bit line BL (wiring layer 128).

As illustrated in FIG. 13, in the BL connection portion of the memory cell array 11_2, the wiring layer 128 functioning as the bit line BL3_2 is connected to the conductor 116 via the conductor 112, the wiring layer 113, and the conductor 114. The conductor 116 of the memory cell array 11_2 is electrically connected to the sense amplifier 26 provided to the circuit chip via the conductor 118, the conductor 130, the wiring layer 128, the conductor 112, the wiring layer 113, the conductor 114, and the conductor 116 of the memory cell array 11_1.

In the BL connection portion of the memory cell array 11_1, a set of the wiring layers 128a and 128b functioning as the bit line BL3_1 are electrically connected via the conductor 112 and the wiring layer 113. The wiring layer 113 is electrically connected to the sense amplifier 26 provided on the circuit chip 20 via the conductors 114 and 116.

1.1.9 Configuration of Data Register and Sense Amplifier

Figure 14:
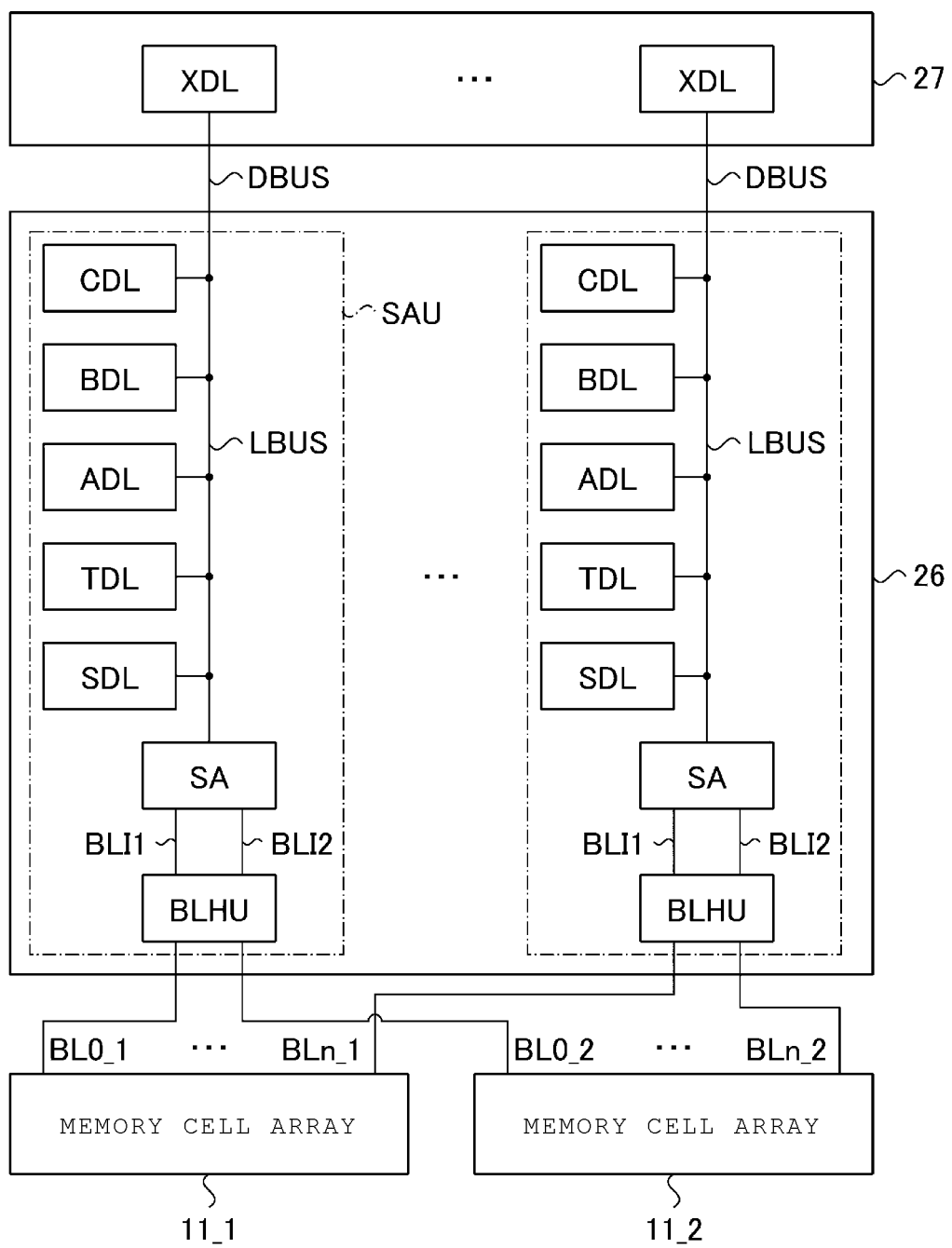
FIG. 14 is a block diagram of a data register and a sense amplifier provided in the semiconductor memory device according to the first embodiment.

Next, an example of the configuration of the data register 27 and the sense amplifier 26 will be described with reference to FIG. 14. FIG. 14 is a block diagram of the data register 27 and the sense amplifier 26.

As illustrated in FIG. 14, the sense amplifier 26 includes a plurality of sense amplifier units SAU provided for each set of the bit lines BL_1 and BL_2. More specifically, for example, the sense amplifier unit SAU is provided corresponding to a set of the bit line BL0_1 of the memory cell array 11_1 and the bit line BL0_2 of the memory cell array 11_2. Similarly, the sense amplifier unit SAU is provided corresponding to a set of the bit line BLn_1 of the memory cell array 11_1 and the bit line BLn_2 of the memory cell array 11_2. That is, (n+1) sense amplifier units SAU are provided for a set of (n+1) bit lines BL_1 and BL_2.

The data register 27 includes, for example, a plurality of latch circuits XDL provided for each sense amplifier unit SAU. The latch circuit XDL temporarily stores the read data and the write data. The latch circuit XDL is used for inputting and outputting data between the external controller and the sense amplifier unit SAU. Each latch circuit XDL is connected to the corresponding sense amplifier unit SAU via a bus DBUS. A plurality of sense amplifier units SAU may be connected to one latch circuit XDL.

Next, an internal configuration of the sense amplifier unit SAU will be described. The sense amplifier unit SAU includes, for example, a BL hookup circuit BLHU, a sense circuit SA, and latch circuits SDL, ADL, BDL, CDL, and TDL. The sense circuit SA and the latch circuits SDL, ADL, BDL, CDL, and TDL are commonly connected to a bus LBUS. In other words, the latch circuit XDL, the sense circuit SA, and the latch circuits SDL, ADL, BDL, CDL, and TDL are connected to transmit and receive data to each other.

The BL hookup circuit BLHU is a circuit connecting the bit line BL and the sense circuit SA. The bit lines BL_1 and BL_2 are connected to the BL hookup circuit BLHU. The BL hookup circuit BLHU is connected to the sense circuit SA via nodes BLI1 and BLI2. The node BLI1 corresponds to the bit line BL_1. The node BLI2 corresponds to the bit line BL_2.

During the read operation, the sense circuit SA senses the data read through the corresponding bit line BL and determines whether the read data is the "0" data or "1" data. The sense circuit SA applies a voltage to the bit line BL based on the data stored in any one of the latch circuits SDL, ADL, BDL, CDL, and TDL during the write operation.

The latch circuits SDL, ADL, BDL, CDL, and TDL temporarily store the read data and the write data. For example, during the read operation, data may be transferred from the sense circuit SA to any one of the latch circuits SDL, ADL, BDL, CDL, and TDL. During the write operation, data may be transferred from the latch circuit XDL to any one of the latch circuits SDL, ADL, BDL, CDL, and TDL.

The configuration of the sense amplifier unit SAU is not limited thereto, and various modifications are possible. For example, the number of latch circuits provided in the sense amplifier unit SAU may be designed based on the number of bits of data stored in one memory cell transistor MC.

1.1.10 Number of Latch Circuits Used for Read Operation and Write Operation

Next, an example of the number of latch circuits used for the read operation and the write operation will be described with reference to FIG. 15. FIG. 15 is a diagram illustrating the number of latch circuits used for the read operation and the write operation. The example of FIG. 15 illustrates the case where the memory cell transistor MC is SLC, TLC, or QLC. The number of latch circuits illustrated in FIG. 15 includes the latch circuit XDL.

First, the 1CU read operation will be described.

As illustrated in FIG. 15, for example, in the case of SLC, two latch circuits are used for the 1CU read operation. In the case of the 1CU read operation of TLC and QLC, the number of latch circuits used differs between the read operation in a no lockout (NLK) method and the read operation in a lockout (LCK) method. The NLK method is a read operation without controlling selection/non-selection of the read target bit lines BL, that is, all bit lines BL are selected. The LCK method is a read operation with control of selection/non-selection of the read target bit line BL, by using a latch circuit in the sense amplifier unit SAU. According to the LCK method, an increase in current consumption during the read operation may be prevented by selecting the read target bit line BL. For example, in the TLC reading, two latch circuits are used in the case of the 1CU read operation in the NLK method. In the TLC reading, three latch circuits are used in the case of the 1CU read operation according to the LCK method. In the QLC reading, two latch circuits are used in the case of the 1CU read operation according to the NLK method. In the QLC reading, three latch circuits are used in the case of the 1CU read operation according to the LCK method.

Next, the 1CU write operation will be described. For example, in the case of SLC writing, two latch circuits are used for the 1CU write operation. In the case of the TLC writing, five latch circuits are used for the 1CU write operation. In the case of the QLC writing, six latch circuits are used for the 1CU write operation.

Therefore, for example, the sense amplifier unit SAU corresponding to the SLC writing includes at least one or more latch circuits. The sense amplifier unit SAU corresponding to the TLC writing includes at least four or more latch circuits. The sense amplifier unit SAU corresponding to the QLC writing includes at least five or more latch circuits.

Next, the 2CU read operation will be described. For example, in the case of the SLC reading, three latch circuits are used for the 2CU read operation. For example, in the TLC reading, three latch circuits are used for the 2CU read operation according to the NLK method. In the TLC reading, five latch circuits are used in the case of the 2CU read operation according to the LCK method. In the QLC reading, in the case of the 2CU read operation according to the NLK method, three latch circuits are used. In the QLC reading, in the case of the 2CU read operation according to the LCK method, five latch circuits are used.

Next, the 2CU write operation will be described. For example, in the case of the SLC writing, three latch circuits are used for the 2CU write operation.

Therefore, for example, when the sense amplifier unit SAU includes four latch circuits (excluding the latch circuit XDL) corresponding to the 1CU write operation of the TLC, the 2CU read operation of the SLC reading, the 2CU read operation of the TLC reading, and the 2CU write operation of the SLC writing may be performed without increasing the number of latch circuits. Similarly, for example, when the sense amplifier unit SAU includes five latch circuits (excluding the latch circuit XDL) corresponding to the 1CU write operation of the QLC writing, the 2CU read operation of the SLC reading, the 2CU read operation of the QLC reading, and the 2CU write operation of the SLC writing may be performed without increasing the number of latch circuits.

1.1.11 Circuit Configuration of Sense Amplifier Unit

Figure 16:
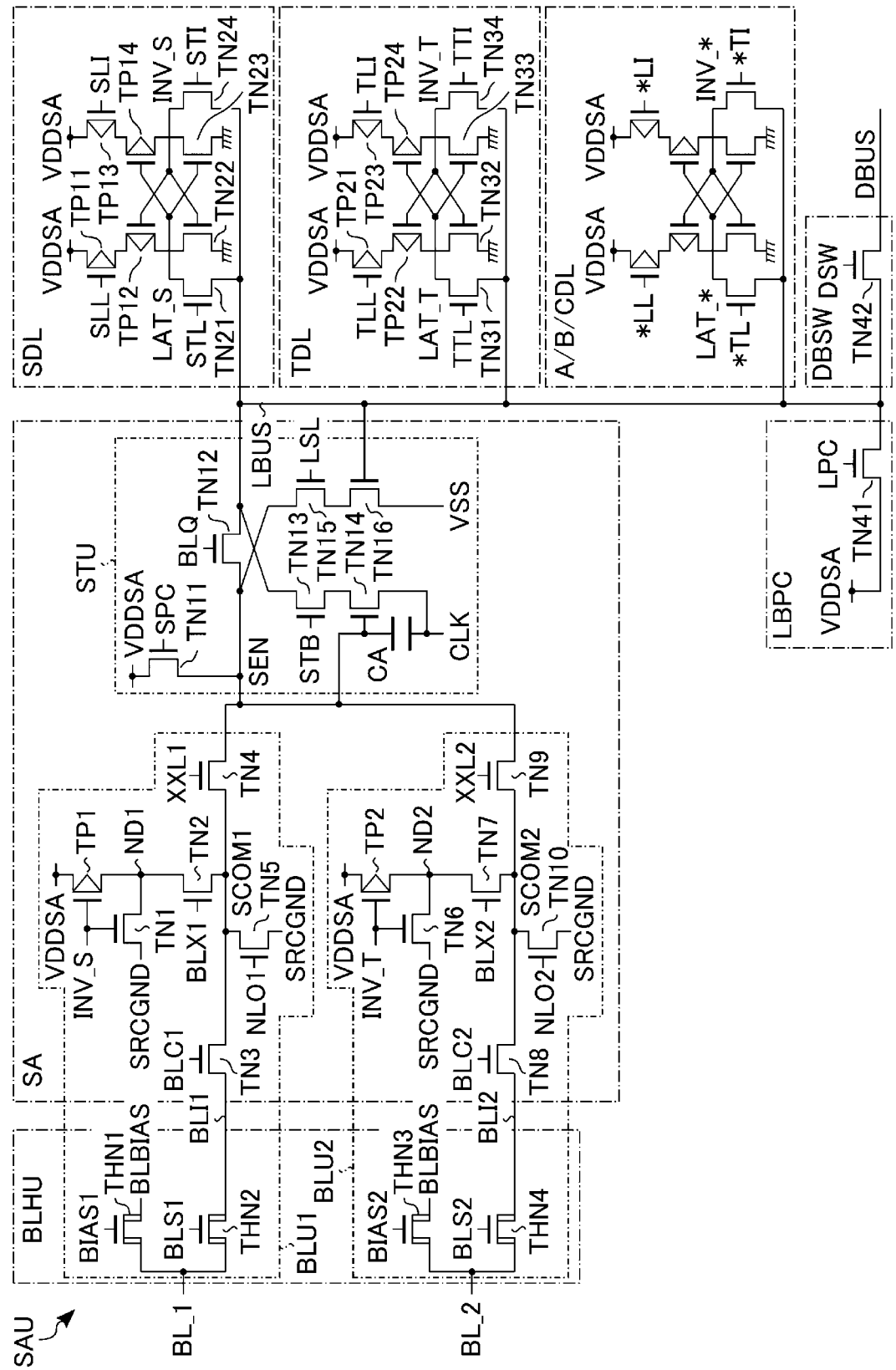
FIG. 16 is a circuit diagram of a sense amplifier unit provided in the semiconductor memory device according to the first embodiment.

Next, an example of a circuit configuration of the sense amplifier unit SAU will be described with reference to FIG. 16. FIG. 16 is a circuit diagram of the sense amplifier unit SAU. The sense amplifier unit SAU of the present embodiment senses the voltage at a node SEN. It should be noted that, in the example illustrated in FIG. 16, for the simplification of description, one common circuit diagram of the latch circuits ADL, BDL, and CDL is illustrated. The circuit configurations of the latch circuits ADL, BDL, and CDL are similar to those of the latch circuits SDL and TDL. In the following description, one of the source and the drain of the transistor is denoted as "one end of the transistor", and the other of the source and the drain is denoted as "the other end of the transistor".

As illustrated in FIG. 16, the sense amplifier unit SAU includes the BL hookup circuit BLHU, the sense circuit SA, the latch circuits SDL, ADL, BDL, CDL, and TDL, a LBUS circuit LBPC, and a DBUS switch circuit DBSW.

1.1.11.1 Configuration of BL Hookup Circuit

First, the configuration of the BL hookup circuit BLHU will be described. The BL hookup circuit BLHU includes high-breakdown voltage n-channel MOS transistors THN1 to THN4.

One end of the transistor THN1 is connected to the bit line BL_1. The other end of the transistor THN1 is connected to a node BLBIAS. The bias voltage is applied to the node BLBIAS. A signal BIAS1 is input to the gate of the transistor THN1. The signal BIAS1 is a signal controlling electrical connection between the bit line BL_1 and the node BLBIAS.

One end of the transistor THN2 is connected to the bit line BL_1. The other end of the transistor THN2 is connected to the node BLI1. A signal BLS1 is input to the gate of the transistor THN2. The signal BLS1 is a signal controlling electrical connection between the bit line BL_1 and the node BLI1. When electrically connecting the bit line BL_1 and the sense circuit SA, a voltage at high ("H") level is applied to the signal BLS1 to turn on the transistor TN2.

One end of the transistor THN3 is connected to the bit line BL_2. The other end of the transistor THN3 is connected to the node BLBIAS. A signal BIAS2 is input to the gate of the transistor THN3. The signal BIAS2 is a signal controlling electrical connection between the bit line BL_2 and the node BLBIAS.

One end of the transistor THN4 is connected to the bit line BL_2. The other end of the transistor THN4 is connected to the node BLI2. A signal BLS2 is input to the gate of the transistor THN4. The signal BLS2 is a signal controlling electrical connection between the bit line BL_2 and the node BLI2. When electrically connecting the bit line BL_2 and the sense circuit SA, the signal BLS2 is applied with a voltage at the "H" level to turn on the transistor THN4.

For example, the BL hookup circuit BLHU receives signals BIAS1, BIAS2, BLS1, and BLS2 from the sequencer 23.

1.1.11.2 Configuration of Sense Circuit

Next, the configuration of the sense circuit SA will be described. The sense circuit SA includes low-breakdown voltage p-channel MOS transistors TP1 and TP2, low-breakdown voltage n-channel MOS transistors TN1 to TN16, and a capacitive element CA.

A voltage VDDSA is applied to one end of the transistor TP1. The voltage VDDSA is a power supply voltage of the sense circuit SA. The other end of the transistor TP1 is connected to a node ND1. The gate of the transistor TP1 is connected to a node INV_S. The node INV_S is a node capable of storing data (inverted data) in the latch circuit SDL. When the node INV_S is at low ("L") level, the transistor TP1 is turned on.

One end of the transistor TN1 is connected to the node ND1. The other end of the transistor TN1 is connected to a node SRCGND. For example, a ground voltage VSS or the like is applied to the node SRCGND. The gate of the transistor TN1 is connected to the node INV_S. When the node INV_S is at the "H" level, the transistor TN1 is turned on. Therefore, one of the transistors TP1 and TN1 is turned on, and the other is turned off based on the logic level of the node INV_S. In other words, the voltage VDDSA or the voltage of the node SRCGND may be applied to the node ND1 based on the data stored in the latch circuit SDL.

One end of the transistor TN2 is connected to the node ND1. The other end of the transistor TN2 is connected to a node SCOM1. A signal BLX1 is input to the gate of the transistor TN2. When the signal BLX1 is at the "H" level, the transistor TN2 is turned on.

One end of the transistor TN3 is connected to the node BLI1. The other end of the transistor TN3 is connected to the node SCOM1. A signal BLC1 is input to the gate of the transistor TN3. The transistor TN3 may function as a clamp transistor clamping the voltage applied to the bit line BL_1 based on the voltage of the signal BLC1.

One end of the transistor TN4 is connected to the node SCOM1. The other end of the transistor TN4 is connected to the node SEN. A signal XXL1 is input to the gate of the transistor TN4. When the signal XXL1 is at the "H" level, the transistor TN4 is turned on.

One end of the transistor TN5 is connected to the node SCOM1. The other end of the transistor TN5 is connected to the node SRCGND. A signal NLO1 is input to the gate of the transistor TN5. When the signal NLO1 is at the "H" level, the transistor TN5 is turned on.

The transistors THN1 and THN2 of the BL hookup circuit BLHU and the transistors TP1 and TN1 to TN5 of the sense circuit SA function as a connection unit BLU1 controlling the connection of the bit line BL_1.

The voltage VDDSA is applied to one end of the transistor TP2. The other end of the transistor TP2 is connected to a node ND2. The gate of the transistor TP2 is connected to a node INV_T. The node INV_T is a node capable of storing data (inverted data) in the latch circuit TDL. When the node INV_T is at the "L" level, the transistor TP2 is turned on.

One end of the transistor TN6 is connected to the node ND2. The other end of the transistor TN6 is connected to the node SRCGND. The gate of the transistor TN6 is connected to the node INV_T. When the node INV_T is at the "H" level, the transistor TN6 is turned on. Therefore, one of the transistors TP2 and TN6 is turned on, and the other is turned off based on the logic level of the node INV_T. In other words, the voltage VDDSA or the voltage of the node SRCGND may be applied to the node ND2 based on the data stored in the latch circuit TDL.

One end of the transistor TN7 is connected to the node ND2. The other end of the transistor TN7 is connected to a node SCOM2. A signal BLX2 is input to the gate of the transistor TN7. When the signal BLX2 is at the "H" level, the transistor TN7 is turned on.

One end of the transistor TN8 is connected to the node BLI2. The other end of the transistor TN8 is connected to the node SCOM2. A signal BLC2 is input to the gate of the transistor TN8. The transistor TN8 may function as a clamp transistor clamping the voltage applied to the bit line BL_2 based on the voltage of the signal BLC2.

One end of the transistor TN9 is connected to the node SCOM2. The other end of the transistor TN9 is connected to the node SEN. A signal XXL2 is input to the gate of the transistor TN9. When the signal XXL2 is at the "H" level, the transistor TN9 is turned on.

One end of the transistor TN10 is connected to the node SCOM2. The other end of the transistor TN10 is connected to the node SRCGND. A signal NLO2 is input to the gate of the transistor TN10. When the signal NLO2 is at the "H" level, the transistor TN10 is turned on.

The transistors THN3 and THN4 of the BL hookup circuit BLHU and the transistors TP2 and TN6 to TN10 of the sense circuit SA function as a connection unit BLU2 for the bit line BL_2. The connection units BLU1 and BLU2 share the node SEN.

The voltage VDDSA is applied to one end of the transistor TN11. The other end of the transistor TN11 is connected to the node SEN. A signal SPC is input to the gate of the transistor TN11. When the signal SPC is at the "H" level, the transistor TN11 is turned on. For example, the transistor TN11 is used to charge the node SEN.

One end of the transistor TN12 is connected to the node SEN. The other end of the transistor TN12 is connected to the bus LBUS. A signal BLQ is input to the gate of the transistor TN12. When the signal BLQ is at the "H" level, the transistor TN12 is turned on. The transistor TN12 is turned on when electrically connecting the bus LBUS and the node SEN.

One end of the transistor TN13 is connected to the bus LBUS. The other end of the transistor TN13 is connected to one end of the transistor TN14. A signal STB is input to the gate of the transistor TN13. When the signal STB is asserted, the sense circuit SA determines the voltage at the node SEN. That is, the sense circuit SA determines the data stored in the selected memory cell transistor MC. More specifically, the transistor TN13 is turned on when the "H" level signal STB is input. Here, the bus LBUS is discharged through the transistors TN13 and TN14 when the transistor TN14 is on. When the transistor TN14 is off, the bus LBUS is not discharged through the transistors TN13 and TN14. The data based on the voltage of the bus LBUS is stored in any one of the latch circuits SDL, ADL, BDL, CDL, and TDL sharing the bus LBUS.

A clock signal CLK is input to the other end of the transistor TN14. The gate of the transistor TN14 is connected to the node SEN. The transistor TN14 functions as a sense transistor sensing the voltage of the node SEN. For example, when the voltage of the node SEN is a threshold voltage or higher of the transistor TN14, the transistor TN14 is turned on. When the voltage of the node SEN is lower than the threshold voltage of the transistor TN14, the transistor TN14 is turned off.

One electrode of the capacitive element CA is connected to the node SEN. The clock signal CLK is input to the other electrode of the capacitive element CA.

One end of the transistor TN15 is connected to the node SEN. The other end of the transistor TN15 is connected to one end of the transistor TN16. A signal LSL is input to the gate of the transistor TN15. When the signal LSL is at the "H" level, the transistor TN15 is turned on.

The voltage VSS is applied to the other end of the transistor TN16. The gate of the transistor TN16 is connected to the bus LBUS.

The transistors TN11 to TN16 and the capacitive element CA of the sense circuit SA function as a strobe unit STU strobing the voltage of the node SEN.

For example, the sense circuit SA receives the signals BLX1, BLX2, BLC1, BLC2, XXL1, XXL2, NLO1, NLO2, SPC, BLQ, STB, and LSL from the sequencer 23.

1.1.11.3 Configuration of Latch Circuit SDL

Next, the configuration of the latch circuit SDL will be described. The latch circuit SDL includes low-breakdown voltage p-channel MOS transistors TP11 to TP14 and low-breakdown voltage n-channel MOS transistors TN21 to TN24.

The voltage VDDSA is applied to one end of the transistor TP11. The other end of the transistor TP11 is connected to one end of the transistor TP12. A signal SLL is input to the gate of the transistor TP11.

The other end of the transistor TP12 is connected to one end of the transistor TN22. The gate of the transistor TP12 is connected to the node INV_S.

The voltage VDDSA is applied to one end of the transistor TP13. The other end of the transistor TP13 is connected to one end of the transistor TP14. A signal SLI is input to the gate of the transistor TP13.

The other end of the transistor TP14 is connected to one end of the transistor TN23. The gate of the transistor TP14 is connected to a node LAT_S.

One end of the transistor TN21 is connected to the node LAT_S. The other end of the transistor TN21 is connected to the bus LBUS. A signal STL is input to the gate of the transistor TN21.

The other end of the transistor TN22 is grounded (the ground voltage VSS is applied). The gate of the transistor TN22 is connected to the node INV_S.

The other end of the transistor TN23 is grounded. The gate of the transistor TN23 is connected to the node LAT_S.

One end of the transistor TN24 is connected to the node INV_S. The other end of the transistor TN24 is connected to the bus LBUS. A signal STI is input to the gate of the transistor TN24.

The latch circuit SDL stores data at the node LAT_S. The latch circuit SDL stores inverted data of the data stored in the node LAT_S at the node INV_S. For example, when the latch circuit SDL stores the "1" data, a voltage at the "L" level (voltage VSS) is applied to the node INV_S. When the latch circuit SDL stores the "0" data, a voltage at the "H" level (voltage VDDSA) is applied to the node INV_S.

For example, the latch circuit SDL receives the signals SLL, SLI, STL, and STI from the sequencer 23.

1.1.11.4 Configuration of Latch Circuit TDL

Next, the configuration of the latch circuit TDL will be described. The latch circuit TDL includes low-breakdown voltage p-channel MOS transistors TP21 to TP24 and low-breakdown voltage n-channel MOS transistors TN31 to TN34.

The voltage VDDSA is applied to one end of the transistor TP21. The other end of the transistor TP21 is connected to one end of the transistor TP22. A signal TLL is input to the gate of the transistor TP21.

The other end of the transistor TP22 is connected to one end of the transistor TN32. The gate of the transistor TP22 is connected to the node INV_T.

The voltage VDDSA is applied to one end of the transistor TP23. The other end of the transistor TP23 is connected to one end of the transistor TP24. A signal TLI is input to the gate of the transistor TP23.

The other end of the transistor TP24 is connected to one end of the transistor TN33. The gate of the transistor TP24 is connected to a node LAT_T.

One end of the transistor TN31 is connected to the node LAT_T. The other end of the transistor TN31 is connected to the bus LBUS. A signal TTL is input to the gate of the transistor TN31.

The other end of the transistor TN32 is grounded (the ground voltage VSS is applied). The gate of the transistor TN32 is connected to the node INV_T.

The other end of the transistor TN33 is grounded. The gate of the transistor TN33 is connected to the node LAT_T.

One end of the transistor TN34 is connected to the node INV_T. The other end of the transistor TN34 is connected to the bus LBUS. A signal TTI is input to the gate of the transistor TN34.

The latch circuit TDL stores data at the node LAT_T. The latch circuit TDL stores inverted data of the data stored in the node LAT_T at the node INV_T. For example, when the latch circuit TDL stores the "1" data, a voltage at the "L" level (voltage VSS) is applied to the node INV_T. When the latch circuit TDL stores the "0" data, a voltage at the "H" level (voltage VDDSA) is applied to the node INV_T.

For example, the latch circuit TDL receives signals TLL, TLI, TTL, and TTI from the sequencer 23.

1.1.11.5 Configuration of Latch Circuits ADL, BDL, and CDL

Next, the configurations of the latch circuits ADL, BDL, and CDL will be briefly described. The configurations of the latch circuits ADL, BDL, and CDL are similar to those of the latch circuits SDL and TDL. For example, in a signal *LL corresponding to the signal SLL, a signal *LI corresponding to the signal SLI, a signal *TL corresponding to the signal STL, a signal *TI corresponding to the signal STI, a node LAT_* corresponding to the node LAT_S, and a node INV_* corresponding to the node INV_S, in the latch circuit ADL, the latch circuit ADL is configured by writing "A" to *. That is, signals ALL, ALI, ATL, and ATI and nodes LAT_A and INV_A are listed. Similarly, in the latch circuit BDL, the "B" is written to *. In the latch circuit CDL, the "C" is written to *.

1.1.11.6 Configuration of LBUS Pre-Charge Circuit

Next, the LBUS pre-charge circuit LBPC will be described. The LBUS pre-charge circuit LBPC is a charging circuit for the bus LBUS. The LBUS pre-charge circuit LBPC includes a low-breakdown voltage n-channel MOS transistor TN41. The voltage VDDSA is applied to one end of the transistor TN41. The other end of the transistor TN41 is connected to the bus LBUS. A signal LPC is input to the gate of the transistor TN41. The LBUS pre-charge circuit LBPC, for example, pre-charges the bus LBUS before transferring the sense result of the sense circuit SA to the bus LBUS during the read operation.

For example, the LBUS pre-charge circuit LBPC receives the signal LPC from the sequencer 23.

1.1.11.7 Configuration of DBUS Switch Circuit

Next, the DBUS switch circuit DBSW will be described. The DBUS switch circuit DBSW is a circuit connecting the sense amplifier unit SAU and the bus DBUS. In other words, the DBUS switch circuit DBSW connects the sense amplifier unit SAU and the latch circuit XDL. The DBUS switch circuit DBSW includes a low-breakdown voltage n-channel MOS transistor TN42. One end of the transistor TN42 is connected to the bus LBUS. The other end of the transistor TN42 is connected to the bus DBUS. A signal DSW is input to the gate of the transistor TN42.

For example, the DBUS switch circuit DBSW receives the signal DSW from the sequencer 23.

1.2 Threshold Voltage Distribution of Memory Cell Transistors

Figure 17:
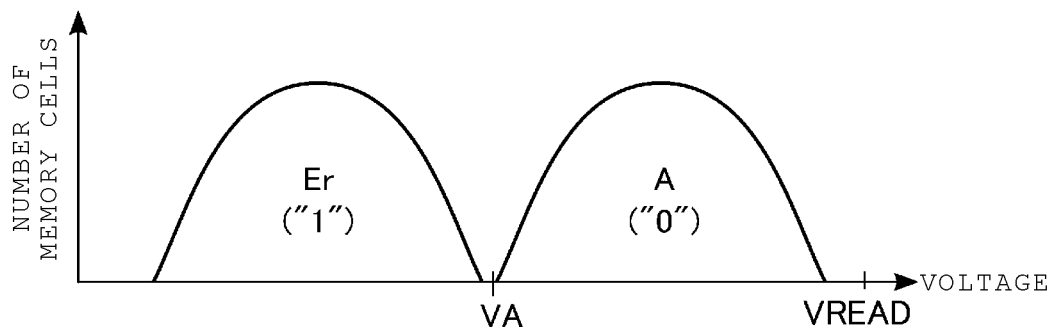
FIG. 17 is a diagram illustrating a threshold voltage distribution when a memory cell transistor provided in the semiconductor memory device according to the first embodiment is a single level cell (SLC) capable of storing 1-bit (binary value) data.
Figure 18:
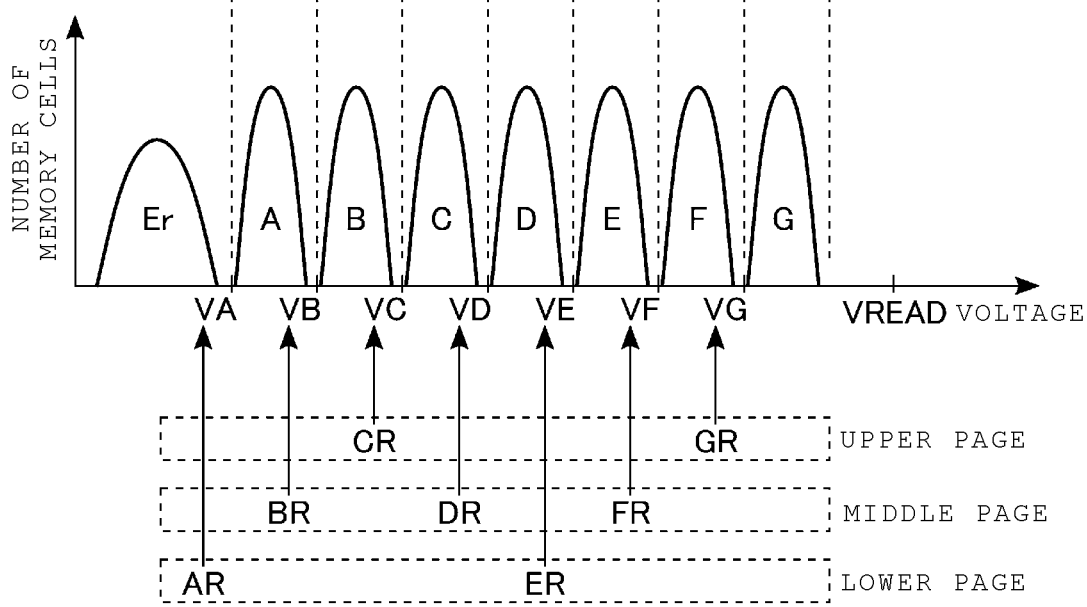
FIG. 18 is a diagram illustrating a threshold voltage distribution and a data allocation when the memory cell transistor provided in the semiconductor memory device according to the first embodiment is a triple level cell (TLC) capable of storing 3-bit (eight values) data.

Next, an example of a possible threshold voltage distribution of the memory cell transistor MC will be described with reference to FIGS. 17 and 18. FIG. 17 is a diagram illustrating a threshold voltage distribution when the memory cell transistor MC is a single level cell (SLC) capable of storing 1-bit (binary) data. FIG. 18 is a diagram illustrating a threshold voltage distribution and data allocation when the memory cell transistor MC is a triple level cell (TLC) capable of storing 3-bit (8-valued) data. The number of bits of data that can be stored in the memory cell transistor MC can be freely selected. For example, the memory cell transistor MC may be a multi-level cell (MLC) capable of storing 2-bit (4-valued) data, may be a quad level cell (QLC) capable of storing 4-bit (16-valued) data, or may be a penta level cell (PLC) capable of storing 5-bit (32-valued) data.

As illustrated in FIG. 18, the threshold voltage of the SLC has a value provided in any one of two discrete threshold voltage distributions. Hereinafter, the two threshold voltage distributions are denoted as an "Er" state and an "A" state, respectively, in ascending order.

The "Er" state corresponds to, for example, a data erased state. The "A" state corresponds to a state in which charges are injected into the charge storage layer and data is written. During the write operation, a verification voltage corresponding to the threshold voltage distribution of the "A" state is denoted by VA. A voltage VA and a voltage VREAD have a relationship of VA<VREAD. The voltage VREAD is a voltage applied to the non-selected word lines WL during the read operation. When the voltage VREAD is applied to the gate of the memory cell transistor MC, the memory cell transistor MC is turned on regardless of the stored data.

More specifically, the threshold voltage provided in the "Er" state is lower than the voltage VA. The threshold voltage provided in the "A" state is the voltage VA or higher, and is lower than the voltage VREAD.

For example, "1" data is allocated to the "Er" state, and "0" data is allocated to the "A" state. Accordingly, the memory cell transistor MC stores binary data.

As illustrated in FIG. 18, in the case of the TLC, the threshold voltage of each memory cell transistor MC has a discrete value provided in for example, any one of eight distributions. Hereinafter, eight distributions are denoted as an "Er" state, an "A" state, a "B" state, a "C" state, a "D" state, an "E" state, an "F" state, and a "G" state in ascending order of the threshold voltage, The "Er" state corresponds to, for example, a data erased state. The "A" to "G" states correspond to states in which charges are injected into the charge storage layer and data is written. During the write operation, verification voltages corresponding to the respective threshold voltage distributions are VA to VG. The voltage values have a relationship of VA<VB<VC<VD<VE<VF<VG<VREAD.

More specifically, the threshold voltage provided in the "Er" state is lower than a voltage VA. The threshold voltage provided in the "A" state is the voltage VA or higher, and is lower than the voltage VB. The threshold voltage provided in the "B" state is the voltage VB or higher, and is lower than the voltage VC. The threshold voltage provided in the "C" state is the voltage VC or higher, and is lower than the voltage VD. The threshold voltage provided in the "D" state is the voltage VD or higher, and is lower than the voltage VE. The threshold voltage provided in the "E" state is the voltage VE or higher, and is lower than the voltage VF. The threshold voltage provided in the "F" state is the voltage VF or higher, and is lower than the voltage VG. The threshold voltage provided in the "G" state is the voltage VG or higher, and is lower than the voltage VREAD.

For example, the read voltages corresponding to the read operation of the "A" to "G" states are denoted by VA to VG, respectively. The voltages have a relationship of VA<VB<VC<VD<VE<VF<VG<VREAD.

It should be noted that the set value of the verification voltage and the set value of the read voltage corresponding to each state may be the same or may be different. In the following, for the simplification of description, the case where the verification voltage and the read voltage are set to the same value will be described.

Hereinafter, the read operations corresponding to the "A" to "G" states are denoted as an AR read operation, a BR read operation, a CR read operation, a DR read operation, an ER read operation, an FR read operation, and a GR read operation, respectively. The AR read operation determines whether the threshold voltage of the memory cell transistor MC is less than the voltage VA. The BR read operation determines whether the threshold voltage of the memory cell transistor MC is lower than the voltage VB. The CR read operation determines whether the threshold voltage of the memory cell transistor MC is less than the voltage VC. Hereinafter, the same applies.

As described above, each memory cell transistor MC may be in eight types of states by having any one of the eight threshold voltage distributions. By allocating the states to "000" to "111" in binary notation, each memory cell transistor MC may hold 3-bit data. Hereinafter, the 3-bit data are denoted as a lower bit, a middle bit, and an upper bit, respectively. A set of lower bits collectively written (or read) to the cell unit CU is called a lower page, a set of middle bits is called a middle page, and a set of upper bits is called an upper page.

In the example of FIG. 17, data are allocated to "upper bit/middle bit/lower bit" as illustrated below for the memory cell transistors MC provided in each threshold voltage distribution.

"Er" state: "111" data
"A" state: "110" data
"B" state: "100" data
"C" state: "000" data
"D" state: "010" data
"E" state: "011" data
"F" state: "001" data
"G" state: "101" data When reading the data allocated as such, the lower bits are determined by the AR read operation and the ER read operation. The middle bits are determined by the BR read operation, the DR read operation, and the FR read operation. The upper bits are determined by the CR read operation and the GR read operation. That is, the values of the lower bit, the middle bit, and the upper bit are determined by two times, three times, and two times of read operations, respectively. The data allocation is hereinafter denoted as a "2-3-2 code". It should be noted that the allocation of data to the "Er" to "G" states is not limited to the 2-3-2 code.

1.3 Read Operation of SLC

Next, the read operation of the SLC will be described.

The read operation of the SLC includes the 1CU read operation and the 2CU read operation. In the following, the 2CU read operation will be described, and the description of the 1CU read operation will be omitted.

1.3.1 Flow of 2CU Read Operation of SLC

Figure 19:
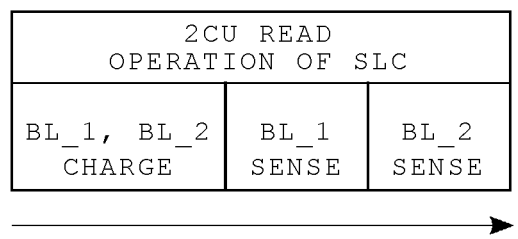
FIG. 19 is a diagram illustrating a flow of a 2CU read operation of the SLC focusing on an operation of the sense amplifier unit provided in the semiconductor memory device according to the first embodiment.

First, an example of the flow of the 2CU read operation of the SLC will be described with reference to FIG. 19. FIG. 19 is a diagram illustrating the flow of the 2CU read operation of the SLC focusing on the operation of the sense amplifier unit SAU.

As illustrated in FIG. 19, when performing the 2CU read operation, first, the sense amplifier unit SAU collectively (i.e., concurrently) charges the corresponding bit lines BL_1 and BL_2. Next, the sense amplifier unit SAU performs a sensing operation (BL_1 sense) with respect to the bit line BL_1. Next, the sense amplifier unit SAU performs the sensing operation (BL_2 sense) with respect to the bit line BL_2. In other words, the 2CU read operation of the SLC includes a period for charging the bit lines BL_1 and BL_2, a period for performing the sensing operation with respect to the bit line BL_1, and a period for performing the sensing operation with respect to the bit line BL_2.

1.3.2 Timing Chart of 2CU Read Operation of SLC

Figure 20:
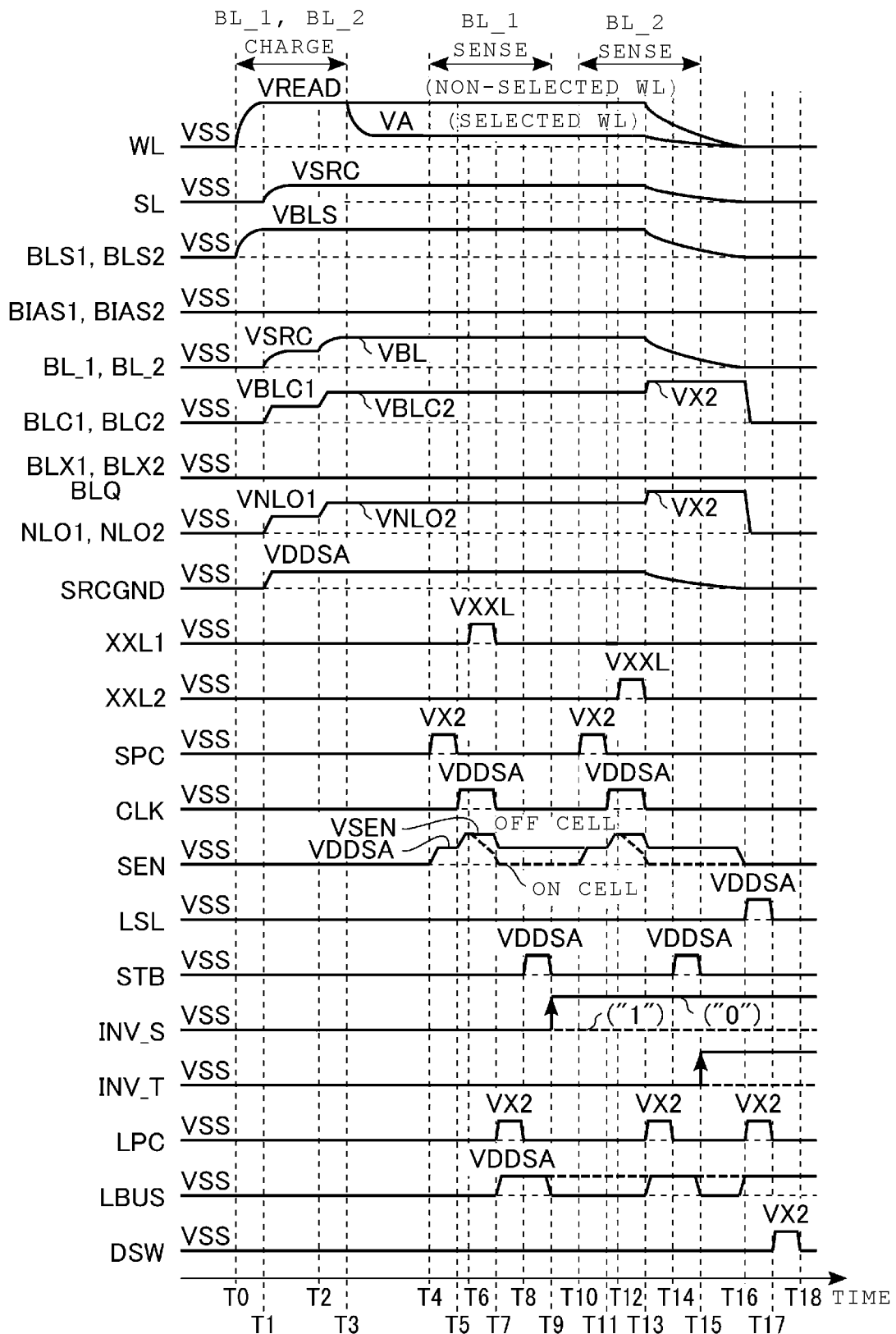
FIG. 20 is a timing chart illustrating respective voltages of wirings and signals during the 2CU read operation of the semiconductor memory device according to the first embodiment.

Next, an example of a timing chart of the 2CU read operation of the SLC will be described with reference to FIG. 20. FIG. 20 is a timing chart illustrating the respective voltages of wirings and signals during the 2CU read operation. It should be noted that the select gate lines SGD and SGS are omitted in the example of FIG. 20.

As illustrated in FIG. 20, during the period from time T0 to T3, the activation of the bit line BL and the word line WL are performed. That is, during the period from time T0 to T3, the bit lines BL_1 and BL_2 are charged.

At time T0, the row decoder 25 applies the voltage VREAD to the non-selected word lines WL and the selected word line WL of the selected block BLK. Accordingly, each memory cell transistor MC in the selected block BLK is turned on. A voltage VBLS is applied as a voltage at the "H" level to the signals BLS1 and BLS2 of the BL hookup circuit BLHU. The voltage VBLS is a relatively high voltage to turn on the transistors THN2 and THN4. The voltage VBLS is a voltage higher than the voltage VDDSA. The transistors THN2 and THN4 are turned on. Accordingly, the bit line BL_1 is electrically connected to the node BLI1. The bit line BL_2 is electrically connected to the node BLI2.

At time T1, a voltage VSRC is applied to the source line SL. The voltage VSRC is higher than the voltage VSS and lower than the voltage VDDSA. A voltage VBLC1 is applied to the signals BLC1 and BLC2 of the sense circuit SA. The voltage VBLC1 is a voltage higher than the voltage VSS. More specifically, for example, when the threshold voltage of the low-breakdown voltage n-channel MOS transistor used in the sense amplifier 26 is denoted by Vth, the voltage VBLC1 and the voltage VSRC have a relationship of VBLC1=VSRC+Vth. Accordingly, the transistors TN3 and TN8 are turned on. A voltage VNLO1 is applied to the signals NLO1 and NLO2. The voltage VNLO1 is a voltage VBLC1 or higher. Accordingly, the transistors TN5 and TN10 are turned on. The voltage VDDSA is applied to the node SRCGND.

The voltage VSRC is applied to the bit line BL_1 from the sense circuit SA via the transistors TN5, TN3, and THN2. The voltage VSRC is applied to the bit line BL_2 from the sense circuit SA via the transistors TN10, TN8, and THN4. It should be noted that the voltage VSRC may be applied to the bit lines BL_1 and BL_2 from the source line SL side via the select block BLK.

At time T2, a voltage VBLC2 is applied to the signals BLC1 and BLC2. The voltage VBLC2 is a voltage higher than a voltage VBL applied to the bit line BL. For example, the voltage VBLC2 and the voltage VBL have a relationship of VBLC2=VBL+Vth. A voltage VNLO2 is applied to the signals NLO1 and NLO2. For example, the voltage VNLO2 is a voltage which is the voltage VBLC2 or higher, and is lower than the voltage VDDSA. Accordingly, in the connection unit BLU1, the voltage VBL is applied to the bit line BL_1 from the node SRCGND via the transistors TN5, TN3, and THN2. Similarly, in the connection unit BLU2, the voltage VBL is applied to the bit line BL_2 from the node SRCGND via the transistors TN10, TN8, and THN4.

The period from time T3 to T4 is a period of transition of the word line WL and voltage stabilization of the bit line BL during the read operation.

At time T3, the row decoder 25 applies the read voltage VA to the selected word line WL. Accordingly, for example, when the read target memory cell transistor MC stores the "1" data (in the "Er" state), the memory cell transistor MC is turned on (hereinafter also denoted as an "on cell"). When the read target memory cell transistor MC stores the "0" data (in the "A" state), the memory cell transistor MC is turned off (hereinafter also denoted as an "off cell").

During the period from time T4 to T9, the sensing operation (BL_1 sense) with respect to the bit line BL_1 is performed.

At time T4, a voltage VX2 is applied to the signal SPC. The voltage VX2 is a voltage higher than the voltage VDDSA. Accordingly, the transistor TN11 is turned on. Therefore, the voltage VDDSA is applied to the node SEN.

At time T5, the voltage VSS is applied to the signal SPC. Accordingly, the transistor TN11 is turned off. The voltage VDDSA is applied to the signal CLK. Due to the capacitive coupling by the capacitive element CA, the voltage of the node SEN is increased to a voltage VSEN. The voltage VSEN is a voltage higher than the voltage VDDSA. Hereinafter, the operation of raising the voltage of the node SEN by the signal CLK is also referred to as a "clock up".

During the period from time T6 to T7, the sensing of the node SEN is performed.

At time T6, a voltage VXXL is applied to the signal XXL1. The voltage VXXL is higher than the voltage VNLO2, and lower than the voltage VDDSA. Accordingly, the transistor TN4 is turned on. When the read target memory cell transistor MC is the on cell, a current flows from the node SEN to the bit line BL_1. Therefore, the voltage of the node SEN is decreased. When the read target memory cell transistor MC is the off cell, almost no current flows from the node SEN to the bit line BL_1. Therefore, the voltage of the node SEN is little lowered.

At time T7, the voltage VSS is applied to the signal XXL1. Accordingly, the transistor TN4 is turned off. The voltage VSS is applied to the signal CLK. Due to the capacitive coupling by the capacitive element CA, the voltage of the node SEN is decreased. Hereinafter, the operation of lowering the voltage of the node SEN with the signal CLK is also denoted as a "clock down". For example, in the sense circuit SA corresponding to the off cell, the voltage of the node SEN is higher than the threshold voltage of the transistor TN14. That is, the node SEN is at the "H" level. Therefore, the transistor TN14 is turned on. In the sense circuit SA corresponding to the on cell, the voltage of the node SEN is lower than the threshold voltage of the transistor TN14. That is, the node SEN is at the "L" level. Therefore, the transistor TN14 is maintained off. In the LBUS pre-charge circuit LBPC, the voltage VX2 is applied to the signal LPC. Accordingly, the transistor TN41 is turned on. The voltage VDDSA is applied to the bus LBUS.

During the period from time T8 to T9, the strobe of the bit line BL_1 is performed.

At time T8, the voltage VSS is applied to the signal LPC. Accordingly, the transistor TN41 is turned off. The voltage VDDSA is applied to the signal STB. Accordingly, the transistor TN13 is turned on. For example, in the sense circuit SA corresponding to the off cell, since the transistor TN14 is turned on, the voltage VSS is applied to the bus LBUS. That is, the voltage of the bus LBUS is decreased. In the sense circuit SA corresponding to the on cell, since the transistor TN14 is turned off, the bus LBUS maintains the voltage VDDSA. In other words, in the case of the off cell, the bus LBUS is at the "L" level. In the case of the on cell, the bus LBUS is at the "H" level.

At time T9, the voltage VSS is applied to the signal STB. Accordingly, the transistor TN13 is turned off. Data of the bus LBUS is transferred to the latch circuit SDL. For example, in the case of the off cell, the "L" level data of the bus LBUS is transferred to the latch circuit SDL. Therefore, the node LAT_S is at the "L" level, and the node INV_S is at the "H" level. In other words, when the memory cell transistor MC stores the "0" data, the node INV_S is at the "H" level. In the case of the on cell, the "H" level data of the bus LBUS is transferred to the latch circuit SDL. Therefore, the node LAT_S is at the "H" level, and the node INV_S is at the "L" level. In other words, when the memory cell transistor MC stores the "1" data, the node INV_S is at the "L" level.

During the period from time T10 to T15, the sensing operation (BL_2 sense) with respect to the bit line BL_2 is performed.

At time T10, the voltage VX2 is applied to the signal SPC. Accordingly, the transistor TN11 is turned on. Therefore, the voltage VDDSA is applied to the node SEN.

At time T11, the voltage VSS is applied to the signal SPC. Accordingly, the transistor TN11 is turned off. The voltage VDDSA is applied to the signal CLK. Due to the clock up, the voltage of the node SEN is increased to the voltage VSEN.

During the period from time T12 to T13, the sensing of the node SEN is performed.

At time T12, the voltage VXXL is applied to the signal XXL2. Accordingly, the transistor TN9 is turned on. When the read target memory cell transistor MC is the on cell, a current flows from the node SEN to the bit line BL_2. Therefore, the voltage of the node SEN is decreased. When the read target memory cell transistor MC is the off cell, almost no current flows from the node SEN to the bit line BL_2. Therefore, the voltage of the node SEN is little lowered.

At time T13, the voltage VSS is applied to the signal XXL2. Accordingly, the transistor TN9 is turned off. The voltage VSS is applied to the signal CLK. Due to the clock down, the voltage of the node SEN is decreased. For example, in the sense circuit SA corresponding to the off cell, the node SEN is at the "H" level. Therefore, the transistor TN14 is turned on. In the sense circuit SA corresponding to the on cell, the node SEN is at the "L" level. Therefore, the transistor TN14 is maintained off. In the LBUS pre-charge circuit LBPC, the voltage VX2 is applied to the signal LPC. Accordingly, the transistor TN41 is turned on. The voltage VDDSA is applied to the bus LBUS.

During the period from time T13 to T16, the bit line BL and the word line WL are lowered. More specifically, during the period from time T13 to T16, the row decoder 25 applies the voltage VSS to the selected word line WL and the non-selected word lines WL. The voltage VSS is applied to the source line SL. The voltage VSS is applied to the signals BLS1 and BLS2 of the BL hookup circuit BLHU. Accordingly, the transistors THN2 and THN4 are turned off. The voltage VX2 is applied to the signals BLC1 and BLC2. Similarly, the voltage VX2 is applied to the signals NLO1 and NLO2. The voltage VSS is applied to the node SRCGND. Accordingly, the voltage VSS is applied to the bit lines BL_1 and BL_2.

During the period from time T14 to T15, the strobe of the bit line BL_2 is performed.

At time T14, the voltage VSS is applied to the signal LPC. Accordingly, the transistor TN41 is turned off. The voltage VDDSA is applied to the signal STB. Accordingly, the transistor TN13 is turned on. For example, in the sense circuit SA corresponding to the off cell, since the transistor TN14 is turned on, the voltage VSS is applied to the bus LBUS. That is, the voltage of the bus LBUS is decreased. In the sense circuit SA corresponding to the on cell, since the transistor TN14 is turned off, the bus LBUS maintains the voltage VDDSA. In other words, in the case of the off cell, the bus LBUS is at the "L" level. In the case of the on cell, the bus LBUS is at the "H" level.

At time T15, the voltage VSS is applied to the signal STB. Accordingly, the transistor TN13 is turned off. The data of the bus LBUS is transferred to the latch circuit TDL. For example, in the case of the off cell, the "L" level data of the bus LBUS is transferred to the latch circuit TDL. Therefore, the node LAT_T is at the "L" level, and the node INV_T is at the "H" level. In other words, when the memory cell transistor MC stores the "0" data, the node INV_T is at the "H" level. In the case of the on cell, the "H" level data of the bus LBUS is transferred to the latch circuit TDL. Therefore, the node LAT_T is at the "H" level, and the node INV_T is at the "L" level. In other words, when the memory cell transistor MC stores the "1" data, the node INV_T is at the "L" level.

At time T16, the voltage VDDSA is applied to the signal LSL. Accordingly, the transistor TN15 is turned on. The voltage VX2 is applied to the signal LPC. Accordingly, the transistor TN41 is turned on. Therefore, the voltage VDDSA is applied to the bus LBUS. Accordingly, the transistor TN16 is turned on. The voltage VSS is applied to the node SEN via the transistors TN15 and TN16.

At time T17, the voltage VSS is applied to the signal LSL. Accordingly, the transistor TN15 is turned off. The voltage VSS is applied to the signal LPC. Accordingly, the transistor TN41 is turned off. The voltage VX2 is applied to the signal DSW. Accordingly, the transistor TN42 is turned on. That is, the bus LBUS is electrically connected to the bus DBUS.

During the period from time T17 to T18, data is transferred to the latch circuit XDL.

At time T18, the voltage VSS is applied to the signal DSW. Accordingly, the transistor TN42 is turned off.

1.4 Write Operation of SLC

Next, the write operation of the SLC will be described.

First, the write operation will be described. The write operation includes a program operation and a program verification operation.

The program operation is an operation that increases the threshold voltage by injecting electrons into the charge storage layer (or maintains the threshold voltage by injecting few electrons into the charge storage layer). During the program operation, the memory cell transistor MC is set as program target or program inhibition based on the write data stored in the sense amplifier unit SAU. The memory cell transistor MC not reaching the threshold voltage of the state of the write target is set as the program target. The memory cell transistor MC reaching the threshold voltage of the state of the write target is set as program inhibition.

The program verification operation is an operation of reading data after a program operation and determining whether the threshold voltage of the memory cell transistor MC reaches a target level (state of a write target). Hereinafter, the case where the threshold voltage of the memory cell transistor MC reaches the target level is denoted as "verification passed", and the case where the threshold voltage does not reach the target level is denoted as "verification failed". More specifically, for example, during the program verification operation, when the number of fail bits of the read data is a preset reference value or higher, the case is determined to be "verification failed". By repeating a combination (hereinafter denoted as a "program loop") of the program operation and the program verification operation, the threshold voltage of the memory cell transistor MC is increased to the target level.

The write operation of the SLC includes the 1CU write operation and the 2CU write operation. In the following, the 2CU write operation will be described, and the description of the 1CU write operation will be omitted.

1.4.1 Flow of 2CU Write Operation of SLC

Figure 21:
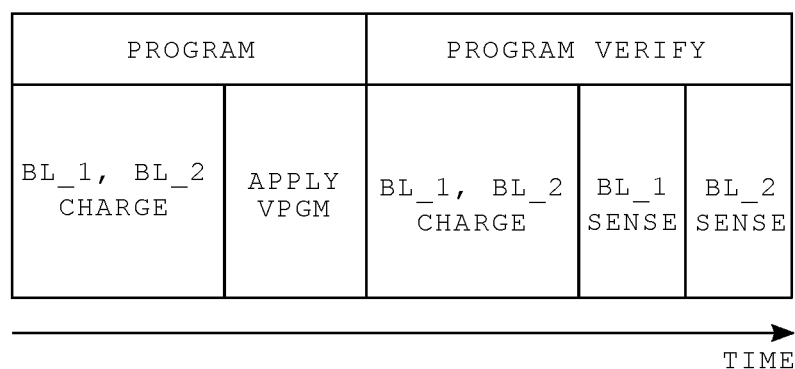
FIG. 21 is a diagram illustrating a flow of a 2CU write operation of the SLC focusing on an operation of the sense amplifier unit provided in the semiconductor memory device according to the first embodiment.

First, an example of the flow of the 2CU write operation of the SLC will be described with reference to FIG. 21. FIG. 21 is a diagram illustrating the flow of the 2CU write operation of the SLC focusing on the operation of the sense amplifier unit SAU. It should be noted that the example of FIG. 21 illustrates one program loop.

As illustrated in FIG. 21, during the program operation, first, the sense amplifier unit SAU collectively (i.e., concurrently) charges the bit lines BL_1 and BL_2 based on the data (for example, the "1" data) stored in the latch circuits SDL and TDL. More specifically, the sense amplifier unit SAU collectively charges the bit lines BL_1 and BL_2 corresponding to the remaining memory cell transistors MC which is set as the program inhibition. After that, the row decoder 25 applies a voltage VPGM to the selected word line WL. The voltage VPGM is a high voltage capable of raising the threshold voltage of the memory cell transistor MC. The voltage VPGM is stepped up, for example, according to repetition of the program loop. That is, the program voltage VPGM may be increased according to the number of program loops performed. Accordingly, data is collectively written to the program target memory cell transistors MC in the memory cell arrays 11_1 and 11_2. That is, the program operations of the array chips 10_1 and 10_2 are concurrently performed. In other words, during the 2CU write operation of the SLC, the program operation includes a period for charging the bit lines BL_1 and BL_2 and a period for applying the voltage VPGM to the selected word line WL.

Next, during the program verification operation, first, the sense amplifier unit SAU collectively charges the corresponding bit lines BL_1 and BL_2. Next, the sense amplifier unit SAU performs the sensing operation (BL_1 sense) with respect to the bit line BL_1. Next, the sense amplifier unit SAU performs the sensing operation (BL_2 sense) with respect to the bit line BL_2. In other words, during the 2CU write operation of the SLC, the program verification operation includes a period for charging the bit lines BL_1 and BL_2, a period for performing the sensing operation with respect to the bit line BL_1, and a period for performing the sensing operation with respect to the bit line BL_2.

1.4.2 Program Operation Corresponding to 2CU Write Operation of SLC

Figure 22:
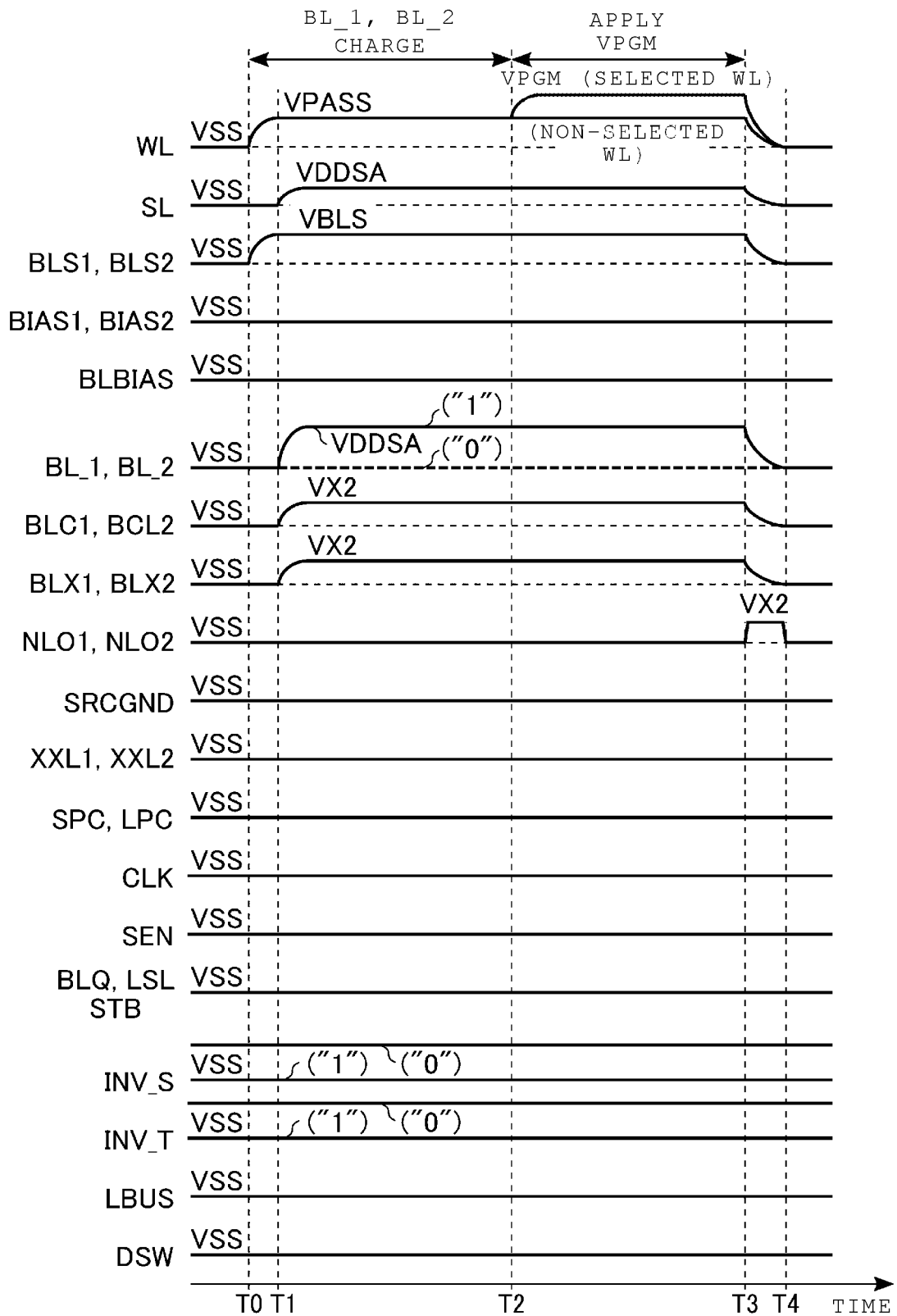
FIG. 22 is a timing chart illustrating respective voltages of wirings and signals in a program operation corresponding to the 2CU write operation of the SLC of the semiconductor memory device according to the first embodiment.

Next, an example of the program operation corresponding to the 2CU write operation of the SLC will be described with reference to FIG. 22. FIG. 22 is a timing chart illustrating respective voltages of wirings and signals during the program operation corresponding to the 2CU write operation of the SLC. It should be noted that the select gate lines SGD and SGS are omitted in the example of FIG. 22.

As illustrated in FIG. 22, during the period from time T0 to T2, the activation of the bit line BL and the word line WL is performed. That is, during the period from time T0 to T2, the bit lines BL_1 and BL_2 are charged.

At time T0, the row decoder 25 applies a voltage VPASS to the non-selected word lines WL and the selected word line WL of the selected block BLK. The voltage VPASS is a voltage turning on the corresponding memory cell transistor MC regardless of the threshold voltage of the memory cell transistor MC. Accordingly, each memory cell transistor MC in the selected block BLK is turned on. The voltage VBLS is applied to the signals BLS1 and BLS2 of the BL hookup circuit BLHU. Accordingly, the transistors THN2 and THN4 are turned on.

At time T1, the voltage VDDSA is applied to the source line SL. The voltage VX2 is applied to the signals BLX1 and BLX2 of the sense circuit SA. Accordingly, the transistors TN2 and TN7 are turned on. Similarly, the voltage VX2 is applied to the signals BLC1 and BLC2. Accordingly, the transistors TN3 and TN8 are turned on.

Here, when the "1" data is stored in the latch circuit SDL, the voltage VSS is applied to the node INV_S. That is, the node INV_S is at the "L" level. Here, the transistor TP1 is turned on, and the transistor TN1 is turned off. Therefore, the voltage VDDSA is applied to the bit line BL_1 via the transistors TP1, TN2, TN3, and THN2. When the "0" data is stored in the latch circuit SDL, the voltage VDDSA is applied to the node INV_S. That is, the node INV_S is at the "H" level. Here, the transistor TP1 is turned off, and the transistor TN1 is turned on. Therefore, the voltage VSS (the voltage of the node SRCGND) is applied to the bit line BL_1 via the transistors TN1, TN2, TN3, and THN2.

Similarly, when the "1" data is stored in the latch circuit TDL, the voltage VSS is applied to the node INV_T. That is, the node INV_T is at the "L" level. Here, the transistor TP2 is turned on, and the transistor TN6 is turned off. Therefore, the voltage VDDSA is applied to the bit line BL_2 via the transistors TP2, TN7, TN8, and THN4. When the "0" data is stored in the latch circuit TDL, the voltage VDDSA is applied to the node INV_T. That is, the node INV_T is at the "H" level. Here, the transistor TP2 is turned off, and the transistor TN6 is turned on. Therefore, the voltage VSS (the voltage of the node SRCGND) is applied to the bit line BL_2 via the transistors TN6, TN7, TN8, and THN4.

During the period from time T2 to T3, the voltage VPGM is applied.

At time T2, the row decoder 25 applies the voltage VPGM to the selected word line WL. When the voltage VPGM is applied to the selected word line WL, the threshold voltage of the memory cell transistor MC connected to the selected word line WL and to the bit line BL corresponding to the "0" data write is increased. An increase in the threshold voltage of the memory cell transistor MC connected to the selected word line WL and to the bit line BL for "1" data writing (program inhibition) is prevented by self-boost technology or the like.

During the period from time T3 to T4, the bit line BL and the word line WL are lowered. More specifically, during the period from time T3 to T4, the row decoder 25 applies the voltage VSS to the selected word line WL and the non-selected word lines WL. It should be noted that the voltage applied to the word line WL may be higher than the voltage VSS, and lower than the voltage VPGM. Accordingly, when transitioning to the program verification operation, which will be described below, the voltage fluctuation of the word line WL can be prevented. The voltage VSS is applied to the source line SL. The voltage VSS is applied to the signals BLS1 and BLS2 of the BL hookup circuit BLHU. Accordingly, the transistors THN2 and THN4 are turned off. The voltage VSS is applied to the signals BLX1 and BLX2 of the sense circuit SA. Accordingly, the transistors TN2 and TN7 are turned off. Similarly, the voltage VSS is applied to the signals BLC1 and BLC2. Accordingly, the transistors TN3 and TN8 are turned off. The voltage VX2 is applied to the signals NLO1 and NLO2. Accordingly, the transistors TN5 and TN10 are turned on. The voltage VSS is applied to the node SRCGND. Accordingly, the voltage VSS is applied to the bit lines BL_1 and BL_2.

Figure 23:
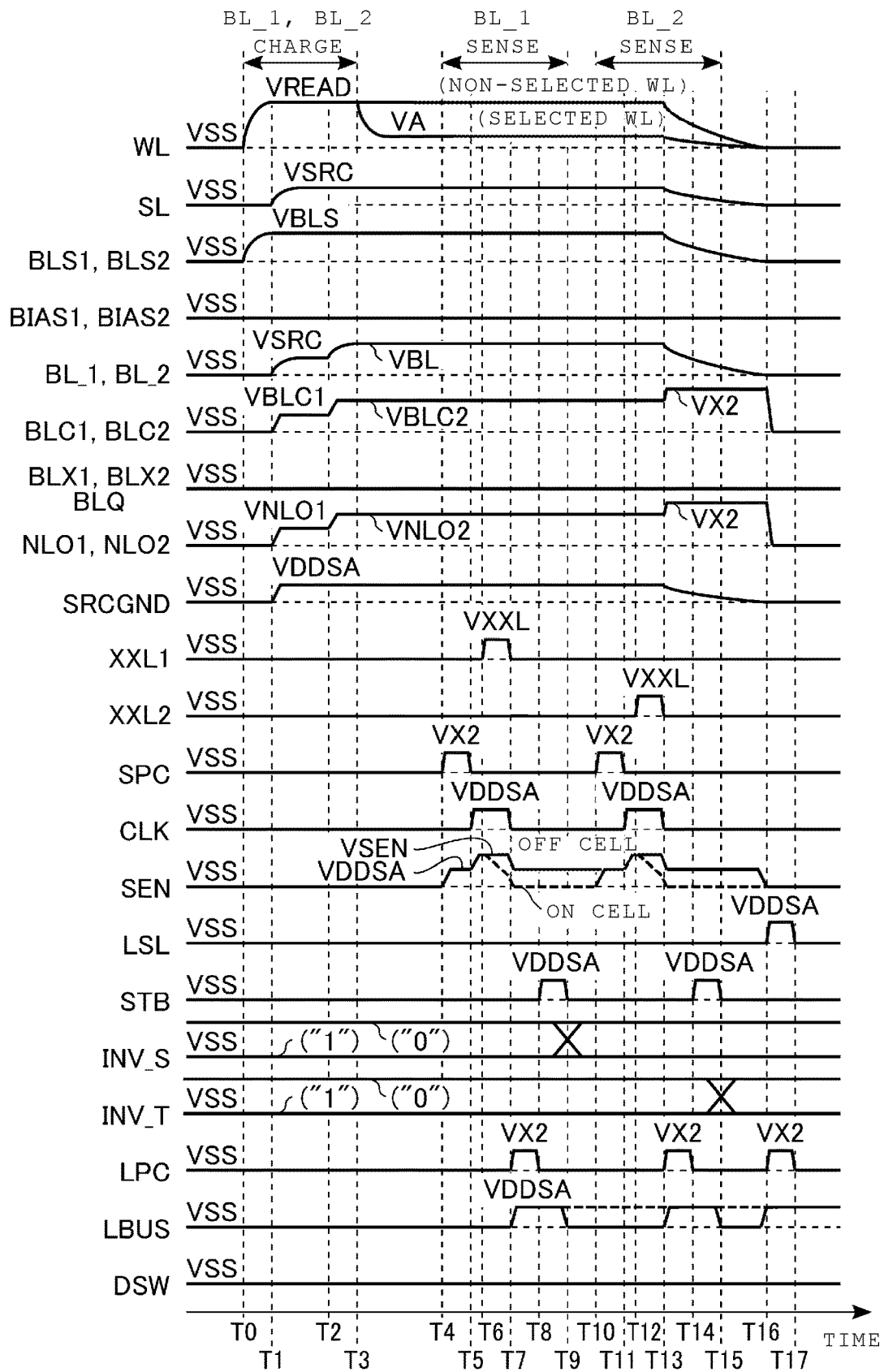
FIG. 23 is a timing chart illustrating respective voltages of wirings and signals in a program verification operation corresponding to the 2CU write operation of the SLC of the semiconductor memory device according to the first embodiment.

1.4.3 Program Verification Operation Corresponding to 2CU Write Operation of SLC Next, an example of the program verification operation corresponding to the 2CU write operation of the SLC will be described with reference to FIG. 23. FIG. 23 is a timing chart illustrating the respective voltages of wirings and signals during the program verification operation corresponding to the 2CU write operation of the SLC. It should be noted that the select gate lines SGD and SGS are omitted in the example of FIG. 23.

As illustrated in FIG. 23, during the period from time T0 to T17, the voltages of wirings and signals other than the nodes INV_S and INV_T are the same as those in FIG. 20. During the period from time T0 to T3, the bit lines BL_1 and BL_2 are charged. During the period from time T4 to T9, the sensing operation (BL_1 sense) with respect to the bit line BL_1 is performed. During the period from time T10 to T15, the sensing operation (BL_2 sense) with respect to the bit line BL_2 is performed. During the program verification operation, data is not transferred to the latch circuit XDL. Therefore, during the program verification operation, the operations after time T17 in FIG. 20 are omitted. The following description will focus on the nodes INV_S and INV_T.

During the program verification operation, the write data of the bit line BL_1 is stored in the latch circuit SDL. For example, when the write data is the "1" data, the node INV_S is at the "L" level. When the write data is the "0" data, the node INV_S is at the "H" level. That is, when the write data is the "1" data, the voltage VSS is applied to the node INV_S. When the write data is the "0" data, the voltage VDDSA is applied to the node INV_S. Similarly, the write data of the bit line BL_2 is stored in the latch circuit TDL. When the write data is the "1" data, the voltage VSS is applied to the node INV_T. When the write data is the "0" data, the voltage VDDSA is applied to the node INV_T.

During the period from time T8 to T9, the strobe of the bit line BL_1 is performed. As a result, among the latch circuits SDL storing "0" data, in the latch circuit SDL corresponding to the memory cell transistor MC (off cell) that has passed the verification, the node INV_S is at the "L" level. In other words, a logical product (AND) operation is performed on the node SEN and the latch circuit SDL, and the result is stored in the latch circuit SDL.

During the period from time T14 to T15, the strobe of the bit line BL_2 is performed. As a result, among the latch circuits TDL storing the "0" data, in the latch circuit TDL corresponding to the memory cell transistor MC (off cell) that has passed the verification, the node INV_T is at the "L" level.

1.5 Read Operation of TLC

Next, the read operation of the TLC will be described.

The read operation of the TLC includes the 1CU read operation and the 2CU read operation, similarly to the read operation of the SLC. For example, the TLC read operation methods include the NLK method and the LCK method. In the following, the 2CU read operation according to the NLK method will be described.

1.5.1 Flow of 2CU Read Operation of TLC

Figure 24:
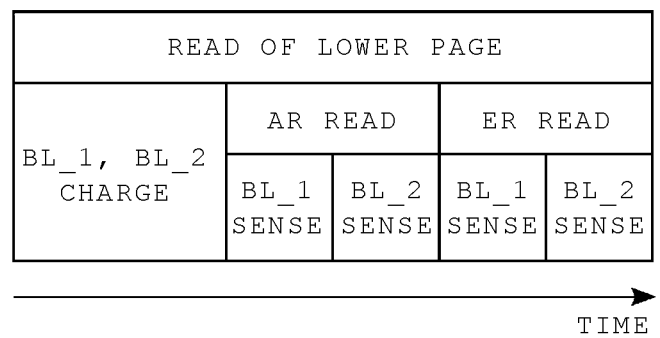
FIG. 24 is a diagram illustrating a flow of the 2CU read operation of the TLC focusing on the operation of the sense amplifier unit provided in the semiconductor memory device according to the first embodiment.

First, an example of the flow of the 2CU read operation of the TLC will be described with reference to FIG. 24. FIG. 24 is a diagram illustrating the flow of the 2CU read operation of the TLC focusing on the operation of the sense amplifier unit SAU. It should be noted that the example of FIG. 24 illustrates the read operation of the lower page.

As illustrated in FIG. 24, when performing the 2CU read operation, first, the sense amplifier unit SAU collectively charges the corresponding bit lines BL_1 and BL_2. Next, when reading the lower page, the sense amplifier unit SAU performs an AR read operation and an ER read operation. It should be noted that, when reading the middle page, the sense amplifier unit SAU performs a BR read operation, a DR read operation, and an FR read operation. When reading the upper page, the sense amplifier unit SAU performs a CR read operation and a GR read operation.

More specifically, first, during the AR read operation, the sense amplifier unit SAU sequentially performs the sensing operation (BL_1 sense) with respect to the bit line BL_1 and then the sensing operation (BL_2 sense) with respect to the bit line BL_2. Next, during the ER read operation, the sense amplifier unit SAU sequentially performs the sensing operation (BL_1 sense) with respect to the bit line BL_1 and then the sensing operation (BL_2 sense) with respect to the bit line BL_2. In other words, the 2CU read operation of the lower page of the TLC includes a period for charging the bit lines BL_1 and BL_2, a period for performing the sensing operation with respect to the bit line BL_1 and a period for performing the sensing operation with respect to the bit line BL_2 during the AR read operation, and a period for performing the sensing operation with respect to the bit line BL_1 and a period for performing the sensing operation with respect to the bit line BL_2 during the ER read operation.

1.5.2 Timing Chart of 2CU Read Operation of TLC

Figure 25:
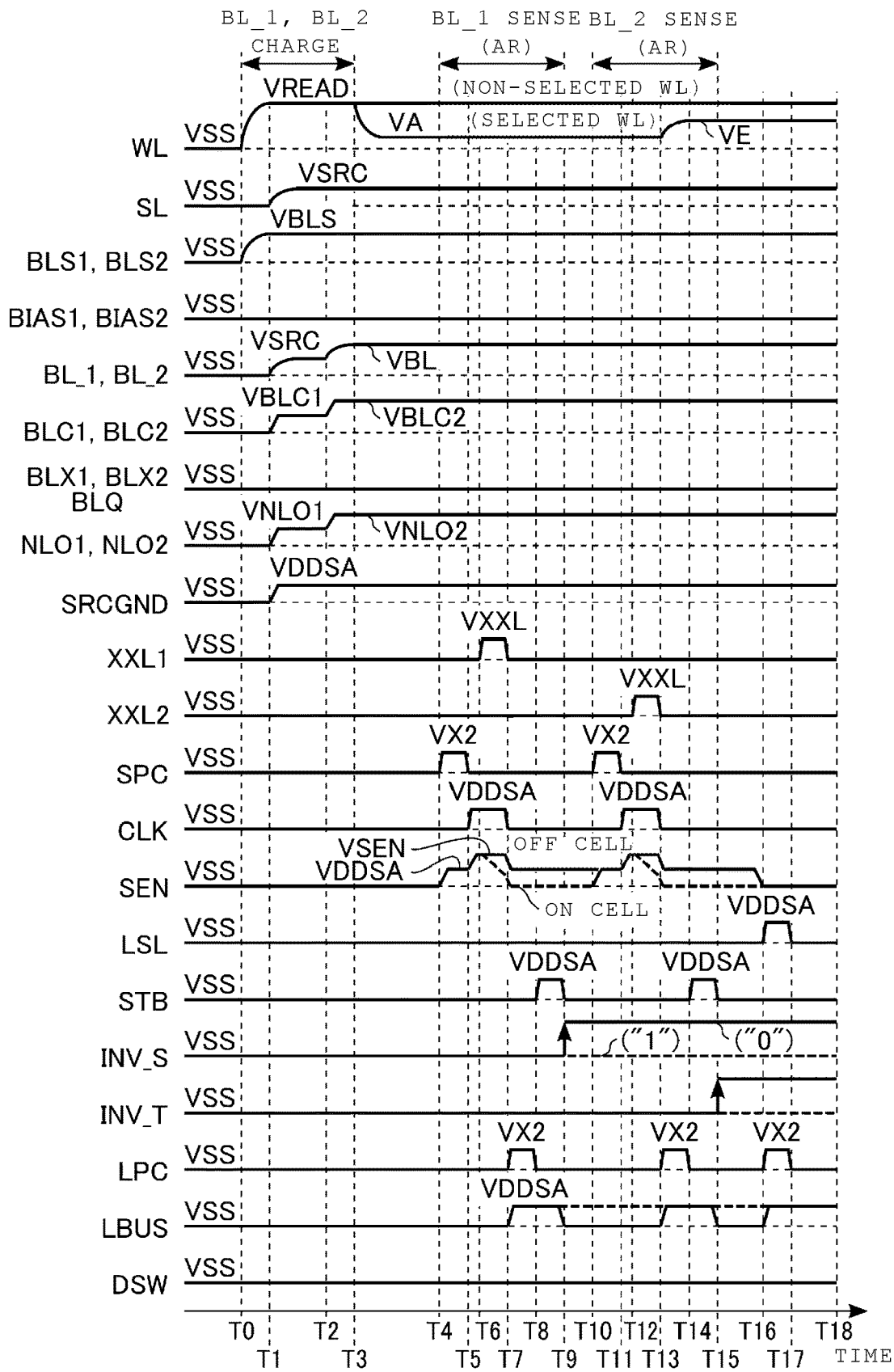
FIG. 25 is a timing chart illustrating respective voltages of wirings and signals during the 2CU read operation of the semiconductor memory device according to the first embodiment.
Figure 26:
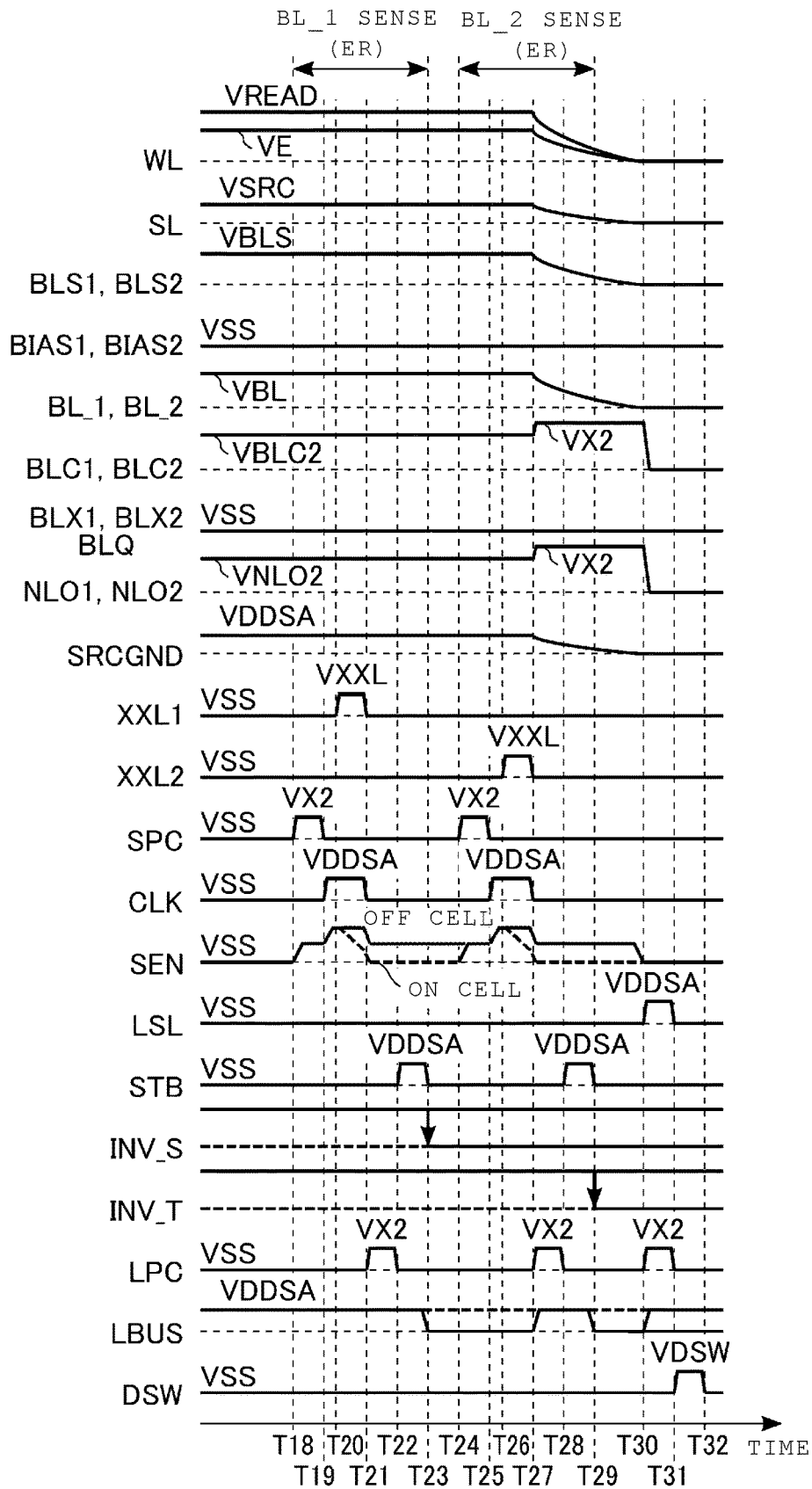
FIG. 26 is a timing chart illustrating respective voltages of wirings and signals during the 2CU read operation of the semiconductor memory device according to the first embodiment.

Next, an example of a timing chart of the 2CU read operation of the TLC will be described with reference to FIGS. 25 and 26. FIGS. 25 and 26 are timing charts illustrating the respective voltages of wirings and signals during the 2CU read operation. FIG. 25 illustrates a period from time T0 to T18. FIG. 26 illustrates a period from time T18 to T32. It should be noted that the select gate lines SGD and SGS are omitted in the examples of FIGS. 25 and 26.

As illustrated in FIG. 25, during the period from time T0 to T3, the activation of the bit line BL and the word line WL is performed. That is, during the period from time T0 to T3, the bit lines BL_1 and BL_2 are charged. The respective voltages of wirings and signals at times T0 to T3 are the same as those in FIG. 20.

The period from time T3 to T13 is the period of transition of the word line WL and voltage stabilization of the bit line BL during the AR read operation.

At time T3, the row decoder 25 applies the read voltage VA to the selected word line WL. Accordingly, for example, when the threshold voltage of the read target memory cell transistor MC is lower than the voltage VA, the memory cell transistor MC is turned on. When the threshold voltage of the read target memory cell transistor MC is the voltage VA or higher, the memory cell transistor MC is turned off. In other words, the memory cell transistor MC storing data in the "Er" state is used as the on cell. The memory cell transistor MC storing data in any one of the "A" to "G" states is used as the off cell.

During the period from time T4 to T9, the sensing operation (BL_1 sense) with respect to the bit line BL_1 during the AR read operation is performed.

At time T4, the voltage VX2 is applied to the signal SPC. Accordingly, the transistor TN11 is turned on. The voltage VDDSA is applied to the node SEN.

At time T5, the voltage VSS is applied to the signal SPC. Accordingly, the transistor TN11 is turned off. The voltage VDDSA is applied to the signal CLK. Due to the clock up, the voltage of the node SEN is increased to the voltage VSEN.

During the period from time T6 to T7, the sensing of the node SEN is performed.

At time T6, the voltage VXXL is applied to the signal XXL1. Accordingly, the transistor TN4 is turned on. When the read target memory cell transistor MC is the on cell, a current flows from the node SEN to the bit line BL_1 (the charges of the node SEN are moved). Therefore, the voltage of the node SEN is decreased. When the read target memory cell transistor MC is the off cell, almost no current flows from the node SEN to the bit line BL_1. Therefore, the voltage of the node SEN is little lowered.

At time T7, the voltage VSS is applied to the signal XXL1. Accordingly, the transistor TN4 is turned off. The voltage VSS is applied to the signal CLK. Due to the clock down, the voltage of the node SEN is decreased. For example, in the sense circuit SA corresponding to the off cell, the node SEN is at the "H" level. Therefore, the transistor TN14 is turned on. In the sense circuit SA corresponding to the on cell, the node SEN is at the "L" level. Therefore, the transistor TN14 is maintained off. In the LBUS pre-charge circuit LBPC, the voltage VX2 is applied to the signal LPC. Accordingly, the transistor TN41 is turned on. The voltage VDDSA is applied to the bus LBUS.

During the period from time T8 to T9, the strobe of the bit line BL_1 is performed.

At time T8, the voltage VSS is applied to the signal LPC. Accordingly, the transistor TN41 is turned off. The voltage VDDSA is applied to the signal STB. Accordingly, the transistor TN13 is turned on. For example, in the sense circuit SA corresponding to the off cell, since the transistor TN14 is turned on, the voltage VSS is applied to the bus LBUS. That is, the voltage of the bus LBUS is decreased. In the sense circuit SA corresponding to the on cell, since the transistor TN14 is turned off, the bus LBUS maintains the voltage VDDSA. In other words, in the case of the off cell, the bus LBUS is at the "L" level. In the case of the on cell, the bus LBUS is at the "H" level.

At time T9, the voltage VSS is applied to the signal STB. Accordingly, the transistor TN13 is turned off. The data of the bus LBUS is transferred to the latch circuit SDL. For example, in the case of the off cell, the data at the "L" level of the bus LBUS is transferred to the latch circuit SDL. Therefore, the node LAT_S is at the "L" level, and the node INV_S is at the "H" level. In other words, when the memory cell transistor MC stores the data in any one of the "A" to "G" states, the latch circuit SDL stores the "0" data. In the case of the on cell, the data at the "H" level of the bus LBUS is transferred to the latch circuit SDL. Therefore, the node LAT_S is at the "H" level, and the node INV_S is at the "L" level. In other words, when the memory cell transistor MC stores the data in the "Er" state, the latch circuit SDL stores the "1" data.

During the period from time T10 to T15, the sensing operation (BL_2 sense) with respect to the bit line BL_2 during the AR read operation is performed.

At time T10, the voltage VX2 is applied to the signal SPC. Accordingly, the transistor TN11 is turned on. Therefore, the voltage VDDSA is applied to the node SEN.

At time T11, the voltage VSS is applied to the signal SPC. Accordingly, the transistor TN11 is turned off. The voltage VDDSA is applied to the signal CLK. Due to the clock up, the voltage of the node SEN is increased to the voltage VSEN.

During the period from time T12 to T13, the sensing of the node SEN is performed.

At time T12, the voltage VXXL is applied to the signal XXL2. Accordingly, the transistor TN9 is turned on. When the read target memory cell transistor MC is the on cell, a current flows from the node SEN to the bit line BL_2. Therefore, the voltage of the node SEN is decreased. When the read target memory cell transistor MC is the off cell, almost no current flows from the node SEN to the bit line BL_2. Therefore, the voltage of the node SEN is little lowered.

At time T13, the voltage VSS is applied to the signal XXL2. Accordingly, the transistor TN9 is turned off. The voltage VSS is applied to the signal CLK. Due to the clock down, the voltage of the node SEN is decreased. For example, in the sense circuit SA corresponding to the off cell, the node SEN is at the "H" level. Therefore, the transistor TN14 is turned on. In the sense circuit SA corresponding to the on cell, the node SEN is at the "L" level. Therefore, the transistor TN14 is maintained off. In the LBUS pre-charge circuit LBPC, the voltage VX2 is applied to the signal LPC. Accordingly, the transistor TN41 is turned on. The voltage VDDSA is applied to the bus LBUS.

The period from time T13 to T27 is the period of transition of the word line WL and voltage stabilization of the bit line BL during the ER read operation.

At time T13, the row decoder 25 applies the read voltage VE to the selected word line WL. Accordingly, for example, when the threshold voltage of the read target memory cell transistor MC is lower than the voltage VE, the memory cell transistor MC is turned on. When the threshold voltage of the read target memory cell transistor MC is the voltage VE or higher, the memory cell transistor MC is turned off.

During the period from time T14 to T15, the strobe of the bit line BL_2 is performed.

At time T14, the voltage VSS is applied to the signal LPC. Accordingly, the transistor TN41 is turned off. The voltage VDDSA is applied to the signal STB. Accordingly, the transistor TN13 is turned on. For example, in the sense circuit SA corresponding to the off cell, since the transistor TN14 is turned on, the voltage VSS is applied to the bus LBUS. That is, the voltage of the bus LBUS is decreased. In the sense circuit SA corresponding to the on cell, since the transistor TN14 is turned off, the bus LBUS maintains the voltage VDDSA. In other words, in the case of the off cell, the bus LBUS is at the "L" level. In the case of the on cell, the bus LBUS is at the "H" level.

At time T15, the voltage VSS is applied to the signal STB. Accordingly, the transistor TN13 is turned off. The data of the bus LBUS is transferred to the latch circuit TDL. For example, in the case of the off cell, the data at the "L" level of the bus LBUS is transferred to the latch circuit TDL. Therefore, the node LAT_T is at the "L" level, and the node INV_T is at the "H" level. In other words, when the memory cell transistor MC stores the data in any one of the "A" to "G" states, the latch circuit TDL stores the "0" data. In the case of the on cell, the data at the "H" level of the bus LBUS is transferred to the latch circuit TDL. Therefore, the node LAT_T is at the "H" level, and the node INV_T is at the "L" level. In other words, when the memory cell transistor MC stores the data in the "Er" state, the latch circuit TDL stores the "1" data.

At time T16, the voltage VDDSA is applied to the signal LSL. Accordingly, the transistor TN15 is turned on. The voltage VX2 is applied to the signal LPC. Accordingly, the transistor TN41 is turned on. Therefore, the voltage VDDSA is applied to the bus LBUS. Accordingly, the transistor TN16 is turned on. The voltage VSS is applied to the node SEN via the transistors TN15 and TN16.

At time T17, the voltage VSS is applied to the signal LSL. Accordingly, the transistor TN15 is turned off. The voltage VSS is applied to the signal LPC. Accordingly, the transistor TN41 is turned off.

As illustrated in FIG. 26, during the period from time T18 to T23, the sensing operation (BL_1 sense) with respect to the bit line BL_1 during the ER read operation is performed. The voltages of the signals SPC, XXL1, CLK, STB, and LPC and the node SEN during the period from time T18 to T23 are the same as those during the period from time T4 to T9.

During the period from time T20 to T21, the sensing of the node SEN is performed. As a result, when the read target memory cell transistor MC is the on cell, the node SEN is at the "L" level. In other words, when the memory cell transistor MC stores the data in any one of the "Er" to "D" states, the node SEN is at the "L" level. When the read target memory cell transistor MC is the off cell, the node SEN is at the "H" level. In other words, when the memory cell transistor MC stores the data in any one of the "E" to "G" states, the node SEN is at the "H" level.

During the period from time T22 to T23, the strobe of the bit line BL_1 is performed.

At time T23, the result of the logical sum (OR) operation of the node SEN and the latch circuit SDL is stored in the latch circuit SDL. Accordingly, when the memory cell transistor MC stores the data in any one of the "Er", "E", "F", and "G" states, the latch circuit SDL stores the "1" data. When the memory cell transistor MC stores the data in any one of the "A" to "D" states, the latch circuit SDL stores the "0" data.

During the period from time T24 to T29, the sensing operation (BL_2 sense) with respect to the bit line BL_2 during the ER read operation is performed. The voltages of the signals SPC, XXL2, CLK, STB, and LPC and the node SEN during the period from time T24 to T29 are the same as those during the period from time T10 to T15.

During the period from time T26 to T27, the sensing of the node SEN is performed. As a result, when the read target memory cell transistor MC is the on cell, the node SEN is at the "L" level. In other words, when the memory cell transistor MC stores the data in any one of the "Er" to "D" states, the node SEN is at the "L" level. When the read target memory cell transistor MC is the off cell, the node SEN is at the "H" level. In other words, when the memory cell transistor MC stores the data in any one of the "E" to "G" states, the node SEN is at the "H" level.

During the period from time T28 to T29, the strobe of the bit line BL_2 is performed.

At time T29, the result of the logical sum (OR) operation of the node SEN and the latch circuit TDL is stored in the latch circuit TDL. Accordingly, when the memory cell transistor MC stores the data in any one of the "Er", "E", "F", and "G" states, the latch circuit TDL stores the "1" data. When the memory cell transistor MC stores the data in any one of the "A" to "D" states, the latch circuit TDL stores the "0" data.

During the period from time T27 to T30, the bit line BL and the word line WL are lowered. More specifically, during the period from time T27 to T30, the row decoder 25 applies the voltage VSS to the selected word line WL and the non-selected word lines WL. The voltage VSS is applied to the source line SL. The voltage VSS is applied to the signals BLS1 and BLS2. Accordingly, the transistors THN2 and THN4 are turned off. The voltage VX2 is applied to the signals BLC1 and BLC2. Accordingly, the transistors TN3 and TN8 are turned on. Similarly, the voltage VX2 is applied to the signals NLO1 and NLO2. Accordingly, the transistors TN5 and TN10 are turned on. The voltage VSS is applied to the node SRCGND. Accordingly, the voltage VSS is applied to the bit lines BL_1 and BL_2.

At time T30, the voltage VDDSA is applied to the signal LSL. Accordingly, the transistor TN15 is turned on. The voltage VX2 is applied to the signal LPC. Accordingly, the transistor TN41 is turned on. Therefore, the voltage VDDSA is applied to the bus LBUS. Accordingly, the transistor TN16 is turned on. The voltage VSS is applied to the node SEN via the transistors TN15 and TN16.

At time T31, the voltage VSS is applied to the signal LSL. Accordingly, the transistor TN15 is turned off. The voltage VSS is applied to the signal LPC. Accordingly, the transistor TN41 is turned off. The voltage VX2 is applied to the signal DSW. Accordingly, the transistor TN42 is turned on. That is, the bus LBUS is electrically connected to the bus DBUS.

During the period from time T31 to T32, data is transferred to the latch circuit XDL.

At time T32, the voltage VSS is applied to the signal DSW. Accordingly, the transistor TN42 is turned off.

1.6 1CU Write Operation of TLC

Next, the 1CU write operation of the TLC will be described.

1.6.1 Details of Program Conditions

Figure 27:
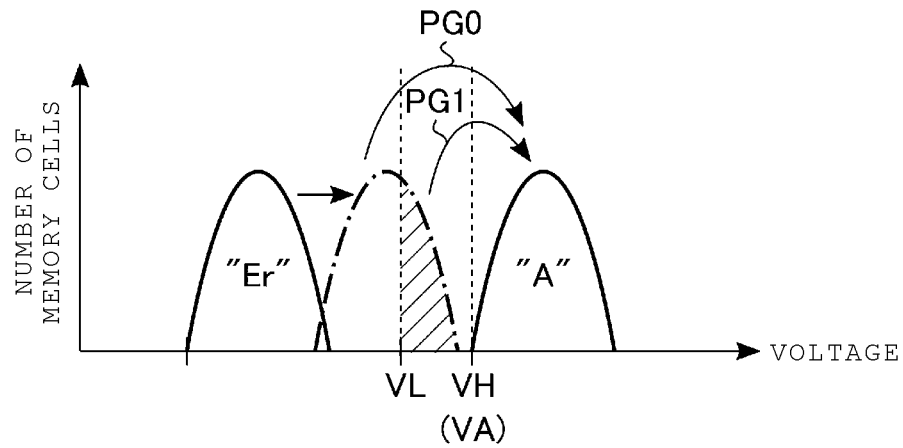
FIG. 27 is a threshold voltage distribution diagram illustrating a relationship between two types of verification voltages and two types of program conditions that can be used for each write state during the write operation of the semiconductor memory device according to the first embodiment.

First, the details of the programming method during the 1CU write operation of the TLC will be described with reference to FIG. 27. FIG. 27 is a threshold voltage distribution diagram illustrating the relationship between two types of the verification voltages and two types of the program conditions that may be used for each write state during the write operation. In the example illustrated in FIG. 27, the memory cell transistor MC is written from the "Er" state to the "A" state.

As illustrated in FIG. 27, a verification-low voltage VL and a verification-high voltage VH used for the program verification operation are set for each write state. That is, the program verification operation includes a verification operation (hereinafter denoted as a "first verification operation") using the verification-low voltage VL and a verification operation (hereinafter denoted as a "second verification operation") using the verification-high voltage VH. The verification-high voltage VH is a read voltage described with reference to FIG. 18. In the example illustrated in FIG. 27, it is VH=VA. The verification-low voltage VL and the verification-high voltage VH have a relationship of VL<VH.

The verification-low voltage VL is a voltage for determining the magnitude of the difference between the target level and the threshold voltage of the memory cell transistor MC.

The sequencer 23 performs the first verification operation and the second verification operation in each program loop. The sequencer 23 determines conditions for the program operation of the next program loop based on the results of the first verification operation and the second verification operation.

More specifically, the program operation includes two program conditions PG0 and PG1 and a program inhibition condition. For example, when the threshold voltage of the memory cell transistor MC is the voltage VL or less, the sequencer 23 applies the program condition PG0 to the program operation of the next program loop. In other words, the program operation (hereinafter denoted as a "PG0 program operation") to which the program condition PG0 is applied is performed on the memory cell transistors MC for which the VL verification has failed.

When the threshold voltage of the memory cell transistor MC exceeds the voltage VL and is the voltage VH or lower, the sequencer 23 applies the program condition PG1 to the program operation of the next program loop. In other words, the program operation (hereinafter denoted as a "PG1 program operation") to which the program condition PG1 is applied is performed on delayed cells that have passed the VL verification and have failed the VH verification.

When the threshold voltage of the memory cell transistor MC exceeds the voltage VH, the sequencer 23 sets the memory cell transistor MC as program inhibition during the program operation of the next program loop.

The program condition PG0 is a program condition in which the amount of change in the threshold voltage of the memory cell transistor MC is relatively large. The program condition PG1 is a program condition in which the amount of change in the threshold voltage of the memory cell transistor MC is smaller than that in the program condition PG0. For example, when any one of the program condition PG0, the program condition PG1, and the program inhibition condition is applied to the program operation of one memory cell transistor MC, the amount of change in the threshold voltage of the memory cell transistor MC is "program condition PG0">"program condition PG1">"program inhibition". For example, when the PG0 program operation is performed when the threshold voltage of the memory cell transistor MC exceeds the voltage VL and is the voltage VH or lower, there is a possibility that the threshold voltage of the memory cell transistor MC may exceed the voltage VH by a relatively large amount. Therefore, here, the PG1 program operation is performed.

The sequencer 23 may apply the program condition PG1 to the final program operation among a plurality of the program operations performed for one write state. In other words, the memory cell transistor MC for which the PG1 program operation is performed is set as program inhibition for the subsequent program loops.

The voltage of the bit line BL differs between the program condition PG0 and the program condition PG1. For example, the voltage VSS is applied to the bit line BL corresponding to the program condition PG0. A voltage VQPW is applied to the bit line BL corresponding to the program condition PG1. The voltage VDDSA is applied to the bit line BL corresponding to the program inhibition. The voltage VSS, the voltage VQPW, and the voltage VDDSA have a relationship of VSS<VQPW<VDDSA.

Figure 28:
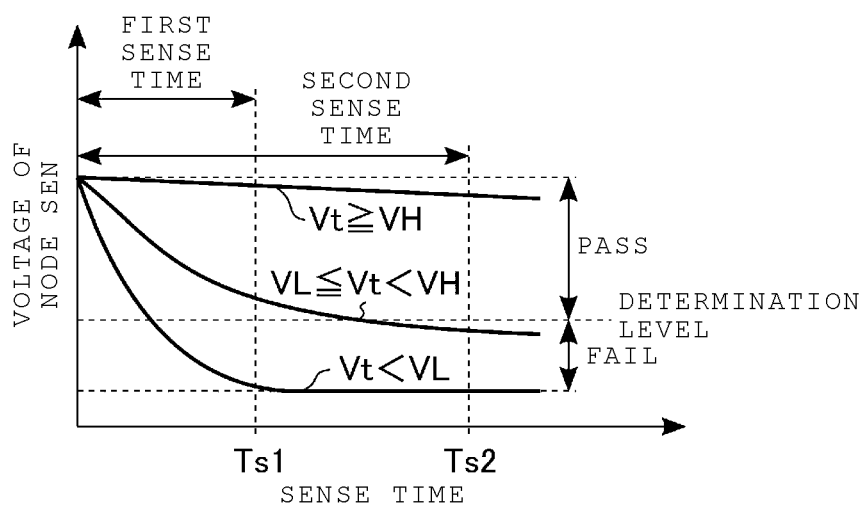
FIG. 28 is a graph illustrating a relationship between the voltage of a node and a sense time during the program verification operation of the semiconductor memory device according to the first embodiment.

1.6.2 Relationship Between Verification-Low Voltage and Verification-High Voltage and Sense Time Next, the relationship between the verification-low voltage VL and the verification-high voltage VH and the sense time will be described with reference to FIG. 28. FIG. 28 is a graph illustrating the relationship between the voltage of the node SEN and the sense time during the program verification operation.

As illustrated in FIG. 28, in the present embodiment, during the program verification operation for one state, the length of the sense time of the node SEN corresponding to the verification-low voltage VL and the length of the sense time of the node SEN corresponding to the verification-high voltage VH are different. That is, the length of the sense time for setting a signal XLL to the "H" level is different between the first verification operation and the second verification operation. Hereinafter, the sense time corresponding to the first verification operation will be denoted as a "first sense time Ts1". The sense time corresponding to the second verification operation is denoted as a "second sense time Ts2". The relationship between the first sense time Ts1 and the second sense time Ts2 is Ts1<Ts2.

For example, when the charges on the node SEN are transferred to the bit line BL during the sense time, the voltage on the node SEN is decreased. The speed at which the voltage of the node SEN is decreased depends on a threshold voltage Vt of the memory cell transistor MC. For example, when the threshold voltage Vt is lower than the verification-low voltage VL (Vt<VL), the memory cell transistor MC is more rapidly turned on, and the voltage of the node SEN is sharply decreased. When the threshold voltage Vt is the verification-low voltage VL or higher and is lower than the verification-high voltage VH (VL≤Vt<VH), the memory cell transistor MC is turned on less rapidly than the case of Vt<VL, and the voltage of the node SEN is relatively gradually decreased. When the threshold voltage Vt is the verification-high voltage VH or higher (Vt≥VH), the memory cell transistor MC is turned off, and the voltage of the node SEN is little lowered.

The sense time is set based on such relationship so that the memory cell transistor MC having a threshold voltage Vt lower than the target level is determined to fail the verification. That is, the transistor TN14 is set to be turned off. More specifically, the first sense time is set so that the memory cell transistor MC having a threshold voltage Vt lower than the verification-low voltage VL is determined to fail the verification. The second sense time is set so that the memory cell transistor MC having a threshold voltage Vt lower than the verification-high voltage VH is determined to fail the verification.

During the program verification operation, when the first verification operation and the second verification operation are sequentially performed, the time of the first sensing operation may be set to Ts1, and the time of the second sensing operation may be set to (Ts2−Ts1).

1.6.3 Flow of 1CU Write Operation of TLC

Figure 29:
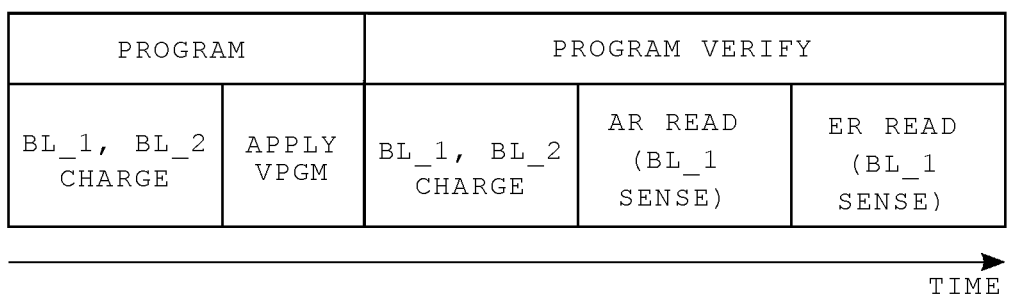
FIG. 29 is a diagram illustrating a flow of a 1CU write operation of the TLC focusing on the operation of the sense amplifier unit provided in the semiconductor memory device according to the first embodiment.

Next, an example of the flow of the 1CU write operation of the TLC will be described with reference to FIG. 29. FIG. 29 is a diagram illustrating the flow of the 1CU write operation of the TLC focusing on the operation of the sense amplifier unit SAU. It should be noted that the example of FIG. 29 illustrates one program loop when data is written into the lower page of the cell unit CU of the memory cell array 11_1.

As illustrated in FIG. 29, during the program operation, first, the sense amplifier unit SAU collectively charges the bit lines BL_1 and BL_2. In the example of FIG. 29, the memory cell array 11_1 is selected as the write operation target (hereinafter denoted as a "selected memory cell array"). The memory cell array 11_2 is not selected as the write operation target (hereinafter denoted as a "non-selected memory cell array"). Here, the sense amplifier unit SAU collectively charges the bit line BL_1 corresponding to the program-inhibition memory cell transistor MC of the selected memory cell array 11_1 and the bit line BL_2 of the non-selected memory cell array 11_2. Next, the row decoder 25 applies the voltage VPGM to the selected word line WL. Accordingly, data is written into the program target memory cell transistor MC in the memory cell array 11_1. In other words, during the 1CU write operation of the TLC, the program operation includes a period for charging the bit lines BL_1 and BL_2 and a period for applying the voltage VPGM to the selected word line WL.

Next, during the program verification operation, first, the sense amplifier unit SAU collectively charges the bit lines BL_1 and BL_2. Next, in the case of the lower page, the sense amplifier unit SAU sequentially performs the AR read operation on the bit line BL_1 and the ER read operation on the bit line BL_1. In other words, during the 1CU write operation of the TLC, the program verification operation includes a period for charging the bit lines BL_1 and BL_2, a period for performing the sensing operation with respect to the bit line BL_1 during the AR read operation, and a period for performing the sensing operation with respect to the bit line BL_1 during the ER read operation.

1.6.4 Program Operation Corresponding to 1CU Write Operation of TLC

Figure 30:
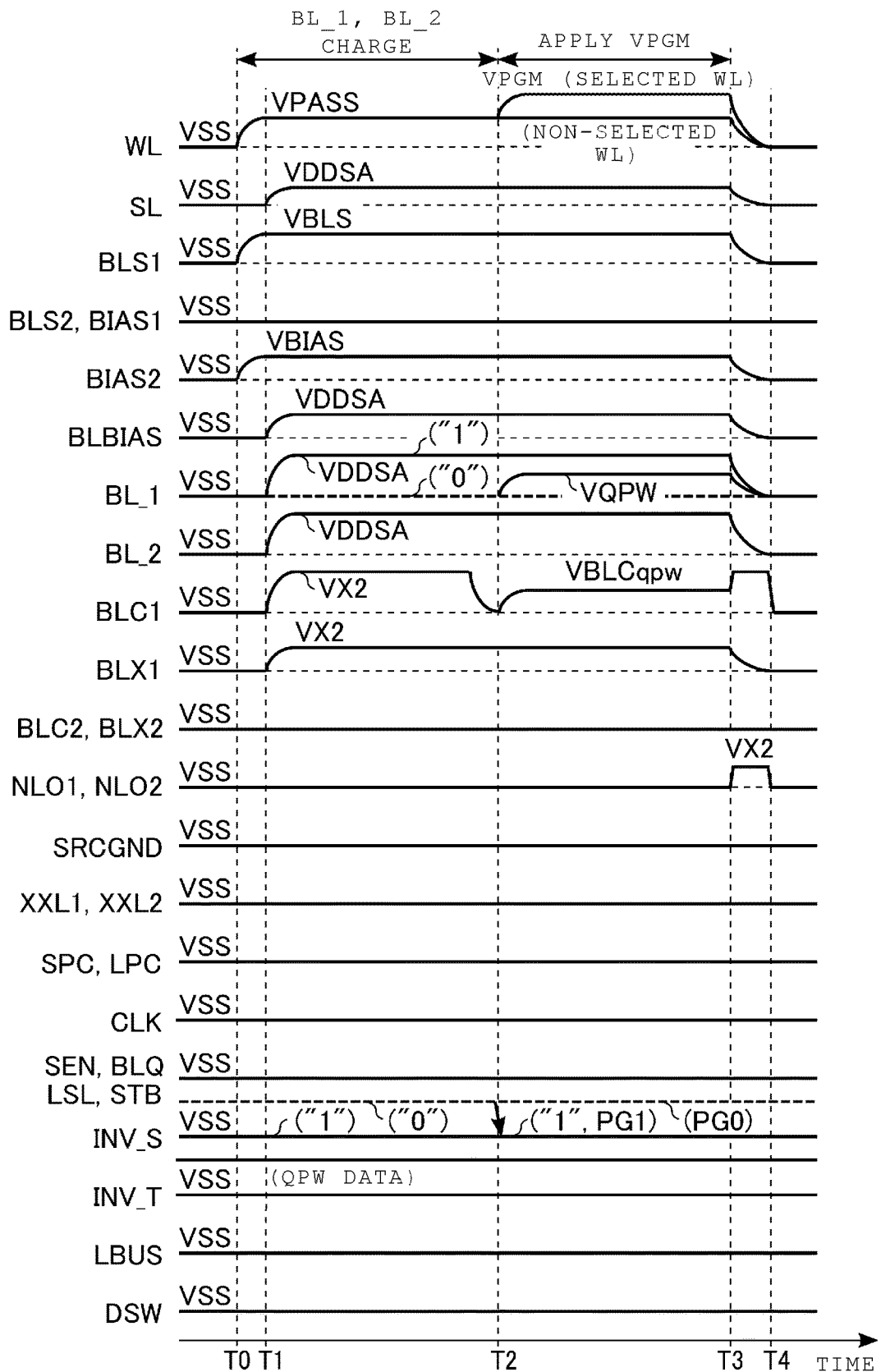
FIG. 30 is a timing chart illustrating respective voltages of wirings and signals in a program operation corresponding to the 1CU write operation of the TLC of the semiconductor memory device according to the first embodiment.

Next, an example of the program operation corresponding to the 1CU write operation of the TLC will be described with reference to FIG. 30. FIG. 30 is a timing chart illustrating the respective voltages of wirings and signals during the program operation corresponding to the 1CU write operation of the TLC. Note that the example of FIG. 30 illustrates the write operation targeting the lower page of the cell unit CU of the memory cell array 11_1. That is, the example of FIG. 30 illustrates the write operation targeting the bit line BL_1. In the example of FIG. 30, the select gate lines SGD and SGS are omitted.

As illustrated in FIG. 30, during the period from time T0 to T2, the activation of the bit line BL and the word line WL is performed. That is, during the period from time T0 to T2, the bit lines BL_1 and BL_2 are charged.

At time T0, the row decoder 25 applies the voltage VPASS to the non-selected word lines WL and the selected word line WL. Accordingly, each memory cell transistor MC in the selected block BLK of the memory cell array 11_1 and in the non-selected block BLK of the memory cell array 11_2 sharing the word line WL is turned on. The voltage VBLS is applied to the signal BLS1 of the BL hookup circuit BLHU. Accordingly, the transistor THN2 is turned on. The bit line BL_1 and the node BLI1 are electrically connected. A voltage VBIAS is applied to the signal BIAS2. The voltage VBIAS is a relatively high voltage turning on the transistors THN1 and THN3. The voltage VBIAS is a voltage higher than the voltage VDDSA. The transistor THN3 is turned on, and the bit line BL_2 is electrically connected to the node BLBIAS.

At time T1, the voltage VDDSA is applied to the source line SL. The voltage VDDSA is applied to the node BLBIAS. The voltage VX2 is applied to the signal BLX1 of the sense circuit SA. Accordingly, the transistor TN2 is turned on. Similarly, the voltage VX2 is applied to the signal BLC1. Accordingly, the transistor TN3 is turned on.

Here, when the "1" data is stored in the latch circuit SDL, the voltage VSS is applied to the node INV_S. That is, the node INV_S is at the "L" level. Here, the transistor TP1 is turned on, and the transistor TN1 is turned off. Therefore, the voltage VDDSA is applied to the bit line BL_1 via the transistors TP1, TN2, TN3, and THN2. When the "0" data is stored in the latch circuit SDL, the voltage VDDSA is applied to the node INV_S. That is, the node INV_S is at the "H" level. Here, the transistor TP1 is turned off, and the transistor TN1 is turned on. Therefore, the voltage VSS (the voltage of the node SRCGND) is applied to the bit line BL_1 via the transistors TN1, TN2, TN3, and THN2.

The voltage VDDSA (the voltage of a node BLBIAS) is applied to the bit line BL_2 in the same manner as the bit line BL_1 corresponding to the program inhibition ("1" data). During the 1CU write operation, by applying the voltage of the "H" level to the bit lines BL of the non-selected blocks BLK sharing the word line WL, disturbance during the program operation is prevented.

During the period from time T2 to T3, the voltage VPGM is applied.

At time T2, the row decoder 25 applies the voltage VPGM to the selected word line WL.

The voltage VSS is once applied to the signal BLC1. Accordingly, the bit line BL_1 applied with the voltage VDDSA is in a floating state. In other words, the bit line BL_1 corresponding to the program inhibition condition is in the floating state. Next, a voltage VBLCqpw is applied to the signal BLC1. The voltage VBLCqpw is a voltage lower than the voltage VDDSA. More specifically, the voltage VBLCqpw and the voltage VQPW have a relationship of VBLCqpw=VQPW+Vth. Therefore, the bit line BL_1 corresponding to the program inhibition condition maintains the floating state during the period from time T2 to T3.

The data (QPW data) corresponding to the program conditions PG0 and PG1 are stored in the latch circuit TDL. For example, the data ("0" data) at the "L" level in the latch circuit TDL corresponds to the program condition PG0, and the data ("1" data) at the "H" level corresponds to the program condition PG1. The logical sum operation is performed on the data in the latch circuit TDL and the data in the latch circuit SDL. As a result, the data ("0" data) at the "L" level is stored in the latch circuit SDL corresponding to the program condition PG0. That is, the node INV_S is at the "H" level. The data ("1" data) at the "H" level is stored in the latch circuit SDL corresponding to the program inhibition condition and the program condition PG1. That is, the node INV_S is at the "L" level. As a result, the bit line BL_1 corresponding to the program condition PG0 is applied with the voltage VSS. The voltage VQPW clamped by the transistor TN3 is applied to the bit line BL_1 corresponding to the program condition PG1. Accordingly, the PG0 program operation is performed in the memory cell transistor MC to which the voltage VSS is applied. The PG1 program operation is performed in the memory cell transistor MC to which the voltage VQPW is applied.

During the period from time T3 to T4, the bit line BL and the word line WL are lowered. More specifically, during the period from time T3 to T4, the row decoder 25 applies the voltage VSS to the selected word line WL and the non-selected word lines WL. The voltage applied to the word lines WL may be higher than the voltage VSS and lower than the voltage VPGM. Accordingly, when transitioning to the program verification operation, which will be described below, the voltage fluctuation of the word line WL can be prevented. The voltage VSS is applied to the source line SL. The voltage VSS is applied to the signals BLS1, BIAS2, and BLX1. Accordingly, the transistors THN2, THN3, and TN2 are turned off. The voltage VSS is applied to the node BLBIAS. The voltage VX2 is applied to the signals BLC1, NLO1, and NLO2. Accordingly, the transistors TN3, TN5, and TN10 are turned on. Accordingly, the voltage VSS is applied to the bit lines BL_1 and BL_2.

Figure 31:
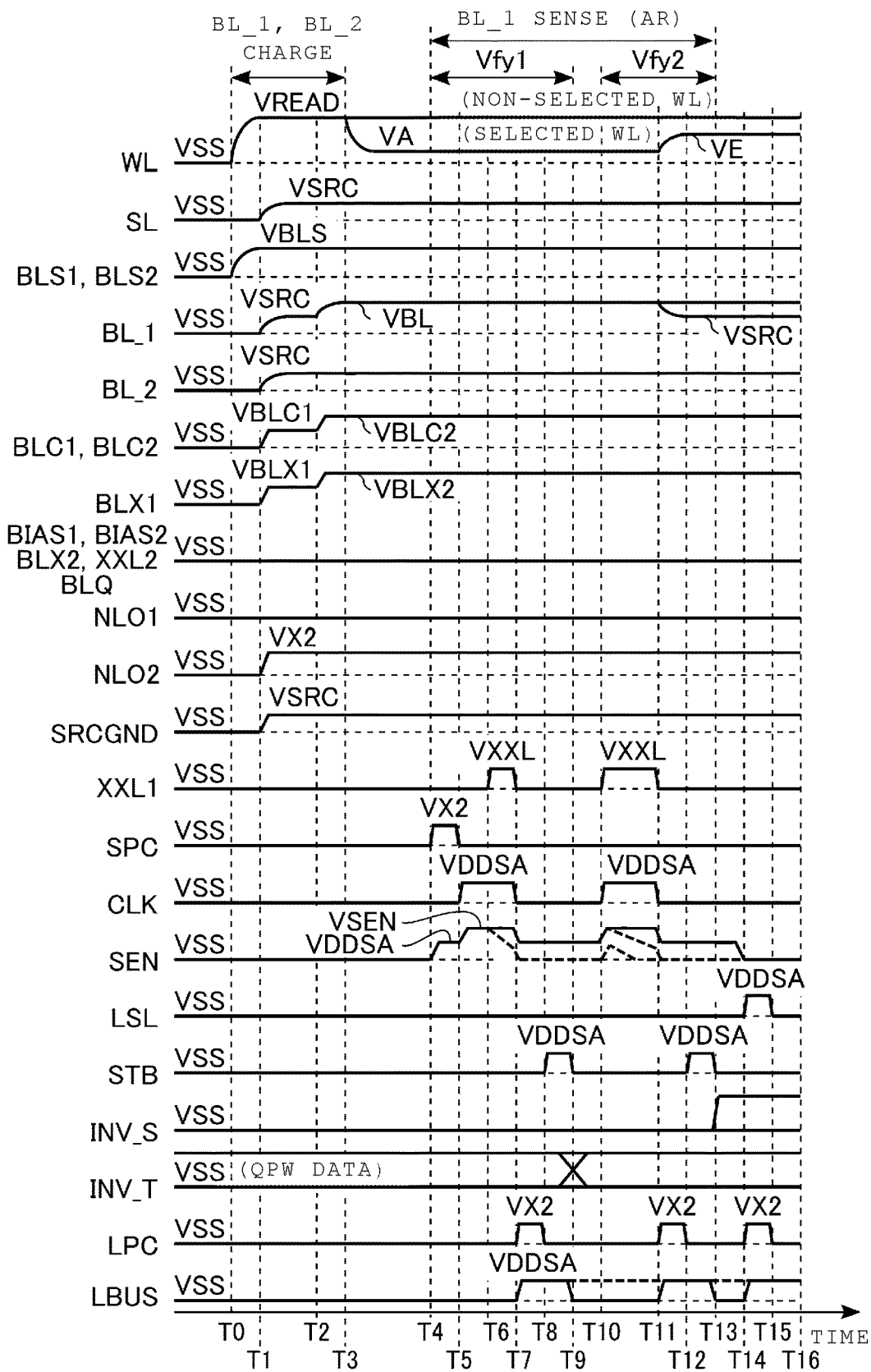
FIG. 31 is a timing chart illustrating respective voltages of wirings and signals in a program verification operation corresponding to the 1CU write operation of the TLC of the semiconductor memory device according to the first embodiment.
Figure 32:
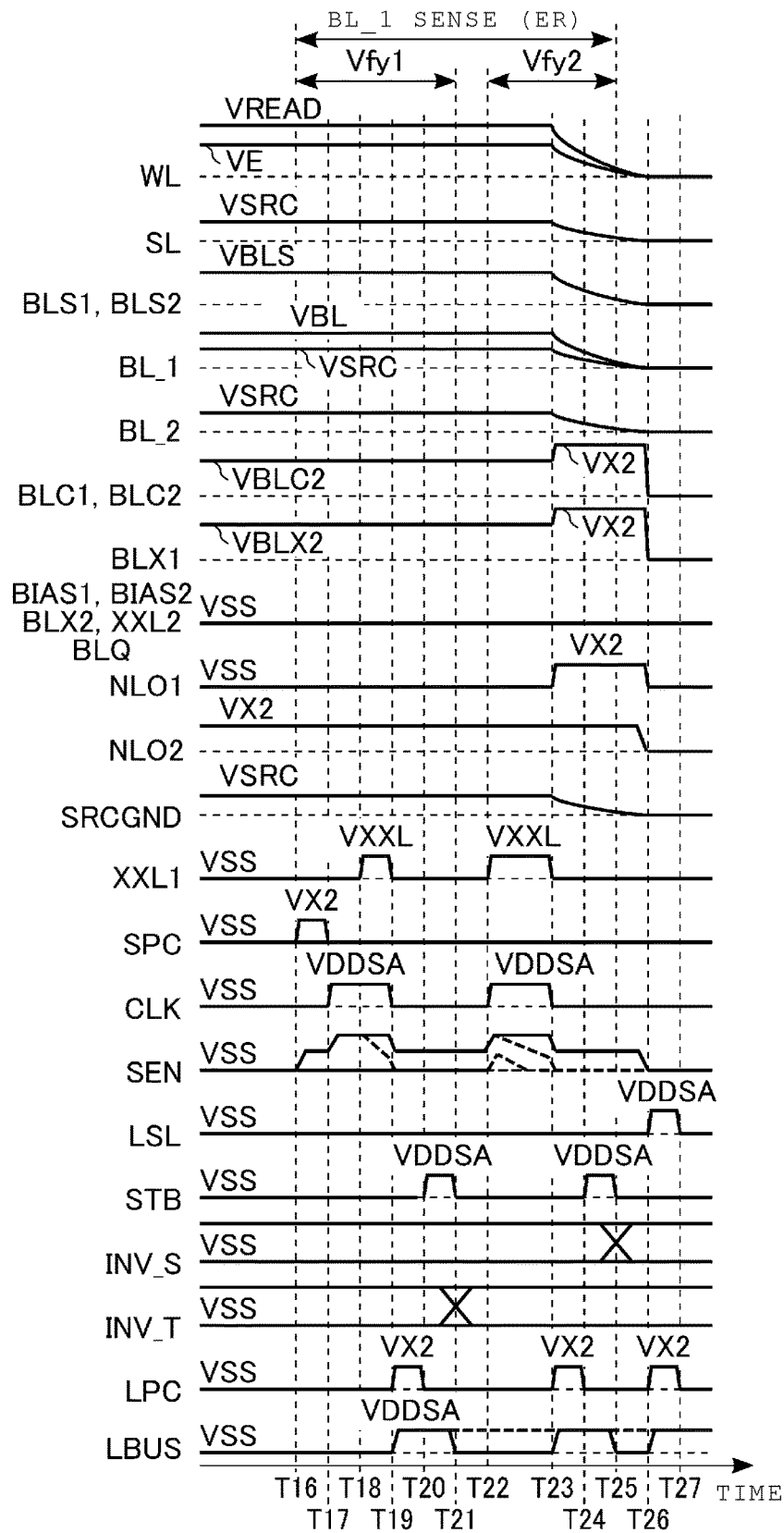
FIG. 32 is a timing chart illustrating respective voltages of wirings and signals during the program verification operation corresponding to the 1CU write operation of the TLC of the semiconductor memory device according to the first embodiment.

1.6.5 Program Verification Operation Corresponding to 1CU Write Operation of TLC Next, an example of the program verification operation corresponding to the 1CU write operation of the TLC will be described with reference to FIGS. 31 and 32. FIGS. 31 and 32 are timing charts illustrating the respective voltages of wirings and signals during the program verification operation corresponding to the 1CU write operation of the TLC. FIG. 31 illustrates a period from time T0 to T16. FIG. 32 illustrates a period from time T16 to T27. It should be noted that the examples of FIGS. 31 and 32 illustrate the program verification operation for the lower page of the cell unit CU of the memory cell array 11_1. That is, the examples of FIGS. 31 and 32 illustrate the program verification operation on the bit line BL_1. In the examples of FIGS. 31 and 32, the select gate lines SGD and SGS are omitted.

As illustrated in FIG. 31, in the case of the program verification operation corresponding to the bit line BL_1, the "1" data is stored in the latch circuit SDL. Accordingly, the node INV_S is at the "L" level. That is, the voltage VSS is applied to the node INV_S. The QPW data is stored in the latch circuit TDL. For example, when the program condition corresponds to the program condition PG0, the node INV_T is at the "H" level. When the program condition corresponds to the program condition PG1, the node INV_T is at the "L" level.

During the period from time T0 to T3, the activation of the bit line BL and word line WL is performed. That is, during the period from time T0 to T3, the bit lines BL_1 and BL_2 are charged.

At time T0, the row decoder 25 applies the voltage VREAD to the non-selected word lines WL and the selected word line WL of the selected block BLK. Accordingly, each memory cell transistor MC in the selected block BLK is turned on. The voltage VBLS as a voltage at the "H" level is applied to the signals BLS1 and BLS2 of the BL hookup circuit BLHU. The transistors THN2 and THN4 are turned on. Accordingly, the bit line BL_1 is electrically connected to the node BLI1. The bit line BL_2 is electrically connected to the node BLI2.

At time T1, the voltage VSRC is applied to the source line SL. The voltage VBLC1 is applied to the signals BLC1 and BLC2 of the sense circuit SA. Accordingly, the transistors TN3 and TN8 are turned on. A voltage VBLX1 is applied to the signal BLX1. The voltage VBLX1 is a voltage higher than the voltage VSS. Accordingly, the transistor TN2 is turned on. The voltage VX2 is applied to the signal NLO2. Accordingly, the transistor TN10 is turned on. The voltage VSRC is applied to the node SRCGND.

Since the node INV_S is at the "L" level, the transistor TP1 is turned on. Therefore, the voltage VSRC is applied to the bit line BL_1 via the transistors TP1, TN2, TN3, and THN2. The voltage VSRC is applied to the bit line BL_2 from the sense circuit SA via the transistors TN10, TN8, and THN4. It should be noted that the voltage VSRC can be applied to the bit lines BL_1 and BL_2 from the source line SL side via the select block BLK.

At time T2, the voltage VBLC2 is applied to the signals BLC1 and BLC2. A voltage VBLX2 is applied to the signal BLX1. The voltage VBLX2 is a voltage higher than the voltage VBLC2. Accordingly, the voltage VBL is applied to the bit line BL_1.

The period from time T3 to T11 is a period of the word line WL transition and voltage stabilization of the bit line BL during the AR read operation (program verification operation of the "A" state).

At time T3, the row decoder 25 applies the read voltage VA to the selected word line WL.

During the period from time T4 to T13, the sensing operation (BL_1 sense) with respect to the bit line BL_1 during the AR read operation is performed. More specifically, first, during the period from time T4 to T9, a first verification operation Vfy1 corresponding to the "A" state is performed.

At time T4, the voltage VX2 is applied to the signal SPC, and thus, the transistor TN11 is turned on. Therefore, the voltage VDDSA is applied to the node SEN.

At time T5, the voltage VSS is applied to the signal SPC. Accordingly, the transistor TN11 is turned off. The voltage VDDSA is applied to the signal CLK. Due to the clock up, the voltage of the node SEN is increased to the voltage VSEN.

During the period from time T6 to T7, the sensing of the node SEN is performed. The length of the period from time T6 to T7 is Ts1.

At time T6, the voltage VXXL is applied to the signal XXL1. Accordingly, the transistor TN4 is turned on. When the read target memory cell transistor MC is the on cell, a current flows from the node SEN to the bit line BL_1. Therefore, the voltage of the node SEN is decreased. When the read target memory cell transistor MC is the off cell, almost no current flows from the node SEN to the bit line BL_1. Therefore, the voltage of the node SEN is little lowered.

At time T7, the voltage VSS is applied to the signal XXL1. Accordingly, the transistor TN4 is turned off. The voltage VSS is applied to the signal CLK. By clock down, the voltage of the node SEN is decreased. In the sense circuit SA corresponding to the off cell, the voltage of the node SEN is higher than the threshold voltage of the transistor TN14. That is, the node SEN is at the "H" level. Therefore, the transistor TN14 is turned on. In the sense circuit SA corresponding to the on cell, the voltage of the node SEN is lower than the threshold voltage of the transistor TN14. That is, the node SEN is at the "L" level. Therefore, the transistor TN14 is maintained off. In the LBUS pre-charge circuit LBPC, the voltage VX2 is applied to the signal LPC. Accordingly, the transistor TN41 is turned on. The voltage VDDSA is applied to the bus LBUS.

During the period from time T8 to T9, the bit line BL_1 is strobed.

At time T8, the voltage VSS is applied to the signal LPC. Accordingly, the transistor TN41 is turned off. The voltage VDDSA is applied to the signal STB. Accordingly, the transistor TN13 is turned on. For example, in the sense circuit SA corresponding to the off cell, since the transistor TN14 is turned on, the voltage VSS is applied to the bus LBUS. That is, the voltage of the bus LBUS is decreased. In the sense circuit SA corresponding to the on cell, since the transistor TN14 is turned off, the bus LBUS maintains the voltage VDDSA. In other words, in the case of off cell, the bus LBUS is at the "L" level. In the case of the on cell, the bus LBUS is at the "H" level.

At time T9, the voltage VSS is applied to the signal STB. Accordingly, the transistor TN13 is turned off. For example, the inverted data of the bus LBUS is transferred to the latch circuit TDL. For example, in the case of the off cell, the inverted data of the "L" level of the bus LBUS is transferred to the latch circuit TDL. The "H" level data ("1" data) is stored in the latch circuit TDL. Therefore, the node INV_T is at the "L" level. In other words, when the threshold voltage Vt of the memory cell transistor MC is the verification-low voltage VL or higher, the node INV_T is at the "L" level. In the case of the on cell, the inverted data of the "H" level of the bus LBUS is transferred to the latch circuit TDL. The "L" level data ("0" data) is stored in the latch circuit TDL. Therefore, the node INV_T is at the "H" level. In other words, when the threshold voltage Vt of the memory cell transistor MC is lower than the verification-low voltage VL, the node INV_T is at the "H" level.

Next, during the period from time T10 to T13, a second verification operation Vfy2 corresponding to the "A" state is performed.

During the period from time T10 to T11, the sensing of the node SEN is performed. The length of the period from time T10 to T11 is (Ts2−Ts1).

At time T10, the voltage VXXL is applied to the signal XXL1. Accordingly, the transistor TN4 is turned on. The voltage VDDSA is applied to the signal CLK. Due to the clock up, the voltage of the node SEN is increased. The voltage of the node SEN is decreased based on the state of the read target memory cell transistor MC.

At time T11, the voltage VSS is applied to the signal XXL1. Accordingly, the transistor TN4 is turned off. The voltage VSS is applied to the signal CLK. By clock down, the voltage of the node SEN is decreased. In the case of the off cell, the voltage of the node SEN is higher than the threshold voltage of the transistor TN14. That is, when the threshold voltage Vt of the read target memory cell transistor MC is the verification-high voltage VH (voltage VA) or higher, the node SEN is at the "H" level. Therefore, the transistor TN14 is turned on. In the case of the on cell, the voltage of the node SEN is lower than the threshold voltage of the transistor TN14. That is, when the threshold voltage Vt of the read target memory cell transistor MC is lower than the verification-high voltage VH, the node SEN is at the "L" level. Therefore, the transistor TN14 is maintained off. In the LBUS pre-charge circuit LBPC, the voltage VX2 is applied to the signal LPC. Accordingly, the transistor TN41 is turned on. The voltage VDDSA is applied to the bus LBUS.

The period from time T11 to T23 is a period of transition of the word line WL and voltage stabilization of the bit line BL during the ER read operation (program verification operation in "E" state).

At time T11, the row decoder 25 applies the read voltage VE to the selected word line WL. Accordingly, for example, when the threshold voltage of the read target memory cell transistor MC is lower than the voltage VE, the memory cell transistor MC is turned on. When the threshold voltage of the read target memory cell transistor MC is the voltage VE or higher, the memory cell transistor MC is turned off. The voltage VBL is applied to the bit line BL_1 corresponding to the memory cell transistor MC targeted for the ER read operation. Here, the node INV_S is at the "L" level, and the voltage VBL is applied to the bit line BL_1 via the transistors TP1, TN2, TN3, and THN2. The voltage VSRC of the node SRCGND is applied to the bit line BL_1 corresponding to the non-target memory cell transistor MC. Here, the node INV_S is at the "H" level, and the voltage VSRC is applied to the bit line BL_1 via the transistors TN1, TN2, TN3, and THN2.

During the period from time T12 to T13, the strobe of the bit line BL_1 is performed.

At time T12, the voltage VSS is applied to the signal LPC. Accordingly, the transistor TN41 is turned off. The voltage VDDSA is applied to the signal STB. Accordingly, the transistor TN13 is turned on. For example, in the sense circuit SA in which the node SEN is at the "H" level, the transistor TN14 is turned on. Therefore, the bus LBUS is at the "L" level. In the sense circuit SA in which the node SEN is at the "L" level, since the transistor TN14 is turned off, the bus LBUS is at the "H" level.

At time T13, the voltage VSS is applied to the signal STB. Accordingly, the transistor TN13 is turned off. For example, the data of the bus LBUS is transferred to the latch circuit SDL. As a result, when the bus LBUS is at the "L" level, the data at the "L" level ("0" data) is stored in the latch circuit SDL. That is, when the threshold voltage Vt of the read target memory cell transistor MC is the verification-high voltage VH or higher, the data at the "L" level ("0" data) is stored in the latch circuit SDL. When the bus LBUS is at the "H" level, the data at the "H" level ("1" data) is stored in the latch circuit SDL. That is, when the threshold voltage Vt of the read target memory cell transistor MC is lower than the verification-high voltage VH, the latch circuit SDL stores the data at the "H" level ("1" data). In other words, when the verification corresponding to the "A" state fails, the "1" data is stored in the latch circuit SDL. When the verification corresponding to the "A" state is passed, the "0" data is stored in the latch circuit SDL. It should be noted that the result of the program verification operation of the "A" state may be stored in a latch circuit other than the latch circuits SDL and TDL.

At time T14, the voltage VDDSA is applied to the signal LSL. Accordingly, the transistor TN15 is turned on. The voltage VX2 is applied to the signal LPC. Accordingly, the transistor TN41 is turned on. Therefore, the voltage VDDSA is applied to the bus LBUS. Accordingly, the transistor TN16 is turned on. The voltage VSS is applied to the node SEN via the transistors TN15 and TN16.

At time T15, the voltage VSS is applied to the signal LSL. Accordingly, the transistor TN15 is turned off. The voltage VSS is applied to the signal LPC. Accordingly, the transistor TN41 is turned off.

As illustrated in FIG. 32, during the period from time T16 to T25, the sensing operation (BL_1 sense) with respect to the bit line BL_1 during the ER read operation is performed. More specifically, first, during the period from time T16 to T21, the first verification operation Vfy1 corresponding to the "E" state is performed. The voltages of the signals SPC, XXL1, CLK, STB, and LPC and the node SEN during the period from time T16 to T21 are the same as those during the period from time T4 to T9.

During the period from time T18 to T19, the sensing of the node SEN is performed. The length of the period from time T18 to T19 is Ts1. As a result, when the read target memory cell transistor MC is the on cell, a current flows from the node SEN to the bit line BL_1. Therefore, the voltage of the node SEN is decreased. When the read target memory cell transistor MC is the off cell, almost no current flows from the node SEN to the bit line BL_1. Therefore, the voltage of the node SEN is little lowered.

During the period from time T20 to T21, the strobe of the bit line BL_1 is performed.

At time T21, the result of the logical sum (OR) operation of the node SEN and the latch circuit TDL is stored in the latch circuit TDL. Accordingly, in the first verification operation in the "A" state or the "E" state, when the threshold voltage Vt of the memory cell transistor MC is the verification-low voltage VL or higher, the data at the "H" level ("1" data) is stored in the latch circuit TDL. That is, the node INV_T is at the "L" level. During the first verification operation in the "A" state or the "E" state, when the threshold voltage Vt of the memory cell transistor MC is lower than the verification-low voltage VL, the data at the "L" level ("0" data) is stored in the latch circuit TDL. That is, the node INV_T is at the "H" level.

Next, during the period from time T22 to T25, the second verification operation Vfy2 corresponding to the "E" state is performed. The voltages of the signals SPC, XXL1, CLK, STB, and LPC and the node SEN during the period from time T22 to T25 are the same as those during the period from time T10 to T13.

During the period from time T22 to T23, the sensing of the node SEN is performed. The length of the period from time T22 to T23 is (Ts2−Ts1). As a result, in the case of the off cell, the voltage of the node SEN is higher than the threshold voltage of the transistor TN14. That is, when the threshold voltage Vt of the read target memory cell transistor MC is the verification-high voltage VH (voltage VE) or higher, the node SEN is at the "H" level. Therefore, the transistor TN14 is turned on. In the case of the on cell, the voltage of the node SEN is lower than the threshold voltage of the transistor TN14. That is, when the threshold voltage Vt of the read target memory cell transistor MC is lower than the verification-high voltage VH, the node SEN is at the "L" level. Therefore, the transistor TN14 is maintained off.

During the period from time T24 to T25, the strobe of the bit line BL_1 is performed.

At time T25, the result of the logical sum (OR) operation of the node SEN and the latch circuit SDL is stored in the latch circuit SDL. Accordingly, when the "A" state or "E" state verification fails, the "1" data is stored in the latch circuit SDL. When the "A" state and "E" state verification are passed, the "0" data is stored in the latch circuit SDL.

During the period from time T23 to T26, the bit line BL and the word line WL are lowered. More specifically, during the period from time T23 to T26, the row decoder 25 applies the voltage VSS to the selected word line WL and the non-selected word lines WL. The voltage VSS is applied to the source line SL. The voltage VSS is applied to the signals BLS1 and BLS2. Accordingly, the transistors THN2 and THN4 are turned off. The voltage VX2 is applied to the signals BLC1 and BLC2. Accordingly, the transistors TN3 and TN8 are turned on. The voltage VX2 is applied to the signal BLX1. Accordingly, the transistor TN2 is turned on. The voltage VX2 is applied to the signals NLO1 and NLO2. Accordingly, the transistors TN5 and TN10 are turned on. The voltage VSS is applied to the node SRCGND. Accordingly, the voltage VSS is applied to the bit lines BL_1 and BL_2.

At time T30, the voltage VDDSA is applied to the signal LSL. Accordingly, the transistor TN15 is turned on. The voltage VX2 is applied to the signal LPC. Accordingly, the transistor TN41 is turned on. Therefore, the voltage VDDSA is applied to the bus LBUS. Accordingly, the transistor TN16 is turned on. The voltage VSS is applied to the node SEN via the transistors TN15 and TN16.

At time T31, the voltage VSS is applied to the signal LSL. Accordingly, the transistor TN15 is turned off. The voltage VSS is applied to the signal LPC. Accordingly, the transistor TN41 is turned off.

1.7 Advantages of the First Embodiment

With the configuration according to the first embodiment, it is possible to provide a semiconductor memory device capable of preventing an increase in the chip area. The advantages will be described in detail.

For example, there is a known method of stacking a plurality of the memory cell arrays (array chips) to highly integrate a semiconductor memory device. When the word lines WL of each memory cell array are separately connected to the circuit chip, the number of word lines WL connected to the row decoder is increased. When bit lines BL of each memory cell array are connected to different sense amplifier units respectively, the number of sense amplifier units is increased. Therefore, the circuit sizes of the row decoders, the sense amplifiers, and the data registers are increased as the number of memory cell arrays is increased. Therefore, the area of the circuit chip is increased.

In contrast, with the configuration according to the first embodiment, a plurality of the memory cell arrays 11 stacked above the circuit chip 20 can share the word line WL. One bit line BL of each of a plurality of the memory cell arrays 11 can be connected to one sense amplifier unit SAU. Accordingly, an increase in the number of sense amplifier units SAU and the number of latch circuits XDL connected thereto can be prevented. Therefore, even if the array chip 10 is stacked, that is, the number of the memory cell arrays is increased, an increase in the circuit sizes of the row decoder 25, the sense amplifier 26, and the data register 27 can be prevented. Therefore, an increase in the chip area of the semiconductor memory device can be prevented.

With the configuration according to the first embodiment, the sense amplifier unit SAU can perform a batch read operation of data corresponding to a plurality of the bit lines BL. More specifically, for example, the sense amplifier unit SAU is connected with the bit line BL_1 connected to the block BLK_1 of the memory cell array 11_1 and the bit line BL_2 connected to the block BLK_2 of the memory cell array 11_2 sharing the word line WL. Therefore, during the 2CU read operation targeting the cell unit CU of the block BLK_1 and the cell unit CU of the block BLK_2 sharing the word line WL, the charging of the bit lines BL_1 and BL_2 can be performed collectively. The sensing operation with respect to the bit line BL_1 and the sensing operation with respect to the bit line BL_2 can be performed sequentially. Therefore, it is possible to shorten the processing time of the read operation of the two cell units CU. Therefore, the processing capability of the semiconductor memory device 1 can be improved.

With the configuration according to the first embodiment, the sense amplifier unit SAU can perform a batch write operation of data corresponding to a plurality of the bit lines BL. More specifically, for example, during the 2CU write operation targeting the cell unit CU of the block BLK_1 and the cell unit CU of the block BLK_2 sharing the word line WL, the charging of the bit lines BL_1 and BL_2 during the program operation and the program verification operation can be performed collectively. Therefore, it is possible to shorten the processing time of the write operation of the two cell units CU. Therefore, the processing capability of the semiconductor memory device 1 can be improved.

With the configuration according to the first embodiment, the 2CU read operation and the 2CU write operation can be performed. That is, the size of data collectively read or written can be allowed to be twice the data size of the cell unit CU.

With the configuration according to the embodiment, during the 1CU write operation corresponding to one cell unit CU, a voltage at the "H" level can be applied to the bit line BL of the non-selected blocks BLK sharing the word line WL similarly to the bit lines BL corresponding to the program inhibition of the selected block BLK. Accordingly, disturbance during the program operation in the non-selected blocks BLK sharing the word line WL can be prevented.

1.8 Modified Example of First Embodiment

Next, Modified Example of the first embodiment will be described. The following description will focus on the differences from the first embodiment.

1.8.1 Arrangement of Chip

Figure 33:
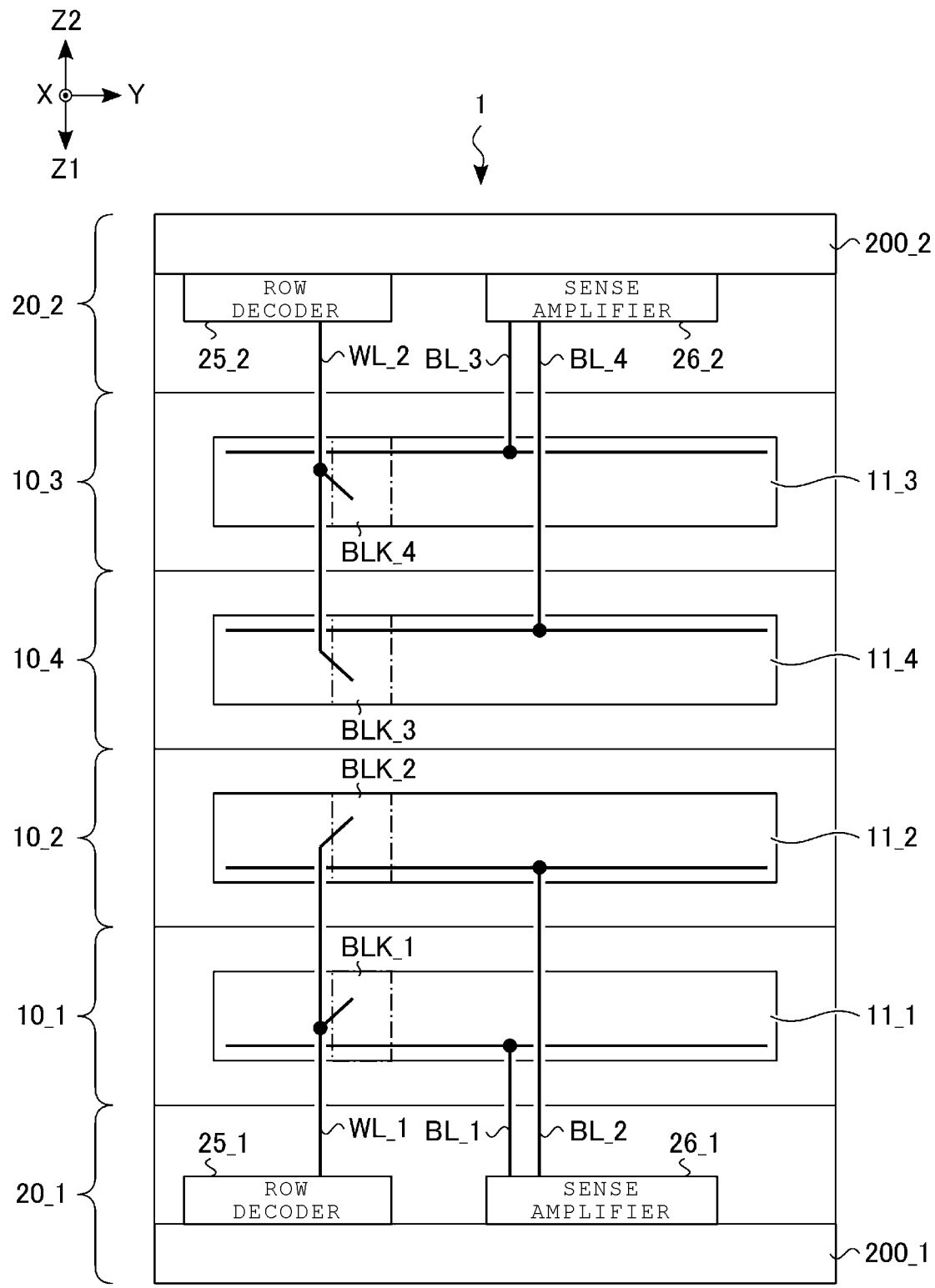
FIG. 33 illustrates a cross-sectional view of an arrangement of array chips and circuit chips provided in a semiconductor memory device according to Modified Example 1 of the first embodiment.

First, an example of an arrangement of each chip will be described with reference to FIG. 33. FIG. 33 illustrates a cross-sectional view of the arrangement of array chips 10_1 to 10_4 and circuit chips 20_1 and 20_2. It should be noted that in the example of FIG. 33, for the simplification of description, one for each of the word lines WL_1 and WL_2 and the bit lines BL_1 to BL_4 are illustrated. The select gate lines SGD and SGS and the source line SL are omitted.

As illustrated in FIG. 33, the semiconductor memory device 1 according to the example has a configuration where two three-layered bonded structures including the circuit chip 20 and the two array chips 10_1 and 10_2 described in FIG. 3 of the first embodiment are bonded to face each other.

The semiconductor memory device 1 includes four array chips 10_1 to 10_4 and two circuit chips 20_1 and 20_2. The array chips 10_1 and 10_2 are sequentially stacked (bonded) on the circuit chip 20_1 toward the Z2 direction. Similarly, the array chips 10_3 and 10_4 are stacked (bonded) on the circuit chip 20_2 toward the Z1 direction. The array chip 10_2 and the array chip 10_4 are bonded to each other.

A row decoder 25_1 and a sense amplifier 26_1 are provided on the surface of the circuit chip 20_1 facing the Z2 direction.

The row decoder 25_2 and the sense amplifier 26_2 are provided on the surface of the circuit chip 20_2 facing the Z1 direction.

The array chips 10_1 to 10_4 are provided with memory cell arrays 11_1 to 11_4, respectively.

For example, the block BLK_1 of the memory cell array 11_1 and the block BLK_2 of the memory cell array 11_2 aligned in the Z direction share the word line WL_1. The word line WL_1 is connected to the row decoder 25_1. Similarly, a block BLK_3 of the memory cell array 11_3 and a block BLK_4 of the memory cell array 11_4 aligned in the Z direction share the word line WL_2. The word line WL_2 is connected to the row decoder 25_2.

The block BLK_1 of the memory cell array 11_1 is connected to the sense amplifier 26_1 via the bit line BL_1. The block BLK_2 of the memory cell array 11_2 is connected to the sense amplifier 26_1 via the bit line BL_2. Similarly, the block BLK_3 of the memory cell array 11_3 is connected to the sense amplifier 26_2 via a bit line BL_3. The block BLK_4 of the memory cell array 11_4 is connected to the sense amplifier 26_2 via the bit line BL_4.

1.8.2 Advantages According to Modified Example of First Embodiment

With the configuration according to Modified Example of the first embodiment, the same advantages as those of the first embodiment can be obtained.

2. Second Embodiment

Next, a second embodiment will be described. In the second embodiment, a case where sense amplifier units SAU correspond to three bit lines BL will be described.

2.1 Arrangement of Chips

Figure 34:
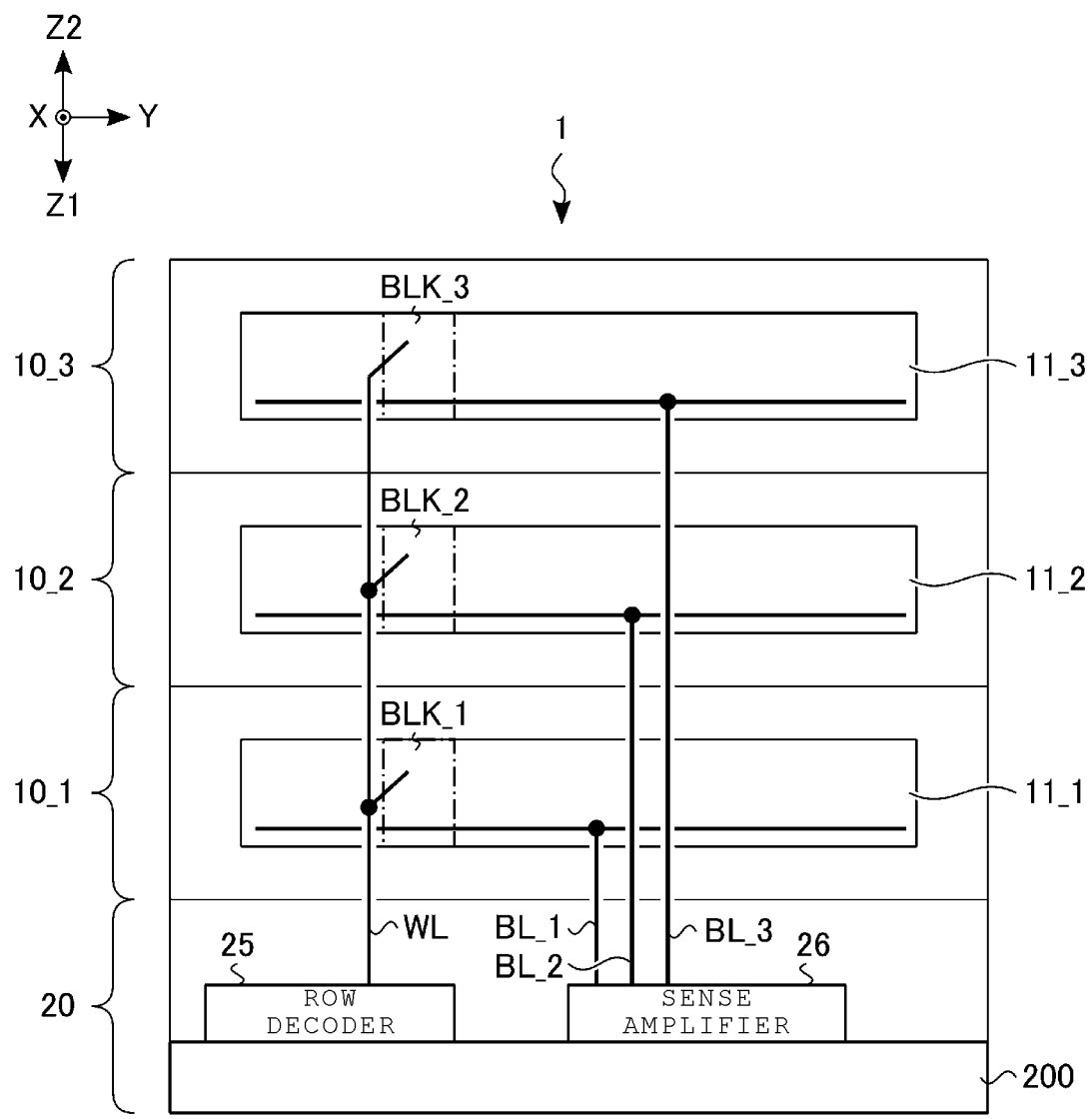
FIG. 34 illustrates a cross-sectional view of an arrangement of array chips and a circuit chip provided in a semiconductor memory device according to a second embodiment.

First, an example of an arrangement of each chip will be described with reference to FIG. 34. FIG. 34 illustrates a cross-sectional view of the arrangement of the array chips 10_1 to 10_3 and the circuit chip 20. It should be noted that, in the example of FIG. 34, for the simplification of description, one for each of the word line WL and the bit line BL_1 to BL_3 are illustrated. The select gate lines SGD and SGS and the source line SL are omitted.

As illustrated in FIG. 34, the semiconductor memory device 1 according to the example includes three array chips 10_1 to 10_3 and the circuit chip 20. The array chip 10_1 is bonded on the circuit chip 20 toward the Z2 direction. The array chip 10_2 is bonded on the array chip 10_1. The array chip 10_3 is bonded on the array chip 10_2. That is, the circuit chip 20, the array chip 10_1, the array chip 10_2, and the array chip 10_3 are stacked sequentially toward the Z2 direction.

The array chips 10_1 to 10_3 are provided with the memory cell arrays 11_1 to 11_3, respectively.

For example, the block BLK_1 of the memory cell array 11_1, the block BLK_2 of the memory cell array 11_2, and the block BLK_3 of the memory cell array 11_3, which are aligned in the Z direction, share the word line WL.

The block BLK_1 of the memory cell array 11_1 is connected to the sense amplifier 26 via the bit line BL_1. The block BLK_2 of the memory cell array 11_2 is connected to the sense amplifier 26 via the bit line BL_2. The block BLK_3 of the memory cell array 11_3 is connected to the sense amplifier 26 via the bit line BL_3.

It should be noted that, although the example describes three stacked array chips 10, four or more array chips 10 may be stacked. For example, when m (m is an integer of 4 or more) array chips 10_1 to 10_*m* are stacked, the semiconductor memory device 1 includes m memory cell arrays 11_1 to 11_*m*. The memory cell arrays 11_1 to 11_*m* are connected to the sense amplifier 26 via the bit lines BL_1 to BL m, respectively.

2.2 Configurations of Data Register and Sense Amplifier

Figure 35:
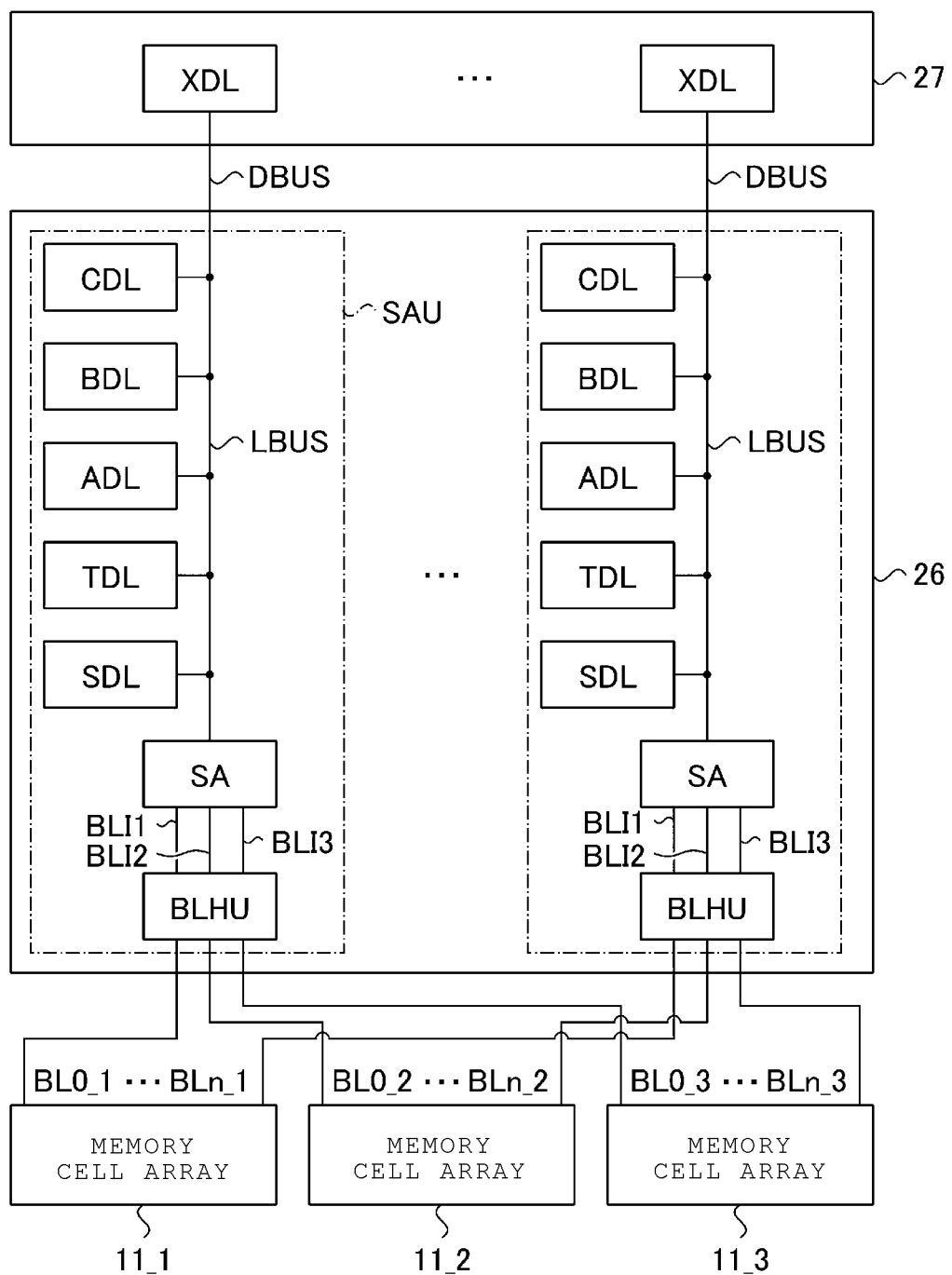
FIG. 35 is a block diagram of a data register and a sense amplifier provided in the semiconductor memory device according to the second embodiment.

Next, an example of the configurations of the data register 27 and the sense amplifier 26 will be described with reference to FIG. 35. FIG. 35 is a block diagram of the data register 27 and the sense amplifier 26.

As illustrated in FIG. 35, the sense amplifier 26 includes a plurality of sense amplifier units SAU provided for each set of the bit lines BL_1 to BL_3. More specifically, for example, the sense amplifier unit SAU is provided corresponding to a set of the bit line BL0_1 of the memory cell array 11_1, the bit line BL0_2 of the memory cell array 11_2, and a bit line BL0_3 of the memory cell array 11_3. Similarly, the sense amplifier unit SAU is provided corresponding to a set of the bit line BLn_1 of the memory cell array 11_1, the bit line BLn_2 of the memory cell array 11_2, and the bit line BLn_3 of the memory cell array 11_3. That is, (n+1) sense amplifier units SAU are provided for a set of (n+1) bit lines BL_1 to BL_3.

Next, the internal configuration of the sense amplifier unit SAU will be described. The bit lines BL_1 to BL_3 are connected to the BL hookup circuit BLHU. The BL hookup circuit BLHU is connected to the sense circuit SA via nodes BLI1 to BLI3. The node BLI1 corresponds to the bit line BL_1. The node BLI2 corresponds to the bit line BL_2. The node BLI3 corresponds to the bit line BL_3.

2.3 Number of Latch Circuits Used for Read Operation and Write Operation

Next, an example of the number of latch circuits used for the read operation and the write operation will be described with reference to FIG. 36. FIG. 36 is a diagram illustrating the number of latch circuits used for the read operation and the write operation. In the example of FIG. 36, the memory cell transistor MC is the SLC, TLC, or QLC. It should be noted that the number of latch circuits illustrated in FIG. 36 includes the latch circuit XDL.

As illustrated in FIG. 36, the number of latch circuits used for the 1CU read operation and the 1CU write operation is the same as those in FIG. 15.

A 3CU read operation will be described. For example, in the SLC, four latch circuits are used for the 3CU read operation. For example, in the TLC, four latch circuits are used for the 3CU read operation of the NLK method. In the QLC, four latch circuits are used for the 3CU read operation of the NLK method.

Next, the 3CU write operation will be described. For example, in the SLC, four latch circuits are used for the 3CU write operation.

Therefore, for example, when the sense amplifier unit SAU includes four latch circuits (excluding the latch circuit XDL) corresponding to the 1CU write operation of the TLC, the 3CU read operation of the SLC, the 3CU read operation of the TLC according to the NLK method, and the 3CU write operation of the SLC may be performed without increasing the number of latch circuits. Similarly, for example, when the sense amplifier unit SAU includes five latch circuits (excluding the latch circuit XDL) corresponding to the 1CU write operation of the QLC, the 3CU read operation of the SLC, the 3CU read operation of the QLC according to the NLK method, and the 3CU write operation of the SLC may be performed without increasing the number of latch circuits.

2.4 Circuit Configuration of Sense Amplifier Unit

Figure 37:
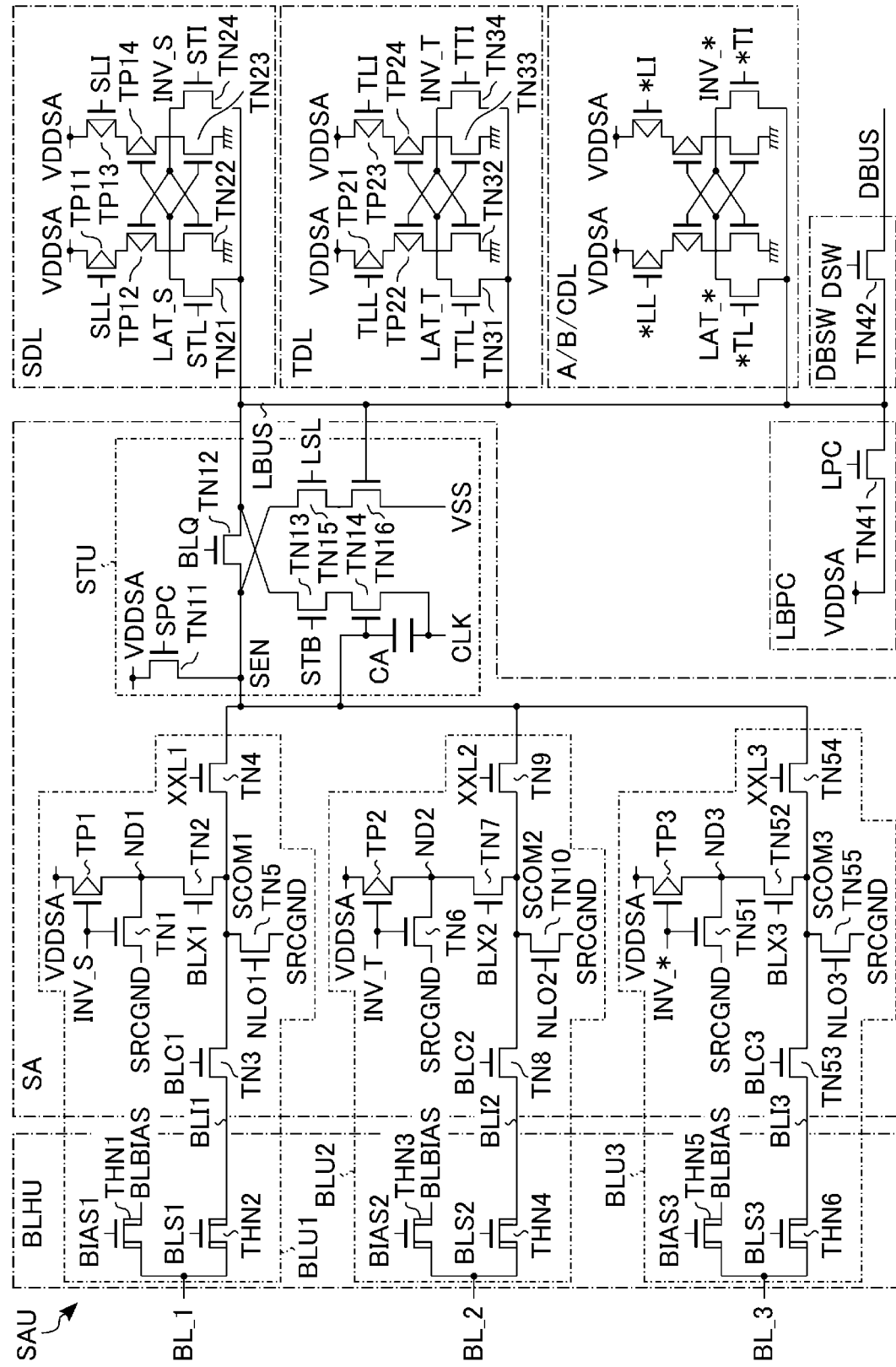
FIG. 37 is a circuit diagram of a sense amplifier unit provided in the semiconductor memory device according to the second embodiment.

Next, the circuit configuration of the sense amplifier unit SAU will be described with reference to FIG. 37. FIG. 37 is a circuit diagram of the sense amplifier unit SAU. The sense amplifier unit SAU of the present embodiment senses the current flowing from the node SEN to the bit line BL.

As illustrated in FIG. 37, the configurations of the latch circuits SDL, ADL, BDL, CDL, and TDL, the LBUS pre-charge circuit LBPC, and the DBUS switch circuit DBSW are the same as those in FIG. 16 of the first embodiment.

2.4.1 Configuration of BL Hookup Circuit

First, the configuration of the BL hookup circuit BLHU will be described. The BL hookup circuit BLHU includes high-breakdown voltage n-channel MOS transistors THN1 to THN6. The connections of the transistors THN1 to THN4 are the same as those in FIG. 16 of the first embodiment.

One end of the transistor THN5 is connected to the bit line BL_3. The other end of the transistor THN5 is connected to the node BLBIAS. A signal BIAS3 is input to the gate of the transistor THN3. The signal BIAS3 is a signal controlling electrical connection between the bit line BL_3 and the node BLBIAS.

One end of the transistor THN6 is connected to the bit line BL_3. The other end of the transistor THN6 is connected to the node BLI3. A signal BLS3 is input to the gate of the transistor THN3. The signal BLS3 is a signal controlling electrical connection between the bit line BL_3 and the node BLI3. When electrically connecting the bit line BL_3 and the sense circuit SA, the signal BLS3 is applied with a voltage at the "H" level for turning on the transistor TN6.

For example, the BL hookup circuit BLHU receives the signals BIAS1, BIAS2, BIAS3, BLS1, BLS2, and BLS3 from the sequencer 23.

2.4.2 Configuration of Sense Circuit

Next, the configuration of the sense circuit SA will be described. The sense circuit SA includes low-breakdown voltage p-channel MOS transistors TP1 to TP3, low-breakdown voltage n-channel MOS transistors TN1 to TN16 and TN51 to TN55, and the capacitive element CA.

The connections of the transistors TP1 and TP2, TN1 to TN16, and the capacitive element CA are the same as those in FIG. 16 of the first embodiment.

The voltage VDDSA is applied to one end of the transistor TP3. The other end of the transistor TP3 is connected to a node ND3. For example, the gate of the transistor TP3 is connected to the node INV_*. The node INV_* may be any one of the node INV_A of the latch circuit ADL, a node INV B of the latch circuit BDL, or a node INV_C of the latch circuit CDL. In the following, the case where the node INV_* is the node INV_A will be described. The node INV_A is a node capable of storing data (inverted data) in the latch circuit ADL. When the node INV_A is at the "L" level, the transistor TP3 is turned on.

One end of the transistor TN51 is connected to the node ND3. The other end of the transistor TN51 is connected to the node SRCGND. The gate of the transistor TN51 is connected to the node INV_A. When the node INV_A is at the "H" level, the transistor TN51 is turned on. Therefore, based on the logic level of the node INV_A, one of the transistors TP3 and TN51 is turned on, and the other is turned off. In other words, based on the logic level of the node INV_A, the voltage VDDSA or the voltage VSS is applied to the node ND3.

One end of the transistor TN52 is connected to the node ND3. The other end of the transistor TN52 is connected to a node SCOM3. A signal BLX3 is input to the gate of the transistor TN52. When the signal BLX3 is at the "H" level, the transistor TN52 is turned on.

One end of the transistor TN53 is connected to the node BLI3. The other end of the transistor TN53 is connected to the node SCOM3. A signal BLC3 is input to the gate of the transistor TN53. The transistor TN53 may function as a clamp transistor clamping the voltage applied to the bit line BL_3 based on the voltage of the signal BLC3.

One end of the transistor TN54 is connected to the node SCOM3. The other end of the transistor TN54 is connected to the node SEN. A signal XXL3 is input to the gate of the transistor TN54. When the signal XXL3 is at the "H" level, the transistor TN54 is turned on.

One end of the transistor TN55 is connected to the node SCOM3. The other end of the transistor TN55 is connected to the node SRCGND. A signal NLO3 is input to the gate of the transistor TN55. When the signal NLO3 is at the "H" level, the transistor TN55 is turned on.

The transistors THN5 and THN6 of the BL hookup circuit BLHU and the transistors TP3 and TN51 to TN55 of the sense circuit SA function as a connection unit BLU3 for the bit line BL_3. The connection units BLU1 to BLU3 share the node SEN.

For example, the sense circuit SA receives the signals BLX1, BLX2, BLX3, BLC1, BLC2, BLC3, XXL1, XXL2, XXL3, NLO1, NLO2, NLO3, SPC, BLQ, STB, and LSL from the sequencer 23.

When m bit lines BL_1 to BL m are connected to the sense amplifier unit SAU, the sense amplifier unit SAU includes m connection units BLU1 to BLUm. The connection units BLU1 to BLUm share the node SEN.

2.5 Flow of 3CU Read Operation of SLC

Figure 38:
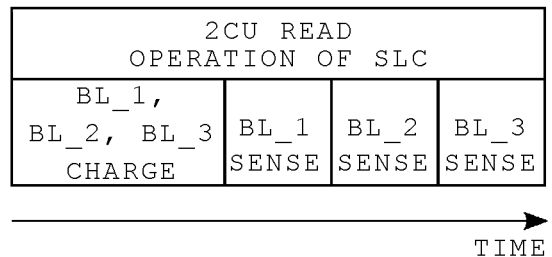
FIG. 38 is a diagram illustrating a flow of a 3CU read operation of an SLC focusing on an operation of the sense amplifier unit provided in the semiconductor memory device according to the second embodiment.

Next, an example of the flow of the 3CU read operation of the SLC will be described with reference to FIG. 38. FIG. 38 is a diagram illustrating the flow of the 3CU read operation of the SLC focusing on the operation of the sense amplifier unit SAU.

As illustrated in FIG. 38, when performing the 3CU read operation, first, the sense amplifier unit SAU collectively charges the corresponding bit lines BL_1 to BL_3. Next, the sense amplifier unit SAU performs the sensing operation (BL_1 sense) with respect to the bit line BL_1. Next, the sense amplifier unit SAU performs the sensing operation (BL_2 sense) with respect to the bit line BL_2. Next, the sense amplifier unit SAU performs the sensing operation (BL_3 sense) with respect to the bit line BL_3. In other words, the 3CU read operation of the SLC includes a period for charging the bit lines BL_1 to BL_3, a period for performing the sensing operation with respect to the bit line BL_1, a period for performing the sensing operation with respect to the bit line BL_2, and a period for performing the sensing operation with respect to the bit line BL_3.

2.6 Flow of 3CU Write Operation of SLC

Figure 39:
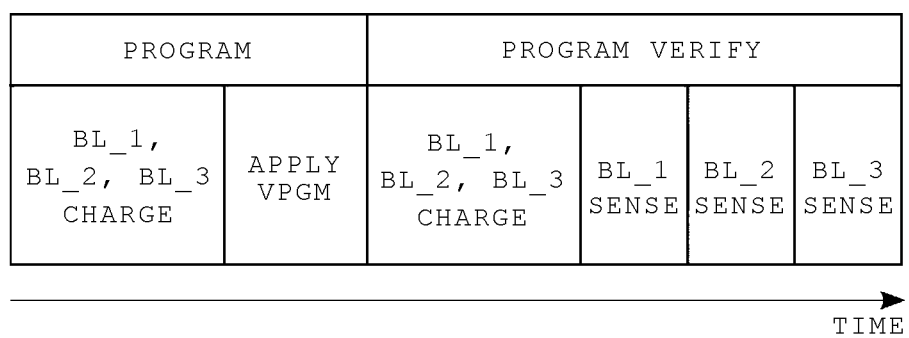
FIG. 39 is a diagram illustrating a flow of a 3CU write operation of an SLC focusing on an operation of the sense amplifier unit provided in the semiconductor memory device according to the second embodiment.

Next, an example of the flow of the 3CU write operation of the SLC will be described with reference to FIG. 39. FIG. 39 is a diagram illustrating the flow of the 3CU write operation of the SLC focusing on the operation of the sense amplifier unit SAU. It should be noted that the example of FIG. 39 illustrates one program loop.

As illustrated in FIG. 39, during the program operation, first, the sense amplifier unit SAU collectively charges the bit lines BL_1 to BL_3 based on the data (for example, the "1" data) stored in the latch circuits SDL, TDL, and ADL. More specifically, the sense amplifier unit SAU collectively charges the bit lines BL_1, BL_2, and BL_3 corresponding to the program-inhibition memory cell transistors MC. After that, the row decoder 25 applies the voltage VPGM to the selected word line WL. Accordingly, data is collectively written into the program target memory cell transistors MC in the memory cell arrays 11_1, 11_2, and 11_3. That is, the program operations of the array chips 10_1, 10_2, and 10_3 are concurrently performed. In other words, during the 3CU write operation of the SLC, the program operation includes a period for charging the bit lines BL_1 to BL_3 and a period for applying the voltage VPGM to the selected word line WL.

Next, during the program verification operation, first, the sense amplifier unit SAU collectively charges the corresponding bit lines BL_1 to BL_3. Next, the sense amplifier unit SAU performs the sensing operation (BL_1 sense) with respect to the bit line BL_1. Next, the sense amplifier unit SAU performs the sensing operation (BL_2 sense) with respect to the bit line BL_2. Next, the sense amplifier unit SAU performs the sensing operation (BL_3 sense) with respect to the bit line BL_3. In other words, during the 3CU write operation of the SLC, the program verification operation includes a period for charging the bit lines BL_1 to BL_3, a period for performing the sensing operation with respect to the bit line BL_1, a period for performing the sensing operation with respect to the bit line BL_2, and a period for performing the sensing operation with respect to the bit line BL_3.

2.7 Flow of 3CU Read Operation of TLC

Figure 40:
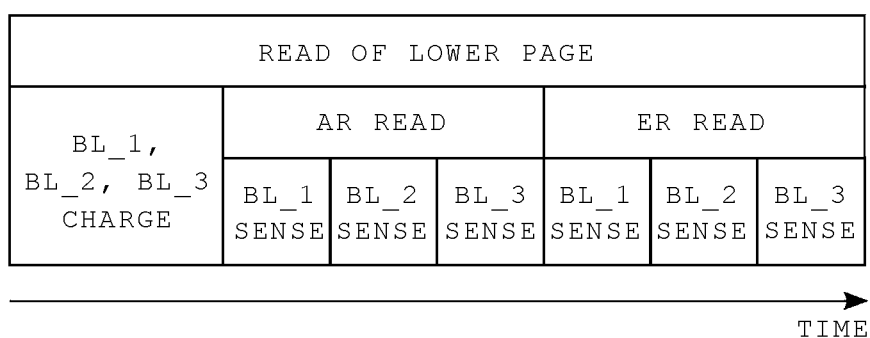
FIG. 40 is a diagram illustrating a flow of a 3CU read operation of a TLC focusing on an operation of the sense amplifier unit provided in the semiconductor memory device according to the second embodiment.

Next, an example of the flow of the 3CU read operation of the TLC will be described with reference to FIG. 40. FIG. 40 is a diagram illustrating the flow of the 3CU read operation of the TLC focusing on the operation of the sense amplifier unit SAU. It should be noted that the example of FIG. 40 illustrates the read operation of the lower page.

As illustrated in FIG. 40, when performing the 3CU read operation, first, the sense amplifier unit SAU collectively charges the corresponding bit lines BL_1 to BL_3. Next, in the case of the lower page, the sense amplifier unit SAU performs the AR read operation and the ER read operation. Specifically, first, during the AR read operation, the sense amplifier unit SAU sequentially performs the sensing operation (BL_1 sense) with respect to the bit line BL_1, the sensing operation (BL_2 sense) with respect to the bit line BL_2, and the sensing operation (BL_3 sense) with respect to the bit line BL_3. Next, during the ER read operation, the sense amplifier unit SAU sequentially performs the sensing operation (BL_1 sense) with respect to the bit line BL_1, the sensing operation (BL_2 sense) with respect to the bit line BL_2, and the sensing operation (BL_3 sense) with respect to the bit line BL_3. In other words, the 3CU read operation of the lower page of the TLC includes a period for charging the bit lines BL_1 to BL_3, a period for performing the sensing operation with respect to the bit line BL_1, a period for performing the sensing operation with respect to the bit line BL_2, and a period for performing the sensing operation on the bit line BL_3 during the AR read operation, and a period for performing the sensing operation with respect to the bit line BL_1, a period for performing the sensing operation with respect to the bit line BL_2, and a period for performing the sensing operation with respect to the bit line BL_3 during the ER read operation.

2.8 Advantages of the Second Embodiment

With the configuration according to the second embodiment, the same advantages as those of the first embodiment can be obtained.

3. Third Embodiment

Next, a third embodiment will be described. In the third embodiment, the configuration of the sense amplifier unit SAU, which is different from that of the first embodiment, will be described. In the following, differences from the first embodiment will be mainly described.

3.1 Circuit Configuration of Sense Amplifier Unit

Figure 41:
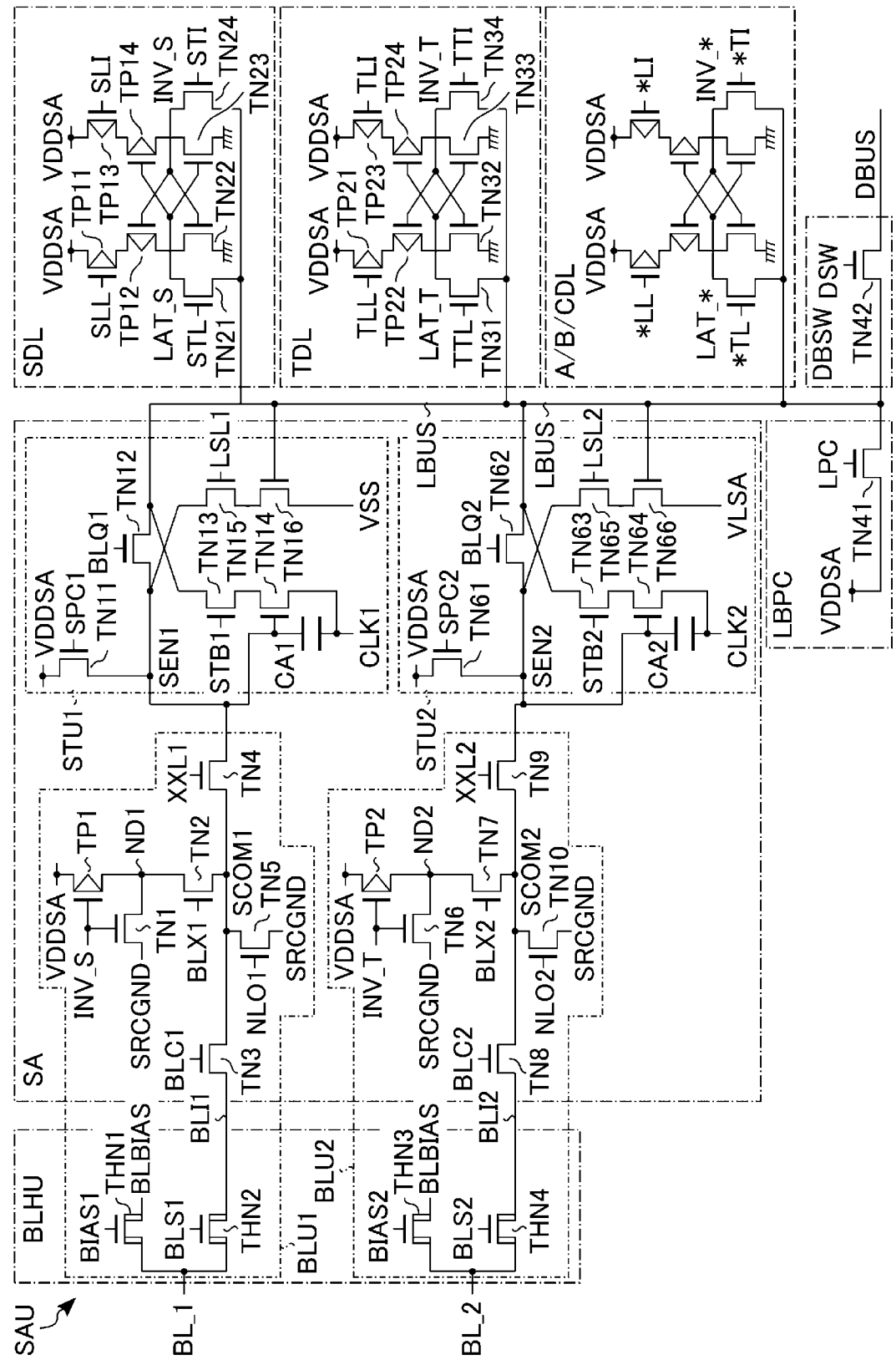
FIG. 41 is a circuit diagram of a sense amplifier unit provided in a semiconductor memory device according to a third embodiment.

First, the circuit configuration of the sense amplifier unit SAU will be described with reference to FIG. 41. FIG. 41 is a circuit diagram of the sense amplifier unit SAU. The sense amplifier unit SAU of the present embodiment senses the current flowing from the node SEN to the bit line BL.

As illustrated in FIG. 41, the configurations of the BL hookup circuit BLHU, the latch circuits SDL, ADL, BDL, CDL, and TDL, the LBUS pre-charge circuit LBPC, and the DBUS switch circuit DBSW are the same as those in FIG. 16 of the first embodiment. The sense amplifier unit SAU of the present embodiment includes two strobe units STU1 and STU2 respectively corresponding to the two bit lines BL_1 and BL_2. The bit line BL_1 is connected to the strobe unit STU1 via the connection unit BLU1. The bit line BL_2 is connected to the strobe unit STU2 via the connection unit BLU2. The strobe units STU1 and STU2 are commonly connected to the bus LBUS.

More specifically, the sense circuit SA includes low-breakdown voltage p-channel MOS transistors TP1 to TP3, low-breakdown voltage n-channel MOS transistors TN1 to TN16 and TN61 to TN66, and capacitive elements CA1 and CA2.

The configuration of the connection unit BLU1 is the same as that in FIG. 16. The transistor TN4 is connected to the strobe unit STU1 via a node SEN1.

The configuration of the strobe unit STU1 is the same as the configuration of the strobe unit STU described with reference to FIG. 6. For example, the strobe unit STU1 includes the transistors TN11 to TN16 similarly to the strobe unit STU described with reference to FIG. 16. The node SEN1, signals SPC1, STB1, BLQ1, LSL1, and CLK1, and the capacitive element CA1 correspond to the node SEN, the signals SPC, STB, BLQ, LSL, and CLK, and the capacitive element CA of the strobe unit STU described with reference to FIG. 6, respectively.

The configuration of the connection unit BLU2 is the same as in FIG. 16. The transistor TN9 is connected to the strobe unit STU2 via a node SEN2.

The configuration of the strobe unit STU2 is the same as the configuration of the strobe unit STU described with reference to FIG. 16. The strobe unit STU2 includes the transistors TN61 to TN66. The transistors TN61 to TN66 correspond to the transistors TN11 to TN16 of the strobe unit STU1, respectively. Each connection of the transistors TN61 to TN66 is same as that of the transistors TN11 to TN16 of the strobe unit STU1. The node SEN2, signals SPC2, STB2, BLQ2, LSL2, and CLK2, and the capacitive element CA2 correspond to the node SEN1, the signals SPC1, STB1, BLQ1, LSL1, and CLK1, and the capacitive element CA1 of the strobe unit STU1, respectively.

More specifically, the voltage VDDSA is applied to one end of the transistor TN61. The other end of the transistor TN61 is connected to the node SEN2. The signal SPC2 is input to the gate of the transistor TN61. When the signal SPC2 is at the "H" level, the transistor TN61 is turned on. For example, the transistor TN61 is used for charging the node SEN2.

One end of the transistor TN62 is connected to the node SEN2. The other end of the transistor TN62 is connected to the bus LBUS. The signal BLQ2 is input to the gate of the transistor TN62. When the signal BLQ2 is at the "H" level, the transistor TN62 is turned on. The transistor TN62 is turned on when the bus LBUS and the node SEN2 are electrically connected.

One end of the transistor TN63 is connected to the bus LBUS. The other end of the transistor TN63 is connected to one end of the transistor TN64. The signal STB2 is input to the gate of the transistor TN63. When the signal STB2 is asserted, the sense circuit SA determines the data stored in the selected memory cell transistor MC. More specifically, when the signal STB2 of the "H" level is input, the transistor TN63 is turned on. Meanwhile, the bus LBUS is discharged through the transistors TN63 and TN64 when the transistor TN64 is on. When the transistor TN64 is off, the bus LBUS is not discharged through the transistors TN63 and TN64. Data based on the voltage of the bus LBUS is stored in one of the latch circuits SDL, ADL, BDL, CDL, and TDL sharing the bus LBUS.

The clock signal CLK2 is input to the other end of the transistor TN64. The gate of the transistor TN64 is connected to the node SEN2. The transistor TN64 functions as a sense transistor that senses the voltage of the node SEN2. For example, when the voltage of the node SEN2 is the threshold voltage of the transistor TN64 or higher, the transistor TN64 is turned on. When the voltage of the node SEN2 is lower than the threshold voltage of the transistor TN64, the transistor TN64 is turned off.

One electrode of the capacitive element CA2 is connected to the node SEN2. The clock signal CLK2 is input to the other electrode of the capacitive element CA2.

One end of the transistor TN65 is connected to the node SEN2. The other end of the transistor TN65 is connected to one end of the transistor TN66. The signal LSL2 is input to the gate of the transistor TN65. When the signal LSL2 is at the "H" level, the transistor TN65 is turned on.

The voltage VSS is applied to the other end of the transistor TN66. The gate of the transistor TN66 is connected to the bus LBUS.

For example, the sense circuit SA receives the signals BLX1, BLX2, BLC1, BLC2, XXL1, XXL2, NLO1, NLO2, SPC1, SPC2, BLQ1, BLQ2, STB1, STB2, LSL1, and LSL2 from the sequencer 23.

3.2 Flow of 2CU Read Operation of SLC

Figure 42:
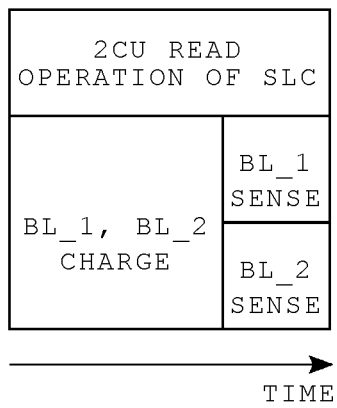
FIG. 42 is a diagram illustrating a flow of a 2CU read operation of an SLC focusing on an operation of the sense amplifier unit provided in the semiconductor memory device according to the third embodiment.

Next, an example of the flow of the 2CU read operation of the SLC will be described with reference to FIG. 42. FIG. 42 is a diagram illustrating the flow of the 2CU read operation of the SLC focusing on the operation of the sense amplifier unit SAU.

As illustrated in FIG. 42, when performing the 2CU read operation, first, the sense amplifier unit SAU collectively charges the corresponding bit lines BL_1 and BL_2. Next, the sense amplifier unit SAU performs the sensing operation (BL_1 sense) with respect to the bit line BL_1 and the sensing operation (BL_2 sense) with respect to the bit line BL_2 in parallel. In other words, the 2CU read operation of the SLC includes a period for charging the bit lines BL_1 and BL_2 and a period for performing the sensing operations with respect to the bit lines BL_1 and BL_2.

3.3 Flow of 2CU Write Operation of SLC

Figure 43:
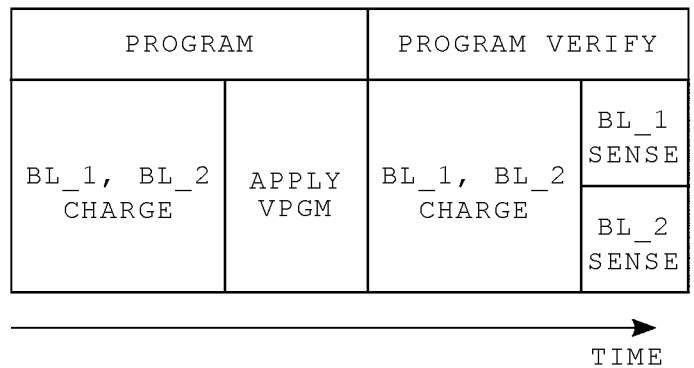
FIG. 43 is a diagram illustrating a flow of a 2CU write operation of an SLC focusing on an operation of the sense amplifier unit provided in the semiconductor memory device according to the third embodiment.

Next, an example of the flow of the 2CU write operation of the SLC will be described with reference to FIG. 43. FIG. 43 is a diagram illustrating the flow of the 2CU write operation of the SLC focusing on the operation of the sense amplifier unit SAU. It should be noted that the example of FIG. 43 illustrates one program loop.

As illustrated in FIG. 43, during the program operation, first, the sense amplifier unit SAU collectively charges the bit lines BL_1 and BL_2 based on the data stored in the latch circuits SDL and TDL. More specifically, the sense amplifier unit SAU collectively charges the bit lines BL_1 and BL_2 corresponding to the program-inhibition memory cell transistors MC. Next, the row decoder 25 applies the voltage VPGM to the selected word line WL. Accordingly, data is collectively written into the program target memory cell transistors MC in the memory cell arrays 11_1 and 11_2. That is, the program operations of the array chips 10_1 and 10_2 are concurrently performed. In other words, during the 2CU write operation of the SLC, the program operation includes a period for charging the bit lines BL_1 and BL_2 and a period for applying the voltage VPGM to the selected word line WL.

Next, during the program verification operation, first, the sense amplifier unit SAU collectively charges the corresponding bit lines BL_1 and BL_2. Next, the sense amplifier unit SAU performs the sensing operation (BL_1 sense) with respect to the bit line BL_1 and the sensing operation (BL_2 sense) with respect to the bit line BL_2 in parallel. In other words, during the 2CU write operation of the SLC, the program verification operation includes a period for charging the bit lines BL_1 and BL_2 and a period for performing the sensing operations with respect to the bit lines BL_1 and BL_2.

3.4 Flow of 2CU Read Operation of TLC

Figure 44:
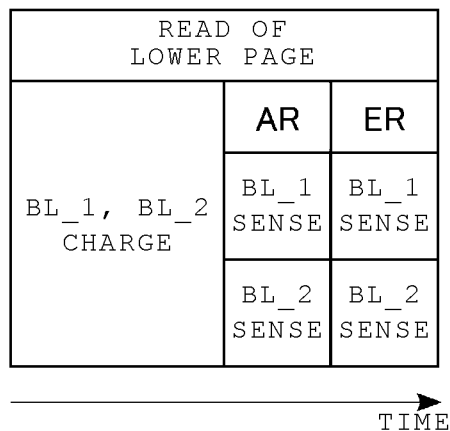
FIG. 44 is a diagram illustrating a flow of a 2CU read operation of a TLC focusing on an operation of the sense amplifier unit provided in the semiconductor memory device according to the third embodiment.

Next, an example of the flow of the 2CU read operation of the TLC will be described with reference to FIG. 44. FIG. 44 is a diagram illustrating the flow of the 2CU read operation of the TLC focusing on the operation of the sense amplifier unit SAU. It should be noted that the example of FIG. 44 illustrates the read operation of the lower page.

As illustrated in FIG. 44, when performing the 2CU read operation, first, the sense amplifier unit SAU collectively charges the corresponding bit lines BL_1 and BL_2. Next, in the case of the lower page, the sense amplifier unit SAU sequentially performs the AR read operation and the ER read operation. Specifically, first, during the AR read operation, the sense amplifier unit SAU performs the sensing operation (BL_1 sense) with respect to the bit line BL_1 and the sensing operation (BL_2 sense) with respect to the bit line BL_2 in parallel. Next, during the ER read operation, the sense amplifier unit SAU performs the sensing operation (BL_1 sense) with respect to the bit line BL_1 and the sensing operation (BL_2 sense) with respect to the bit line BL_2 in parallel. In other words, the 2CU read operation of the lower page of the TLC includes a period for charging the bit lines BL_1 and BL_2, a period for performing the sensing operation with respect to the bit lines BL_1 and BL_2 during the AR read operation, and a period for performing the sensing operation with respect to the bit line BL_1 during the ER read operation.

3.5 Advantages of the Third Embodiment

With the configuration according to the third embodiment, the same advantages as those of the first embodiment can be obtained.

With the configuration according to the third embodiment, the sense amplifier unit SAU includes the strobe unit STU1 corresponding to the bit line BL_1 and the strobe unit STU2 corresponding to the bit line BL_2. Accordingly, during the 2CU read operation, the sensing operation with respect to the bit line BL_1 and the sensing operation on the bit line BL_2 can be performed in parallel. During the program verification operation with respect to the 2CU write operation, the sensing operation with respect to the bit line BL_1 and the sensing operation with respect to the bit line BL_2 can be performed in parallel. Therefore, the processing capability of the semiconductor memory device 1 can be improved.

4. Fourth Embodiment

Next, a fourth embodiment will be described. In the fourth embodiment, the configuration of the sense amplifier unit SAU, which is different from that of the first embodiment, will be described. In the following, differences from the first embodiment will be mainly described.

4.1 Circuit Configuration of Sense Amplifier Unit

Figure 45:
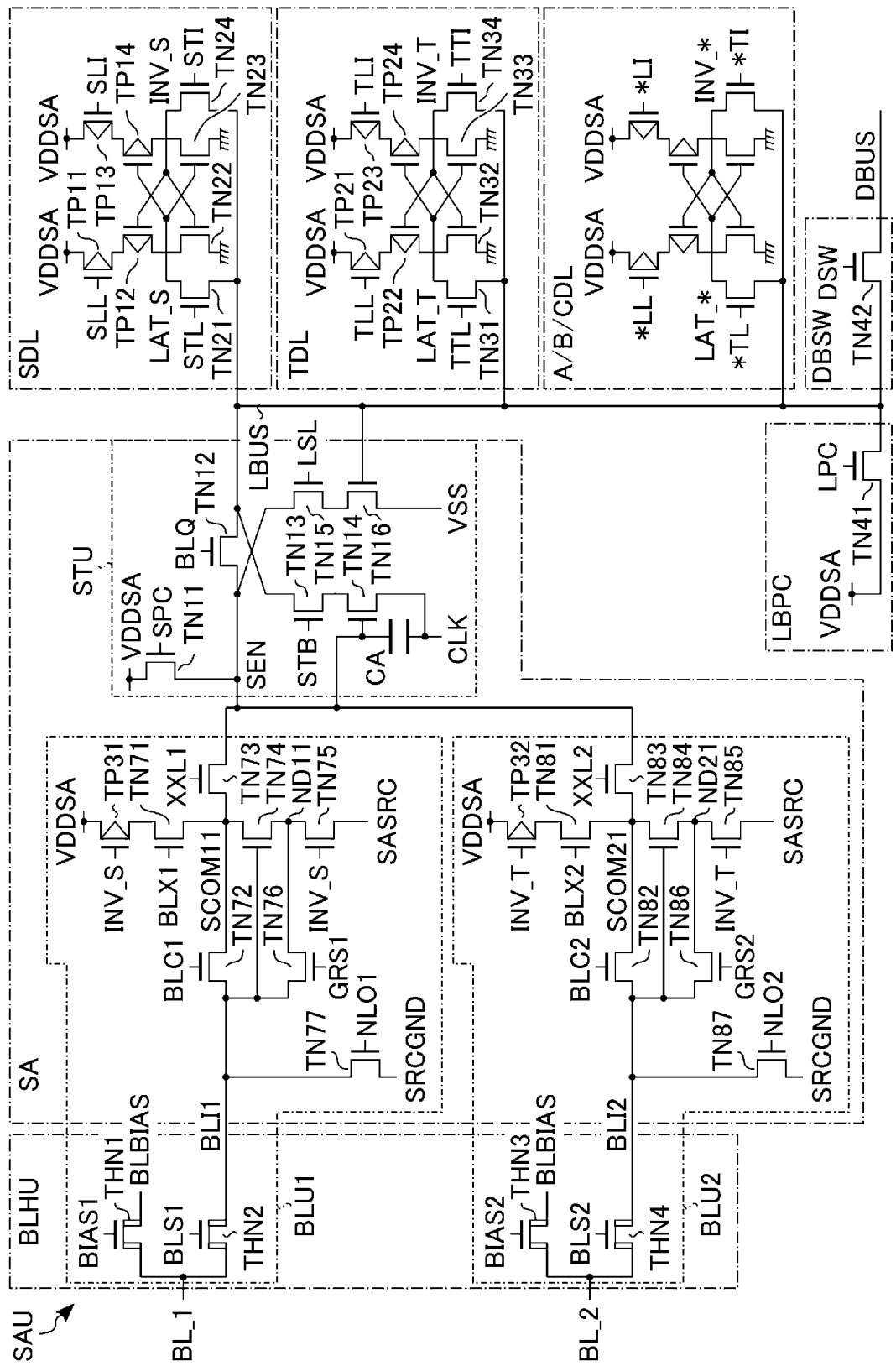
FIG. 45 is a circuit diagram of a sense amplifier unit provided in a semiconductor memory device according to a fourth embodiment.

First, the circuit configuration of the sense amplifier unit SAU will be described with reference to FIG. 45. FIG. 45 is a circuit diagram of the sense amplifier unit SAU. The sense amplifier unit SAU of the present embodiment corresponds to a diode sense amplifier (DSA) system for sensing a current flowing from the source line SL to the sense amplifier unit SAU via the bit line BL.

As illustrated in FIG. 45, the configurations of the BL hookup circuit BLHU, the strobe unit STU of the sense circuit SA, the latch circuits SDL, ADL, BDL, CDL, and TDL, the LBUS pre-charge circuit LBPC, and the DBUS switch circuit DBSW are similar to those in FIG. 16 of the first embodiment. The sense amplifier unit SAU of the present embodiment differs from that of the first embodiment illustrated in FIG. 16 in the configuration of the connection units BLU1 and BLU2.

More specifically, the sense circuit SA includes low-breakdown voltage p-channel MOS transistors TP31 and TP32, low-breakdown voltage n-channel MOS transistors TN11 to TN16, TN71 to TN77, and TN81 to TN87, and the capacitive element CA.

The connection of each of the transistors TN11 to TN16 is the same as that in FIG. 16 of the first embodiment.

The voltage VDDSA is applied to one end of the transistor TP31. The other end of the transistor TP31 is connected to one end of the transistor TN71. The gate of the transistor TP31 is connected to the node INV_S.

The other end of the transistor TN71 is connected to a node SCOM11. The signal BLX1 is input to the gate of the transistor TN71.

One end of the transistor TN72 is connected to the node BLI1. The other end of the transistor TN72 is connected to the node SCOM11. The signal BLC1 is input to the gate of the transistor TN72. The transistor TN72 may function as a clamp transistor clamping the voltage applied to the bit line BL_1 based on the voltage of the signal BLC1.

One end of the transistor TN73 is connected to the node SCOM11. The other end of the transistor TN73 is connected to the node SEN. The signal XXL1 is input to the gate of the transistor TN73.

One end of the transistor TN74 is connected to the node SCOM11. The other end of the transistor TN74 is connected to a node ND11. The gate of the transistor TN74 is connected to the node BLI1.

One end of the transistor TN75 is connected to the node ND11. The other end of the transistor TN75 is connected to a node SASRC. The gate of the transistor TN75 is connected to the node INV_S.

One end of the transistor TN76 is connected to the node BLI1. The other end of the transistor TN76 is connected to the node ND11. A signal GRS1 is input to the gate of the transistor TN76. When the signal GRS1 is at the "H" level, the transistor TN76 is turned on.

One end of the transistor TN77 is connected to the node BLI1. The other end of the transistor TN77 is connected to the node SRCGND. The signal NLO1 is input to the gate of the transistor TN77.

The transistors THN1 and THN2 of the BL hookup circuit BLHU and the transistors TP31 and TN71 to TN77 of the sense circuit SA function as the connection unit BLU1 controlling the connection of the bit line BL_1.

The voltage VDDSA is applied to one end of the transistor TP32. The other end of the transistor TP32 is connected to one end of the transistor TN81. The gate of the transistor TP32 is connected to the node INV_T.

The other end of the transistor TN81 is connected to a node SCOM21. The signal BLX2 is input to the gate of the transistor TN81.

One end of the transistor TN82 is connected to the node BLI2. The other end of the transistor TN82 is connected to the node SCOM21. The signal BLC2 is input to the gate of the transistor TN82. The transistor TN82 may function as a clamp transistor clamping the voltage applied to the bit line BL_2 based on the voltage of the signal BLC2.

One end of the transistor TN83 is connected to the node SCOM21. The other end of the transistor TN83 is connected to the node SEN. The signal XXL2 is input to the gate of the transistor TN83.

One end of the transistor TN84 is connected to the node SCOM21. The other end of the transistor TN84 is connected to a node ND21. The gate of the transistor TN84 is connected to the node BLI2.

One end of the transistor TN85 is connected to the node ND21. The other end of the transistor TN85 is connected to the node SASRC. The gate of the transistor TN85 is connected to the node INV_T.

One end of the transistor TN86 is connected to the node BLI2. The other end of the transistor TN86 is connected to the node ND21. A signal GRS2 is input to the gate of the transistor TN86. When the signal GRS2 is at the "H" level, the transistor TN86 is turned on.

One end of the transistor TN87 is connected to the node BLI2. The other end of the transistor TN87 is connected to the node SRCGND. The signal NLO2 is input to the gate of the transistor TN87.

The transistors THN3 and THN4 of the BL hookup circuit BLHU and the transistors TP32 and TN81 to TN87 of the sense circuit SA function as the connection unit BLU2 controlling the connection of the bit line BL_2.

For example, the sense circuit SA receives the signals BLX1, BLX2, BLC1, BLC2, XXL1, XXL2, GRS1, GRS2, NLO1, NLO2, SPC, BLQ, STB, and LSL from the sequencer 23.

4.2 Timing Chart of 2CU Read Operation of TLC

Figure 46:
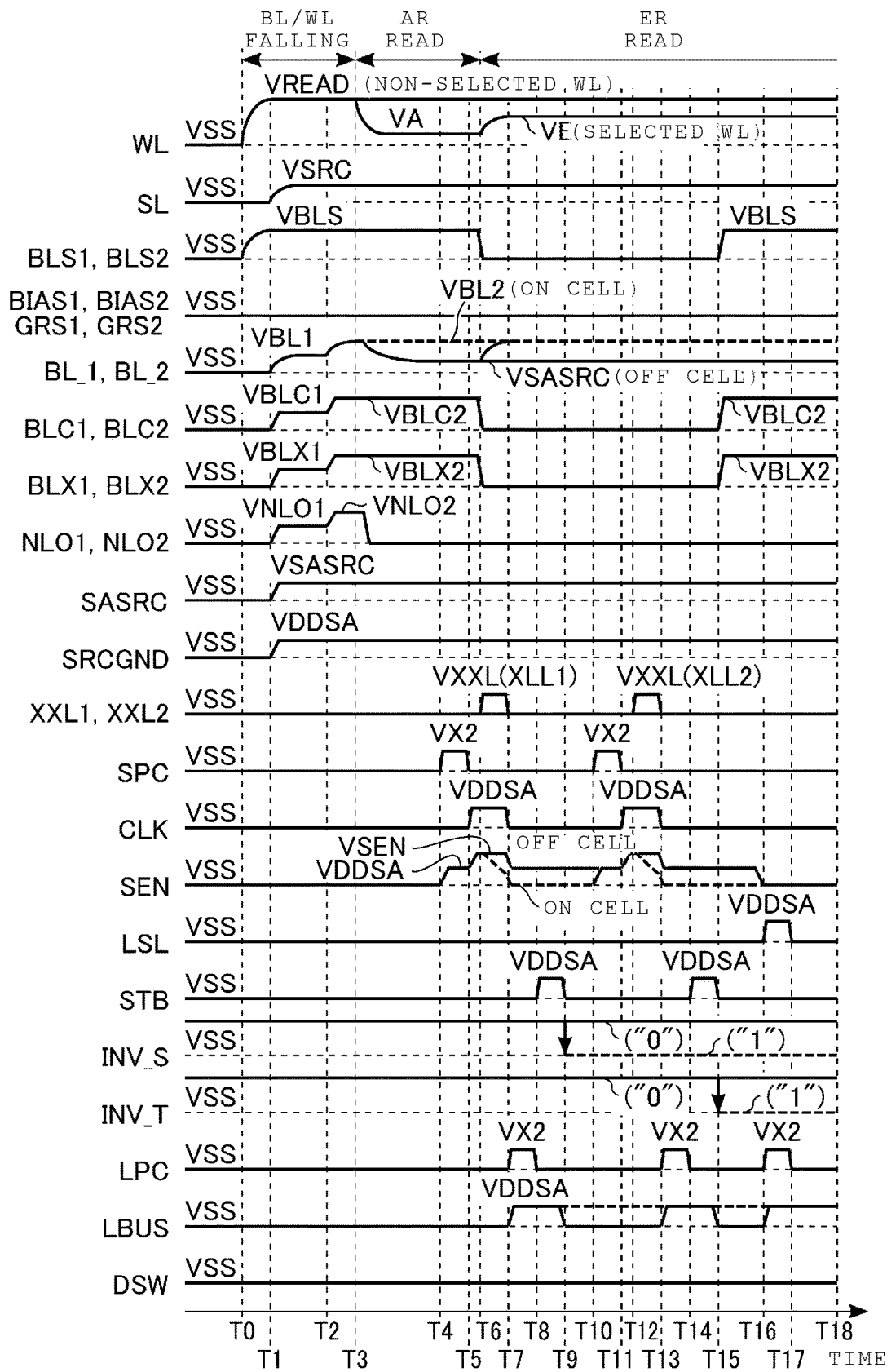
FIG. 46 is a timing chart illustrating respective voltages of wirings and signals in a 2CU read operation of the semiconductor memory device according to the fourth embodiment.
Figure 47:
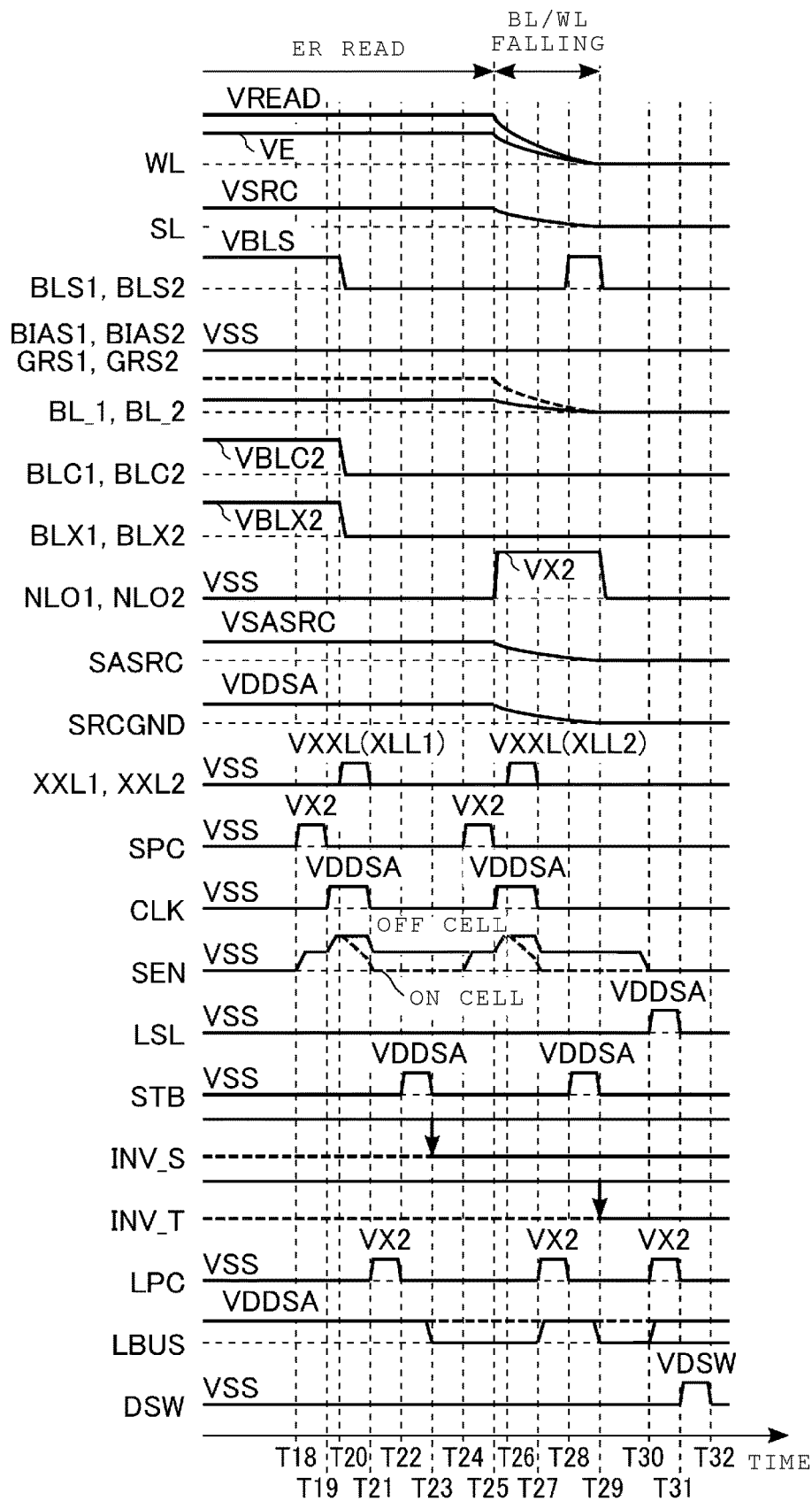
FIG. 47 is a timing chart illustrating respective voltages of wirings and signals during the 2CU read operation of the semiconductor memory device according to the fourth embodiment.

Next, an example of a timing chart of the 2CU read operation of the TLC will be described with reference to FIGS. 46 and 47. FIGS. 46 and 47 are timing charts illustrating respective voltages of wirings and signals during the 2CU read operation. FIG. 46 illustrates a period from time T0 to T18. FIG. 47 illustrates a period from time T18 to T32. It should be noted that the select gate lines SGD and SGS are omitted in the examples of FIGS. 46 and 47.

As illustrated in FIG. 46, during the period from time T0 to T3, the activation of the bit line BL and the word line WL is performed.

At time T0, the row decoder 25 applies the voltage VREAD to the non-selected word lines WL and the selected word line WL of the selected block BLK. Accordingly, each memory cell transistor MC in the selected block BLK is turned on. The voltage VBLS is applied to the signals BLS1 and BLS2 of the BL hookup circuit BLHU. Accordingly, the transistors THN2 and THN4 are turned on. The bit line BL_1 is electrically connected to the node BLI1. The bit line BL_2 is electrically connected to the node BLI2. The "0" data is stored in the latch circuits SDL and TDL. Therefore, the nodes INV_S and INV_T are at the "H" level. Therefore, the transistors TP31 and TP32 are turned off. The transistors TN75 and TN85 are turned on.

At time T1, the voltage VSRC is applied to the source line SL. The voltage VBLC1 is applied to the signals BLC1 and BLC2 of the sense circuit SA. Accordingly, the transistors TN72 and TN82 are turned on. The voltage VBLX1 is applied to the signals BLX1 and BLX2. Accordingly, the transistors TN71 and TN81 are turned on. The voltage VNLO1 is applied to the signals NLO1 and NLO2. The voltage VNLO1 is a voltage of the voltage VBLC1 or higher. Accordingly, the transistors TN77 and TN87 are turned on. The voltage VDDSA is applied to the node SRCGND. A voltage VSASRC is applied to the node SASRC. The voltage VSASRC is a voltage lower than the voltage VSRC. For example, the voltage VSASRC is VSASRC=VBL2−Vth. A voltage higher than the voltage VSS is applied to the node BLI1 via the transistor TN77. Accordingly, the transistor TN74 is turned on. Therefore, the bit line BL_1 is electrically connected to the node SASRC via the transistors THN2, TN72, TN74, and TN75. Similarly, the bit line BL_2 is electrically connected to the node SASRC via the transistors THN4, TN82, TN84, and TN85. Accordingly, a voltage VBL1 is applied to the bit lines BL_1 and BL_2. The voltage VBL1 is a voltage higher than the voltage VSS.

At time T2, the voltage VBLC2 is applied to the signals BLC1 and BLC2. The voltage VBLC2 is a voltage higher than the voltage VBL2 applied to the bit line BL. For example, the voltage VBLC2 and the voltage VBL2 have a relationship of VBLC2=VBL2+Vth. The voltage VNLO2 is applied to the signals NLO1 and NLO2. The voltage VBLX2 is applied to the signals BLX1 and BLX2. For example, the voltages VBLC2, VNLO2, and VBLX2 have a relationship of VBLC2=VNLO2=VBLX2. Accordingly, the voltage VBL2 is applied to the bit lines BL_1 and BL_2. The voltage VBL2 is a voltage lower than the voltage VSRC.

The period from time T3 to T6 is a period of transition of the word line WL and voltage stabilization of the bit line BL during the AR read operation.

At time T3, the row decoder 25 applies the read voltage VA to the selected word line WL. Accordingly, for example, when the threshold voltage of the read target memory cell transistor MC is lower than the voltage VA, the memory cell transistor MC is turned on. When the threshold voltage of the read target memory cell transistor MC is the voltage VA or higher, the memory cell transistor MC is turned off. In other words, the memory cell transistor MC storing data in the "Er" state is used as the on cell. The memory cell transistor MC storing data in any one of the "A" to "G" states is used as the off cell. The voltage VSS is applied to the signals NLO1 and NLO2. Accordingly, the transistors TN77 and TN87 are turned off. For example, in the case of the on cell, since a current flows from the source line SL to the bit line BL, the voltage of the bit line BL maintains the voltage VBL2. In the case of the off cell, since no current flows from the source line SL to the bit line BL, the voltage of the bit line BL is decreased to the voltage VSASRC.

During the period from time T4 to T9, the sensing operation with respect to the bit line BL_1 is performed during the AR read operation.

At time T4, the voltage VX2 is applied to the signal SPC. Accordingly, the transistor TN11 is turned on. Therefore, the voltage VDDSA is applied to the node SEN.

At time T5, the voltage VSS is applied to the signal SPC. The voltage VDDSA is applied to the signal CLK. Due to the clock up, the voltage of the node SEN is increased to the voltage VSEN. The voltage VSEN is a voltage higher than the voltage VDDSA.

During the period from time T6 to T7, the sensing of the node SEN is performed.

At time T6, the voltage VSS is applied to the signals BLS1, BLS2, BLC1, BLC2, BLX1, and BLX2. Accordingly, the transistors THN2, THN4, TN71, TN72, TN81, and TN82 are turned off. Accordingly, the voltages of the nodes BLI1 and BLI2 are maintained. For example, when the node BLI1 corresponds to the on cell, the transistor TN74 is turned ON. When the node BLI1 corresponds to the off cell, the transistor TN74 is turned off. Similarly, for example, when the node BLI2 corresponds to the on cell, the transistor TN84 is turned on. When the node BLI2 corresponds to the off cell, the transistor TN84 is turned off.

The voltage VXXL is applied to the signal XXL1. Accordingly, the transistor TN73 is turned on. In the case of the on cell, since the transistor TN74 is on, the voltage of the node SEN is decreased. In the case of the off cell, the voltage of the node SEN is little lowered.

The period from time T6 to T25 is a period of transition of the word line WL and voltage stabilization of the bit line BL during the ER read operation. In the sense amplifier unit SAU of the present embodiment, at time T6, since the information on the bit line BL is stored in the node BLI, the voltage of the word line WL can transition to the next state during the sensing operation in the AR read operation.

At time T6, the row decoder 25 applies the read voltage VE to the selected word line WL. Accordingly, for example, when the threshold voltage of the read target memory cell transistor MC is lower than the voltage VE, the memory cell transistor MC is turned on. When the threshold voltage of the read target memory cell transistor MC is the voltage VE or higher, the memory cell transistor MC is turned off. In other words, the memory cell transistor MC storing data in any one of the "Er" to "D" states is used as the on cell. The memory cell transistor MC storing data in any one of the "E" to "G" states is used as the off cell. Accordingly, the voltage VBL2 is applied to the bit line BL corresponding to the on cell from the source line via the on cell.

At time T7, the voltage VSS is applied to the signal XXL1. Accordingly, the transistor TN4 is turned off. The voltage VSS is applied to the signal CLK. Due to the clock down, the voltage of the node SEN is decreased. For example, in the sense circuit SA corresponding to the off cell, the node SEN is at the "H" level. Therefore, the transistor TN14 is turned on. In the sense circuit SA corresponding to the on cell, the node SEN is at the "L" level. Therefore, the transistor TN14 is maintained off. In the LBUS pre-charge circuit LBPC, the voltage VX2 is applied to the signal LPC. Accordingly, the transistor TN41 is turned on. The voltage VDDSA is applied to the bus LBUS.

During the period from time T8 to T9, the strobe of the bit line BL_1 is performed.

At time T8, the voltage VSS is applied to the signal LPC. Accordingly, the transistor TN41 is turned off. The voltage VDDSA is applied to the signal STB. Accordingly, the transistor TN13 is turned on. For example, in the sense circuit SA corresponding to the off cell, since the transistor TN14 is turned on, the voltage VSS is applied to the bus LBUS. That is, the voltage of the bus LBUS is decreased. In the sense circuit SA corresponding to the on cell, since the transistor TN14 is turned off, the bus LBUS maintains the voltage VDDSA. In other words, in the case of the off cell, the bus LBUS is at the "L" level. In the case of the on cell, the bus LBUS is at the "H" level.

At time T9, the voltage VSS is applied to the signal STB. Accordingly, the transistor TN13 is turned off. The data of the bus LBUS is transferred to the latch circuit SDL. For example, in the case of the off cell, the "L" level data of the bus LBUS is transferred to the latch circuit SDL. Therefore, the node LAT_S is at the "L" level, and the node INV_S is at the "H" level. In other words, when the memory cell transistor MC stores the data in any one of the "A" to "G" states, the latch circuit SDL stores the "0" data. In the case of the on cell, the "H" level data of the bus LBUS is transferred to the latch circuit SDL. Therefore, the node LAT_S is at the "H" level, and the node INV_S is at the "L" level. In other words, when the memory cell transistor MC stores the data in the "Er" state, the latch circuit SDL stores the "1" data.

During the period from time T10 to T15, the sensing operation with respect to the bit line BL_2 is performed during the AR read operation.

At time T10, the voltage VX2 is applied to the signal SPC. Accordingly, the transistor TN11 is turned on. Therefore, the voltage VDDSA is applied to the node SEN.

At time T11, the voltage VSS is applied to the signal SPC. Accordingly, the transistor TN11 is turned off. The voltage VDDSA is applied to the signal CLK. Due to the clock up, the voltage of the node SEN is increased to the voltage VSEN.

During the period from time T12 to T13, the sensing of the node SEN is performed.

At time T12, the voltage VXXL is applied to the signal XXL2. Accordingly, the transistor TN9 is turned on. When the read target memory cell transistor MC is the on cell, a current flows from the node SEN to the bit line BL_2. Therefore, the voltage of the node SEN is decreased. When the read target memory cell transistor MC is the off cell, almost no current flows from the node SEN to the bit line BL_2. Therefore, the voltage of the node SEN is little lowered.

At time T13, the voltage VSS is applied to the signal XXL2. Accordingly, the transistor TN9 is turned off. The voltage VSS is applied to the signal CLK. Due to the clock down, the voltage of the node SEN is decreased. For example, in the sense circuit SA corresponding to the off cell, the node SEN is at the "H" level. Therefore, the transistor TN14 is turned on. In the sense circuit SA corresponding to the on cell, the node SEN is at the "L" level. Therefore, the transistor TN14 is maintained off. In the LBUS pre-charge circuit LBPC, the voltage VX2 is applied to the signal LPC. Accordingly, the transistor TN41 is turned on. The voltage VDDSA is applied to the bus LBUS.

During the period from time T14 to T15, the strobe of the bit line BL_2 is performed.

At time T14, the voltage VSS is applied to the signal LPC. Accordingly, the transistor TN41 is turned off. The voltage VDDSA is applied to the signal STB. Accordingly, the transistor TN13 is turned on. For example, in the sense circuit SA corresponding to the off cell, since the transistor TN14 is turned on, the voltage VSS is applied to the bus LBUS. That is, the voltage of the bus LBUS is decreased. In the sense circuit SA corresponding to the on cell, since the transistor TN14 is turned off, the bus LBUS maintains the voltage VDDSA. In other words, in the case of the off cell, the bus LBUS is at the "L" level. In the case of the on cell, the bus LBUS is at the "H" level.

At time T15, the voltage VSS is applied to the signal STB. Accordingly, the transistor TN13 is turned off. The data of the bus LBUS is transferred to the latch circuit TDL. For example, in the case of the off cell, the "L" level data of the bus LBUS is transferred to the latch circuit TDL. Therefore, the node LAT_T is at the "L" level, and the node INV_T is at the "H" level. In other words, when the memory cell transistor MC stores the data in any one of the "A" to "G" states, the latch circuit TDL stores the "0" data. In the case of the on cell, the "H" level data of the bus LBUS is transferred to the latch circuit TDL. Therefore, the node LAT_T is at the "H" level, and the node INV_T is at the "L" level. In other words, when the memory cell transistor MC stores the data in the "Er" state, the latch circuit TDL stores the "1" data.

After the strobe of the bit line BL_2 ends, the voltage VBLS is applied to the signals BLS1 and BLS2. The voltage VBLC2 is applied to the signals BLC1 and BLC2. The voltage VBLX2 is applied to the signals BLX1 and BLX2. Accordingly, the transistors THN2, THN4, TN71, TN72, TN81, and TN82 are turned on. Accordingly, the voltage of the bit line BL is transferred to the node BLI.

At time T16, the voltage VDDSA is applied to the signal LSL. Accordingly, the transistor TN15 is turned on. The voltage VX2 is applied to the signal LPC. Accordingly, the transistor TN41 is turned on. Therefore, the voltage VDDSA is applied to the bus LBUS. Accordingly, the transistor TN16 is turned on. The voltage VSS is applied to the node SEN via the transistors TN15 and TN16.

At time T17, the voltage VSS is applied to the signal LSL. Accordingly, the transistor TN15 is turned off. The voltage VSS is applied to the signal LPC. Accordingly, the transistor TN41 is turned off.

As illustrated in FIG. 47, during the period from time T18 to T23, the sensing operation with respect to the bit line BL_1 during the ER read operation is performed. The voltages of the signals BLS1, BLS2, BLC1, BLC2, BLX1, BLX2, SPC, XXL1, CLK, STB, and LPC and the node SEN during the period from T18 to T23 are the same as those during the period from T4 to T9.

During the period from time T20 to T21, the sensing of the node SEN is performed. As a result, when the read target memory cell transistor MC is the on cell, the node SEN is at the "L" level. In other words, when the memory cell transistor MC stores the data in any one of the "Er" to "D" states, the node SEN is at the "L" level. When the read target memory cell transistor MC is the off cell, the node SEN is at the "H" level. In other words, when the memory cell transistor MC stores the data in any one of the "E" to "G" states, the node SEN is at the "H" level.

During the period from time T22 to T23, the strobe of the bit line BL_1 is performed.

At time T23, the result of the logical sum (OR) operation of the node SEN and the latch circuit SDL is stored in the latch circuit SDL. Accordingly, when the memory cell transistor MC stores the data in any one of the "Er", the "E", the "F", and "G" states, the latch circuit SDL stores the "1" data. When the memory cell transistor MC stores the data in any one of the "A" to "D" states, the latch circuit SDL stores the "0" data.

During the period from time T24 to T29, the sensing operation with respect to the bit line BL_2 during the ER read operation is performed. The voltages of the signals SPC, XXL2, CLK, STB, and LPC and the node SEN during the period from time T24 to T29 are the same as those during the period from time T10 to T15.

During the period from time T26 to T27, the sensing of the node SEN is performed. As a result, when the read target memory cell transistor MC is the on cell, the node SEN is at the "L" level. In other words, when the memory cell transistor MC stores the data in any one of the "Er" to "D" states, the node SEN is at the "L" level. When the read target memory cell transistor MC is the off cell, the node SEN is at the "H" level. In other words, when the memory cell transistor MC stores the data in any one of the "E" to "G" states, the node SEN is at the "H" level.

During the period from time T28 to T29, the strobe of the bit line BL_2 is performed.

At time T29, the result of the logical sum (OR) operation of the node SEN and the latch circuit TDL is stored in the latch circuit TDL. Accordingly, when the memory cell transistor MC stores the data in any one of the "Er", the "E", the "F", and "G" states, the latch circuit TDL stores the "1" data. When the memory cell transistor MC stores the data in any one of the "A" to "D" states, the latch circuit TDL stores the "0" data.

During the period from time T25 to T29, the bit line BL and the word line WL are lowered. More specifically, during the period from time T25 to T29, the row decoder 25 applies the voltage VSS to the selected word line WL and the non-selected word lines WL. The voltage VSS is applied to the source line SL. The voltage VX2 is applied to the signals NLO1 and NLO2. Accordingly, the transistors TN77 and TN87 are turned on. The voltage VSS is applied to the node SRCGND and the node SASRC. During the period from time T28 to T29, the voltage VSS is applied to the signals BLS1 and BLS2. The transistors THN2 and THN4 are turned off. Accordingly, the voltage VSS is applied to the bit lines BL_1 and BL_2.

At time T30, the voltage VDDSA is applied to the signal LSL. Accordingly, the transistor TN15 is turned on. The voltage VX2 is applied to the signal LPC. Accordingly, the transistor TN41 is turned on. Therefore, the voltage VDDSA is applied to the bus LBUS. Accordingly, the transistor TN16 is turned on. The voltage VSS is applied to the node SEN via the transistors TN15 and TN16.

At time T31, the voltage VSS is applied to the signal LSL. Accordingly, the transistor TN15 is turned off. The voltage VSS is applied to the signal LPC. Accordingly, the transistor TN41 is turned off. The voltage VX2 is applied to the signal DSW. Accordingly, the transistor TN42 is turned on. That is, the bus LBUS is electrically connected to the bus DBUS.

During the period from time T31 to T32, the data is transferred to the latch circuit XDL.

At the time T32, the voltage VSS is applied to the signal DSW. Accordingly, the transistor TN42 is turned off.

4.3 Advantages of the Fourth Embodiment

With the configuration according to the fourth embodiment, the same advantages as those of the first embodiment can be obtained.

5. Fifth Embodiment

Next, a fifth embodiment will be described. In the fifth embodiment, four examples of the configuration of the semiconductor memory device 1 different from that of the first embodiment will be described. In the following, the differences from the first embodiment will be mainly described.

5.1 First Example

Figure 48:
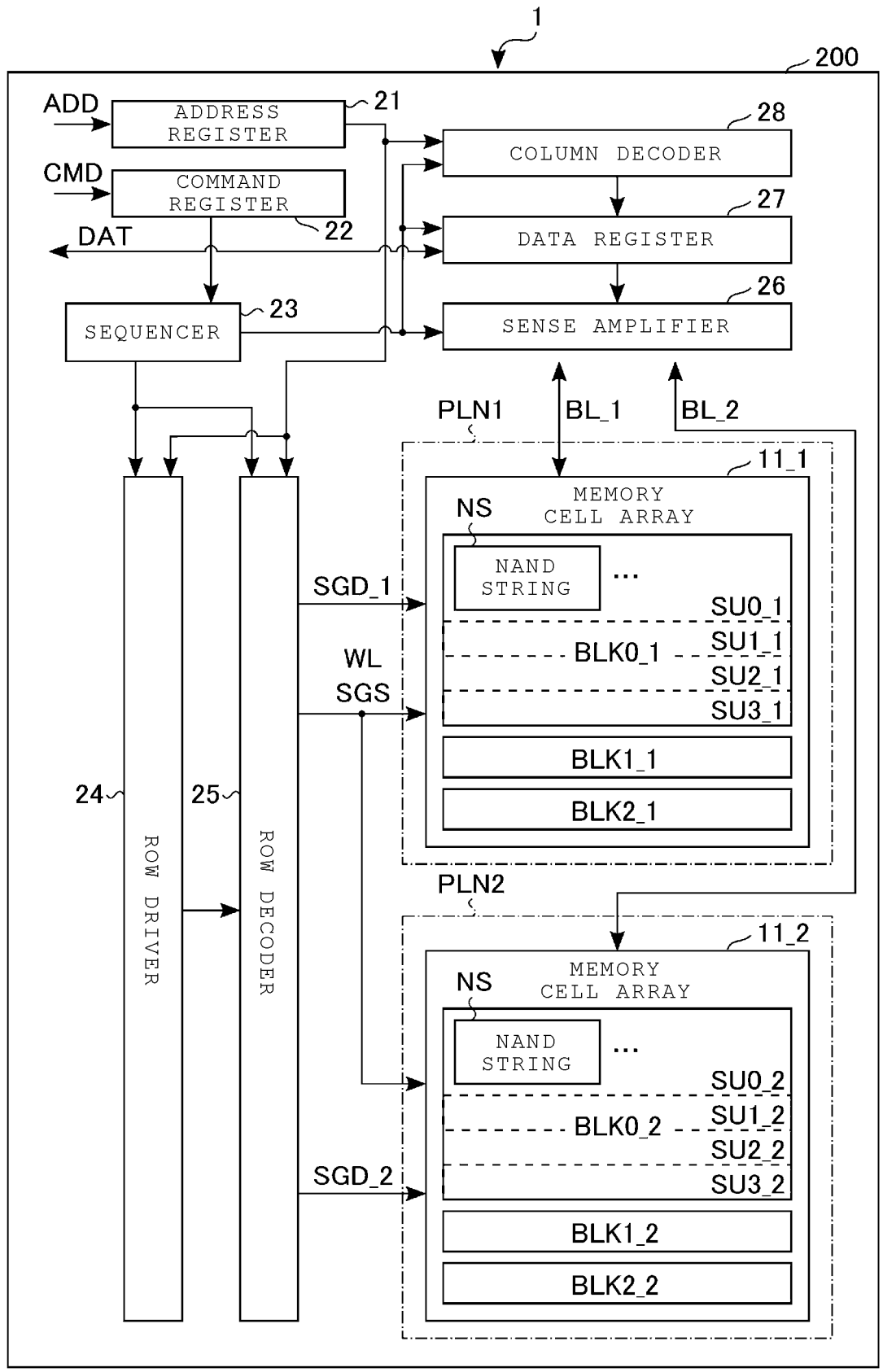
FIG. 48 is a block diagram illustrating an overall configuration of a semiconductor memory device according to a first example of a fifth embodiment.

First, a first example of the fifth embodiment will be described with reference to FIG. 48. FIG. 48 is a block diagram illustrating the overall configuration of semiconductor memory device 1. It should be noted that, in FIG. 48, some of the connections between the components are indicated by arrow lines, but the connections between the components are not limited thereto.

As illustrated in FIG. 48, the semiconductor memory device 1 according to the first example includes the address register 21, the command register 22, the sequencer 23, the row driver 24, the row decoder 25, the sense amplifier 26, the data register 27, the column decoder 28, and a plurality of planes PLN provided on the semiconductor substrate 200. That is, the semiconductor memory device 1 does not have a bonded structure.

The configurations of the address register 21, the command register 22, the sequencer 23, the row driver 24, the row decoder 25, the sense amplifier 26, the data register 27, and the column decoder 28 are the same as those in the first embodiment.

The plane PLN is a unit of performing a data write operation and a data read operation. In the example of FIG. 48, the semiconductor memory device 1 includes two planes PLN1 and PLN2. It should be noted that the number of planes PLN is not limited to two. The planes PLN1 and PLN2 can operate independently of each other. The planes PLN1 and PLN2 can also operate in parallel. The plane PLN1 includes the memory cell array 11_1. The plane PLN2 includes the memory cell array 11_2. The circuit configurations of the memory cell arrays 11_1 and 11_2 are the same as those of the first embodiment. The memory cell array 11_1 of the plane PLN1 and the memory cell array 11_2 of the plane PLN2 share the word line WL and the select gate line SGS. The memory cell array 11_1 and the memory cell array 11_2 do not share the select gate line SGD. The memory cell array 11_1 of the plane PLN1 and the memory cell array 11_2 of the plane PLN2 do not share the bit line BL.

The sense amplifier 26 of the first example is connected to the memory cell array 11_1 of the plane PLN1 via a plurality of bit lines BL_1. The sense amplifier 26 is connected to the memory cell array 11_2 of the plane PLN2 via a plurality of bit lines BL_2. That is, the memory cell arrays 11_1 and 11_2 are independently connected to the sense amplifier 26. That is, the memory cell array 11_1 of the plane PLN1 and the memory cell array 11_2 of the plane PLN2 do not share the bit line BL.

The configuration of the sense amplifier 26 is the same as that in FIG. 16 of the first embodiment. Accordingly, even in the semiconductor memory device 1 that does not have the bonded structure, the same write operation and read operation as those in the first embodiment may be performed on a plurality of the memory cell arrays 11. That is, the sense amplifier 26 described in the first embodiment can also be applied to a plurality of the memory cell arrays 11 that are not stacked.

5.2 Second Example

Figure 49:
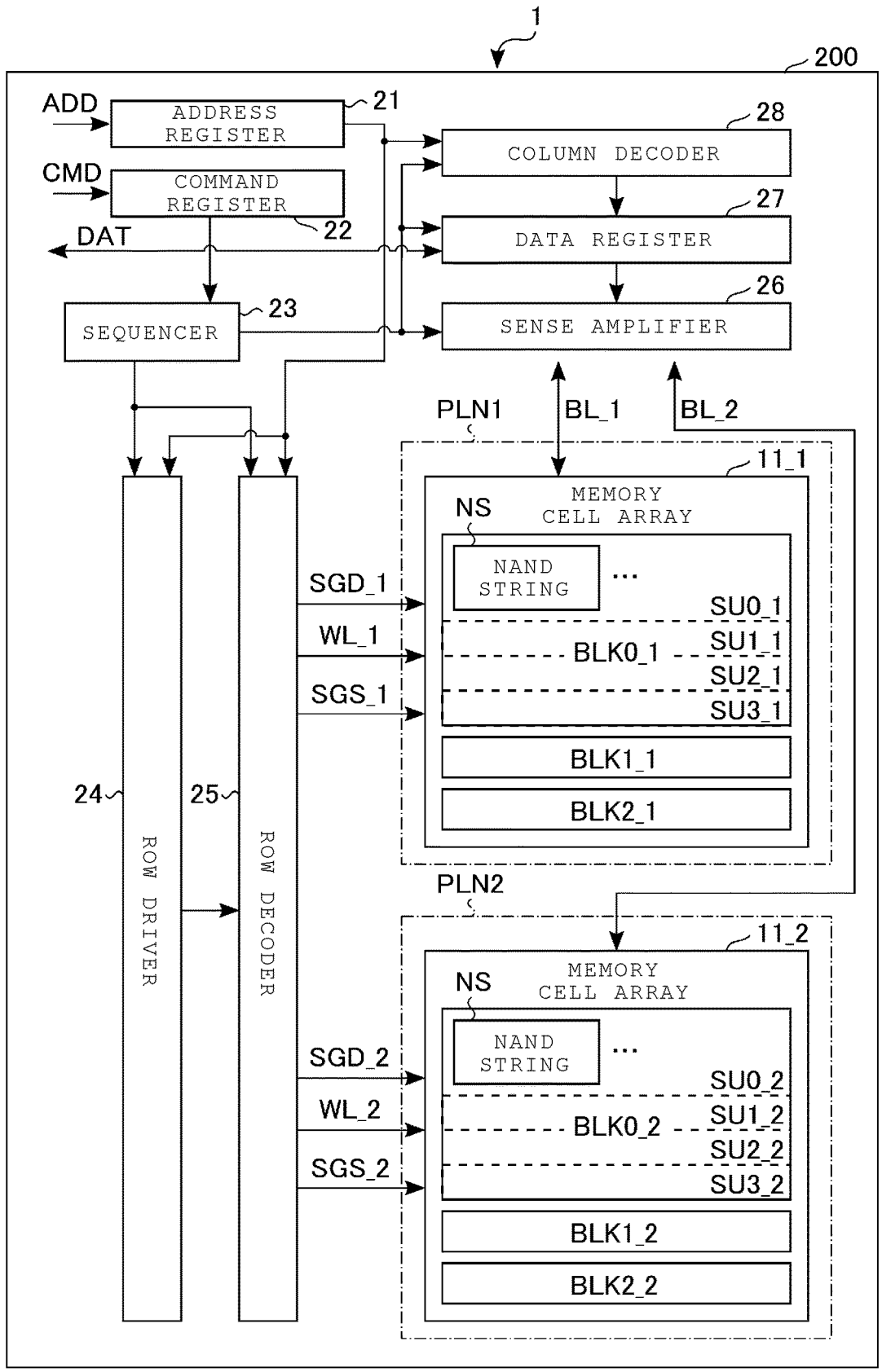
FIG. 49 is a block diagram illustrating an overall configuration of a semiconductor memory device according to a second example of the fifth embodiment.

Next, a second example of the fifth embodiment will be described with reference to FIG. 49. FIG. 49 is a block diagram illustrating the overall configuration of the semiconductor memory device 1. It should be noted that, in FIG. 49, some of the connections between the components are indicated by arrow lines, but the connections between the components are not limited thereto. Hereinafter, the differences from the first example of the fifth embodiment will be mainly described.

As illustrated in FIG. 49, the memory cell arrays 11_1 and 11_2 do not share the word lines WL and the select gate lines SGD and SGS. The memory cell array 11_1 is connected to the row decoder 25 via the word line WL_1, the select gate line SGD_1, and a select gate line SGS_1. The memory cell array 11_2 is connected to the row decoder 25 via the word line WL_2, the select gate line SGD_2, and a select gate line SGS_2. It should be noted that the plurality of row decoders 25 connected to the plurality of memory cell arrays 11, respectively, may be provided. Other configurations are the same as those of the first example of the fifth embodiment. The memory cell array 11_1 of the plane PLN1 and the memory cell array 11_2 of the plane PLN2 do not share the bit line BL.

5.3 Third Example

Figure 50:
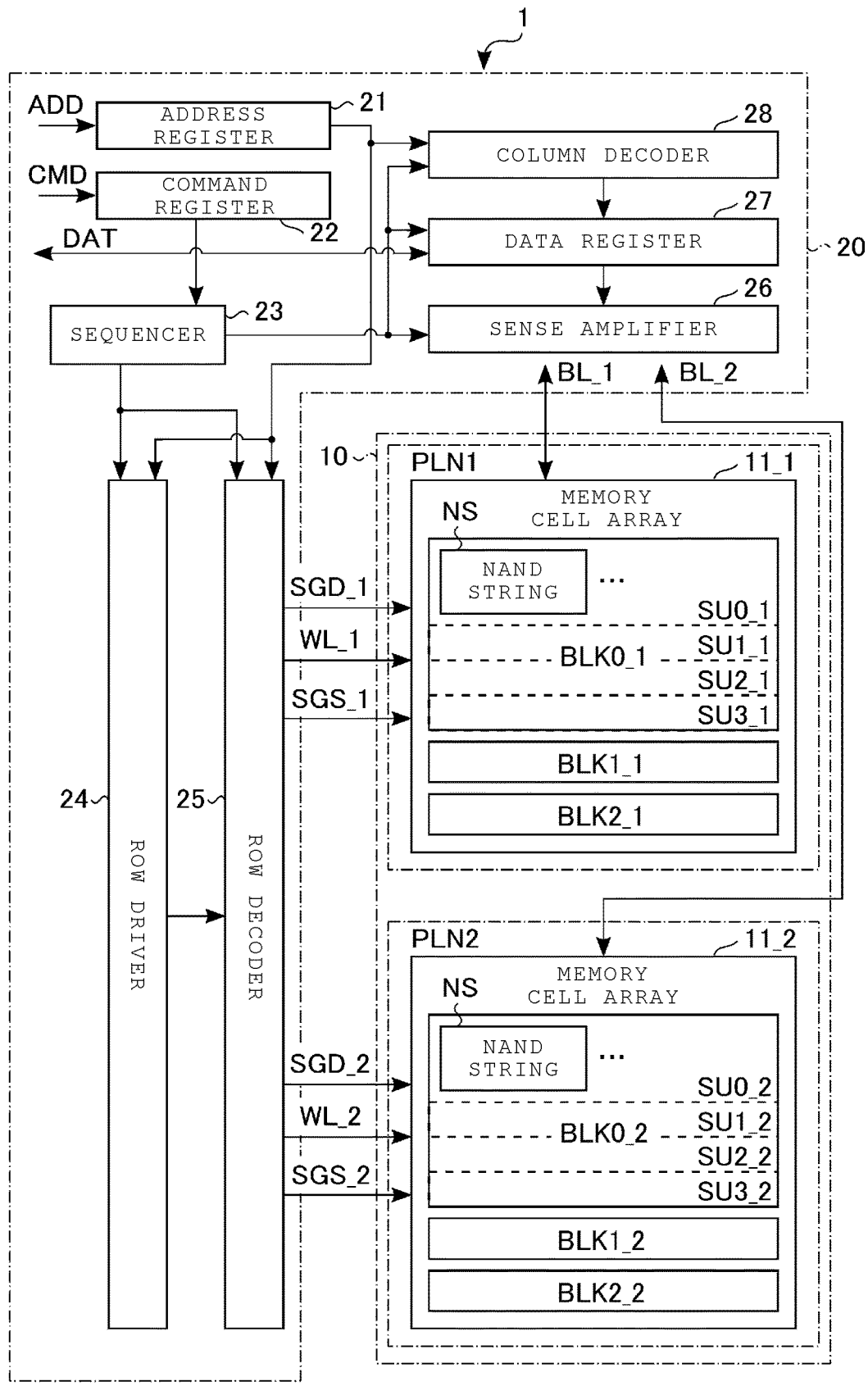
FIG. 50 is a block diagram illustrating an overall configuration of a semiconductor memory device according to a third example of the fifth embodiment.
Figure 51:
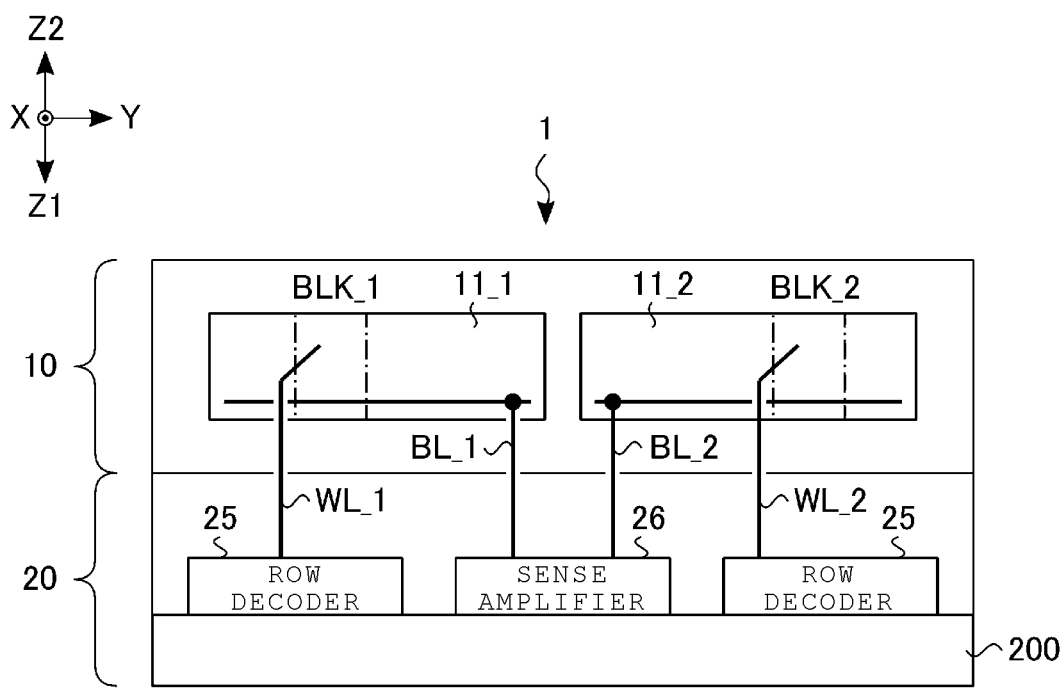
FIG. 51 illustrates a cross-sectional view of an arrangement of a circuit chip and array chips provided in the semiconductor memory device according to a third example of the fifth embodiment.

Next, a third example of the fifth embodiment will be described with reference to FIGS. 50 and 51. In the third example, a case where the configuration illustrated in the second example is applied to the semiconductor memory device 1 having a bonded structure will be described. FIG. 50 is a block diagram illustrating the overall configuration of semiconductor memory device 1. FIG. 51 illustrates a cross-sectional view of the arrangement of the array chip 10 and the circuit chip 20. In the following, the differences from the second example of the fifth embodiment will be mainly described.

As illustrated in FIG. 50, the semiconductor memory device 1 according to the third example includes one array chip 10 and the circuit chip 20. The semiconductor memory device 1 has a bonded structure in which the array chip and the circuit chip 20 are bonded.

The array chip 10 includes the two planes PLN1 and PLN2. The memory cell array 11_1 of the plane PLN1 and the memory cell array 11_2 of the plane PLN2 do not share the word lines WL and the select gate lines SGD and SGS. The memory cell array 11_1 of the plane PLN1 and the memory cell array 11_2 of the plane PLN2 do not share the bit line BL.

The circuit chip 20 includes the address register 21, the command register 22, the sequencer 23, the row driver 24, the row decoder 25, the sense amplifier 26, the data register 27, and the column decoder 28.

As illustrated in FIG. 51, the array chip 10 is bonded on the circuit chip 20 toward the Z2 direction. That is, the circuit chip 20 and the array chip 10 are stacked toward the Z2 direction.

The row decoder 25 and the sense amplifier 26 are provided on the semiconductor substrate 200 of the circuit chip 20. It should be noted that, in the example of FIG. 51, for the simplification of description, the row decoder 25 is illustrated to be provided for each memory cell array 11.

The array chip 10 is provided with the memory cell arrays 11_1 and 11_2.

For example, the block BLK_1 of the memory cell array 11_1 and the block BLK_2 of the memory cell array 11_2 do not share the word lines WL.

The block BLK_1 of the memory cell array 11_1 is connected to the sense amplifier 26 via the bit line BL_1. The block BLK_2 of the memory cell array 11_2 is connected to the sense amplifier 26 via the bit line BL_2.

5.4 Fourth Example

Figure 52:
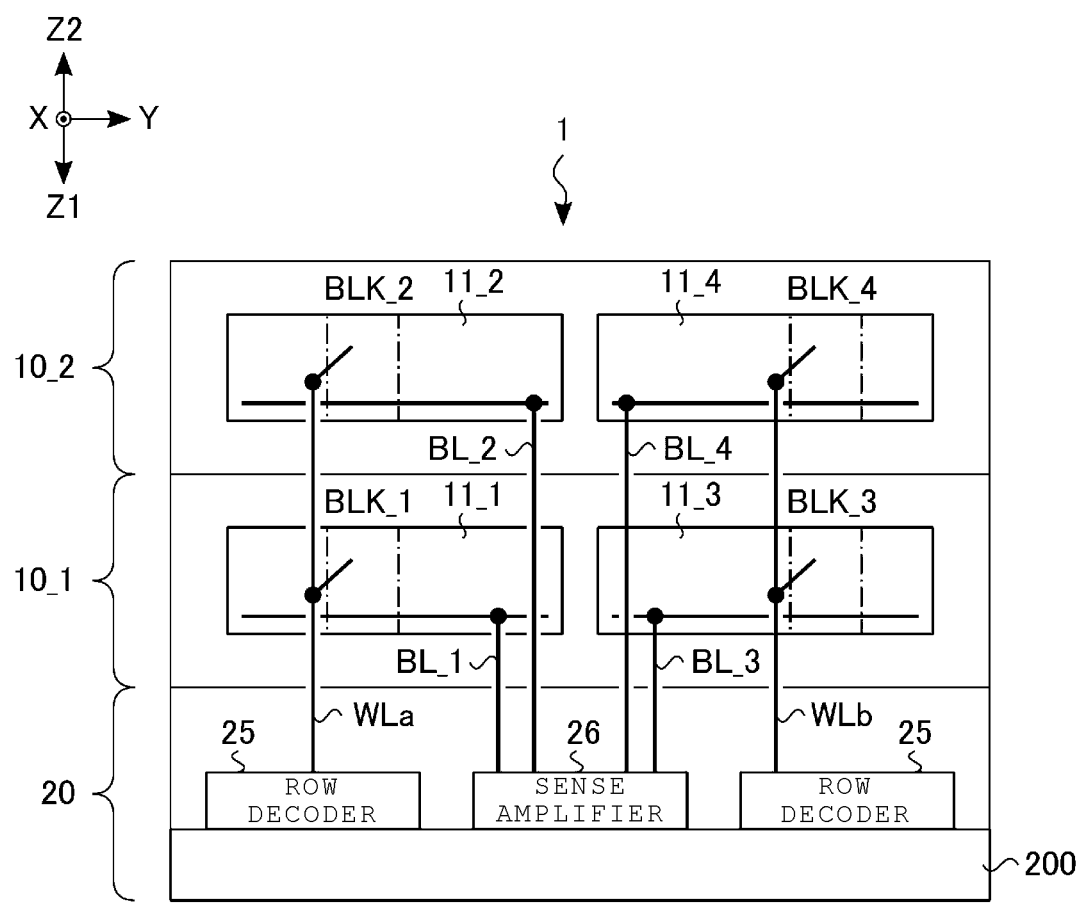
FIG. 52 is a block diagram illustrating an overall configuration of a semiconductor memory device according to a fourth example of the fifth embodiment.

Next, a fourth example of the fifth embodiment will be described with reference to FIG. 52. In the fourth example, a case where a semiconductor memory device 1 includes a plurality of the array chips 10 described in the third example of the fifth embodiment will be described. FIG. 52 illustrates a cross-sectional view of an arrangement of a plurality of the array chips 10 and the circuit chip 20. In the following, the differences from the third example of the fifth embodiment will be mainly described.

As illustrated in FIG. 52, the array chip 10_1 is bonded on the circuit chip 20 toward the Z2 direction. The array chip 10_2 is bonded on the array chip 10_1. That is, the circuit chip 20, the array chip 10_1, and the array chip 10_2 are stacked sequentially toward the Z2 direction.

The row decoder 25 and the sense amplifier 26 are provided on the semiconductor substrate 200 of the circuit chip 20. It should be noted that, in the example of FIG. 52, for the simplification of description, two row decoders 25 are illustrated to be provided.

The array chip 10_1 is provided with the memory cell arrays 11_1 and 11_3. The array chip 10_2 is provided with the memory cell arrays 11_2 and 11_4. The memory cell array 11_2 is located above the memory cell array 11_1 in the Z direction. The memory cell array 11_4 is located above the memory cell array 11_3 in the Z direction, The memory cell array 11_1 and the memory cell array 11_2 share the word line WL (hereinafter denoted as a "word line WLa"). The memory cell arrays 11_3 and 11_4 share the word line WL (hereinafter denoted as a "word line WLb"). More specifically, the block BLK_1 of the memory cell array 11_1 and the block BLK_2 of the memory cell array 11_2 aligned in the Z direction share the word line WLa. The block BLK_3 of the memory cell array 11_3 and the block BLK_4 of the memory cell array 11_4 aligned in the Z direction share the word line WLb.

The block BLK_1 of the memory cell array 11_1 is connected to the sense amplifier 26 via the bit line BL_1. The block BLK_2 of the memory cell array 11_2 is connected to the sense amplifier 26 via the bit line BL_2. The block BLK_3 of the memory cell array 11_3 is connected to the sense amplifier 26 via the bit line BL_3. The block BLK_4 of the memory cell array 11_4 is connected to the sense amplifier 26 via the bit line BL_4.

5.5 Advantages of the Fifth Embodiment

With the configuration according to the fifth embodiment, the 2CU read operation described in the first embodiment can be applied when reading data from the two planes PLN. The 2CU write operation described in the first embodiment can be applied when writing data to the two planes PLN.

6. Modified Examples and the Like

The semiconductor memory device according to the above embodiment includes a first chip (10_1) including a first memory cell array (11_1) including first memory cells (MC), a second chip (10_2) including a second memory cell array (11_2) including second memory cells (MC), and a third chip (20) including a row decoder (25) and a sense amplifier (26). The first memory cell and the second memory cell are commonly connected to the row decoder via the word line (WL). The first memory cell is connected to the sense amplifier via the first bit line (BL_1). The second memory cell is connected to the sense amplifier via the second bit line (BL_2). The sense amplifier includes a first node (node SEN) electrically connectable to the first bit line and the second bit line and reads the data of the first memory cell and the second memory cell based on a first voltage of the first node.

According to the above embodiments, it is possible to provide a semiconductor memory device capable of preventing an increase in the chip area.

"Connection" in the above embodiments also includes a state of being indirectly connected with a transistor, a resistor, or the like interposed therebetween.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor memory device comprising:
a first chip including a first memory cell array including a first memory cell;
a second chip including a second memory cell array including a second memory cell; and
a third chip including a row decoder and a sense amplifier, wherein
the first memory cell and the second memory cell are commonly connected to the row decoder via a first word line,
the first memory cell is connected to the sense amplifier via a first bit line,
the second memory cell is connected to the sense amplifier via a second bit line, and
the sense amplifier includes a first node selectively connectable to the first bit line and the second bit line and is configured to sense a voltage at the first node to read data stored in the first memory cell when the first node is connected to the first bit line and sense the voltage at the first node to read data stored in the second memory cell when the first node is connected to the second bit line.

2. The semiconductor memory device according to claim 1, wherein the sense amplifier is configured to concurrently charge the first bit line and the second bit line during a first period.

3. The semiconductor memory device according to claim 2, wherein
the first period is included in a read operation with respect to the first memory cell and the second memory cell, and
the sense amplifier, during the read operation, performs a sensing operation to sense the voltage at the first node during a second period after the first period, the first node being connected to the first bit line during the second period, and then performs a sensing operation to sense the voltage at the first node during a third period after the second period, the first node being connected to the second bit line during the third period.

4. The semiconductor memory device according to claim 3, wherein
the sense amplifier includes a first latch circuit and a second latch circuit, and
during the read operation, the sense amplifier causes the first latch circuit to store the data read from the first memory cell and causes the second latch circuit to store the data read from the second memory cell.

5. The semiconductor memory device according to claim 2, wherein
the first period is included in a write operation with respect to the first memory cell and the second memory cell, and
during a fourth period of the write operation after the first period, a second voltage being applied to the first word line during the fourth period, data is written into the first memory cell and the second memory cell.

6. The semiconductor memory device according to claim 5, wherein
the sense amplifier includes a first latch circuit and a second latch circuit, and
during the first period of the write operation, the sense amplifier applies a third voltage to the first bit line based on data stored in the first latch circuit and applies a fourth voltage to the second bit line based on data stored in the second latch circuit.

7. The semiconductor memory device according to claim 1, wherein
the sense amplifier includes a first latch circuit,
a write operation includes a program operation and a program verification operation, and
in the program operation with respect to the first memory cell, the sense amplifier applies a fifth voltage to the first bit line based on data stored in the first latch circuit and applies a sixth voltage higher than a ground voltage to the second bit line.

8. The semiconductor memory device according to claim 7, wherein
the sense amplifier further includes a second latch circuit, and
in the program operation with respect to the first memory cell, the sense amplifier applies the fifth voltage, which is higher than the ground voltage and lower than the sixth voltage, to the first bit line based on data stored in the second latch circuit.

9. The semiconductor memory device according to claim 1, wherein the sense amplifier further includes:
a first connection circuit configured to electrically connect the first bit line to the first node; and
a second connection circuit configured to electrically connect the second bit line to the first node.

10. The semiconductor memory device according to claim 9, wherein
the sense amplifier further includes a first latch circuit,
a write operation includes a program operation and a program verification operation, and
the first connection circuit causes a seventh voltage to be applied to the first bit line based on data stored in the first latch circuit in the program operation with respect to the first memory cell and electrically connects the first bit line to the first node in the program verification operation with respect to the first memory cell.

11. The semiconductor memory device according to claim 1, wherein the second chip is bonded to a first surface of the first chip, and the third chip is bonded to a second surface of the first chip opposite to the first surface.

12. The semiconductor memory device according to claim 1, wherein
the first memory cell array includes a first region in which the first memory cell and the first bit line are provided and a second region into which the first bit line extends, the first bit line further extending toward the sense amplifier in a direction crossing a surface of the first chip, and the second memory cell array includes a third region in which the second memory cell and the second bit line are provided and a fourth region into which the second bit line extends, the second bit line further extending toward the sense amplifier in the direction and through the second region of the first memory cell array.

13. The semiconductor memory device according to claim 1, wherein
the first word line includes a first wiring connected to the first memory cell and a second wiring connected to the second memory cell, and
the second wiring is connected to the first wiring via a contact plug passing through the first memory cell array.

14. The semiconductor memory device according to claim 1, further comprising:
a fourth chip including a third memory cell array including a third memory cell, wherein
the third memory cell is connected to the row decoder via the first word line, and to the sense amplifier via a third bit line,
the first node is also electrically connectable to the third bit line, and
the sense amplifier is configured to sense the voltage at the first node to read data from the third memory cell when the first node is connected to the third word line.

15. The semiconductor memory device according to claim 14, wherein the sense amplifier is configured to concurrently charge the first bit line, the second bit line, and the third bit line during a fifth period.

16. The semiconductor memory device according to claim 1, wherein the sense amplifier includes:
a first transistor having one end connected to the first bit line and the other end connected to a second node;
a second transistor having one end connected to the second node and the other end connected to a third node;
a third transistor having one end connected to the third node and the other end connected to the first node;
a fourth transistor having a gate connected to the second node and one end connected to the third node;
a fifth transistor having one end connected to the second bit line and the other end connected to a fourth node;
a sixth transistor having one end connected to the fourth node and the other end connected to a fifth node;
a seventh transistor having one end connected to the fifth node and the other end connected to the first node; and
an eighth transistor having a gate connected to the fourth node and one end connected to the fifth node.

17. The semiconductor memory device according to claim 16, wherein
the sense amplifier includes a plurality of sense amplifier units, each connected to the first bit line and the second bit line, and
each of the sense amplifier units includes the first, second, third, fourth, fifth, sixth, seventh, and eighth transistors.

18. A semiconductor memory device comprising:
a first chip including a first memory cell array including a first memory cell;
a second chip including a second memory cell array including a second memory cell; and
a third chip including a row decoder and a sense amplifier, wherein
the first memory cell and the second memory cell are commonly connected to the row decoder via a first word line,
the first memory cell is connected to the sense amplifier via a first bit line,
the second memory cell is connected to the sense amplifier via a second bit line, and
the sense amplifier includes:
a first node electrically connectable to the first bit line;
a second node electrically connectable to the second bit line;
a first circuit configured to sense a voltage at the first node to read data stored in the first memory cell;
a second circuit configured to sense a voltage at the second node to read data stored in the second memory cell; and
a latch circuit connected to the first circuit and the second circuit.

19. The semiconductor memory device according to claim 18, wherein, during a read operation with respect to the first memory cell and the second memory cell, the sense amplifier concurrently charges the first bit line and the second bit line during a first period of the read operation, and performs a sensing operation with respect to the first bit line and the second bit line during a second period of the read operation after the first period.

20. The semiconductor memory device according to claim 19, wherein, during the second period, the sensing operation with respect to the first bit line and the sensing operation with respect to the second bit line are performed in parallel.

* * * * *